(12) United States Patent
Ooguni

(10) Patent No.: US 9,064,324 B2
(45) Date of Patent: Jun. 23, 2015

(54) IMAGE PROCESSING DEVICE, IMAGE PROCESSING METHOD, AND RECORDING MEDIUM ON WHICH AN IMAGE PROCESSING PROGRAM IS RECORDED

(71) Applicant: FUJIFILM CORPORATION, Tokyo (JP)

(72) Inventor: Toshihiro Ooguni, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 19 days.

(21) Appl. No.: 13/777,862

(22) Filed: Feb. 26, 2013

(65) Prior Publication Data

US 2013/0257882 A1    Oct. 3, 2013

(30) Foreign Application Priority Data

Mar. 30, 2012    (JP) .................................. 2012-083052

(51) Int. Cl.
*G06T 1/20*    (2006.01)

(52) U.S. Cl.
CPC ........................................ *G06T 1/20* (2013.01)

(58) Field of Classification Search
CPC ........... G06T 1/20; G06T 15/005; G06T 1/60; G06F 9/3885
See application file for complete search history.

(56) References Cited

U.S. PATENT DOCUMENTS

| 5,289,577 | A | * | 2/1994 | Gonzales et al. | ............. | 345/506 |
| 5,781,199 | A | * | 7/1998 | Oniki et al. | .................... | 345/505 |
| 7,602,394 | B2 | | 10/2009 | Seki et al. | | |
| 7,605,818 | B2 | | 10/2009 | Nagao et al. | | |
| 2006/0274970 | A1 | | 12/2006 | Seki et al. | | |
| 2007/0192767 | A1 | * | 8/2007 | Inoue et al. | .................... | 718/108 |
| 2011/0035736 | A1 | * | 2/2011 | Stefansson et al. | ........... | 717/149 |

FOREIGN PATENT DOCUMENTS

| CN | 1873685 | | 12/2006 |
| CN | 102298561 | | 12/2011 |
| JP | 2006-338500 | A | 12/2006 |
| JP | 2006-338502 | A | 12/2006 |
| JP | 2008-139968 | A | 6/2008 |
| JP | 2009-054003 | A | 3/2009 |

OTHER PUBLICATIONS

Chinese Office Action dated Jul. 10, 2014 with English Translation.

* cited by examiner

*Primary Examiner* — Kee M Tung
*Assistant Examiner* — Nicholas R Wilson
(74) *Attorney, Agent, or Firm* — McGinn IP Law Group, PLLC

(57) ABSTRACT

An image processing device, in a case in which an image processing module, uses in image processing a processor that is different than a processor used in image processing by an image processing module of a preceding stage, is connected at a subsequent stage, carries out transfer processing that transfers image data, that has been written into a buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer.

10 Claims, 34 Drawing Sheets

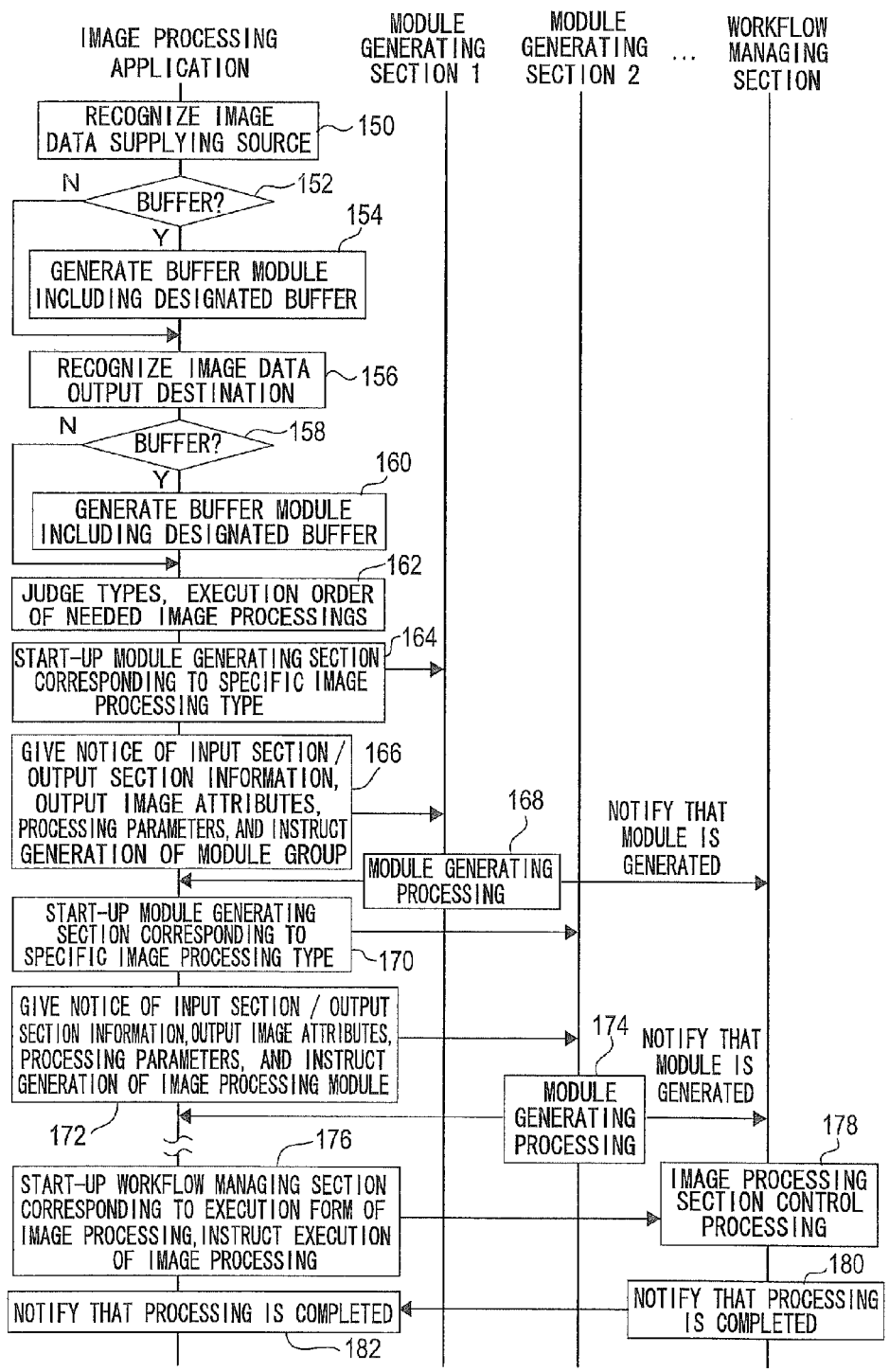

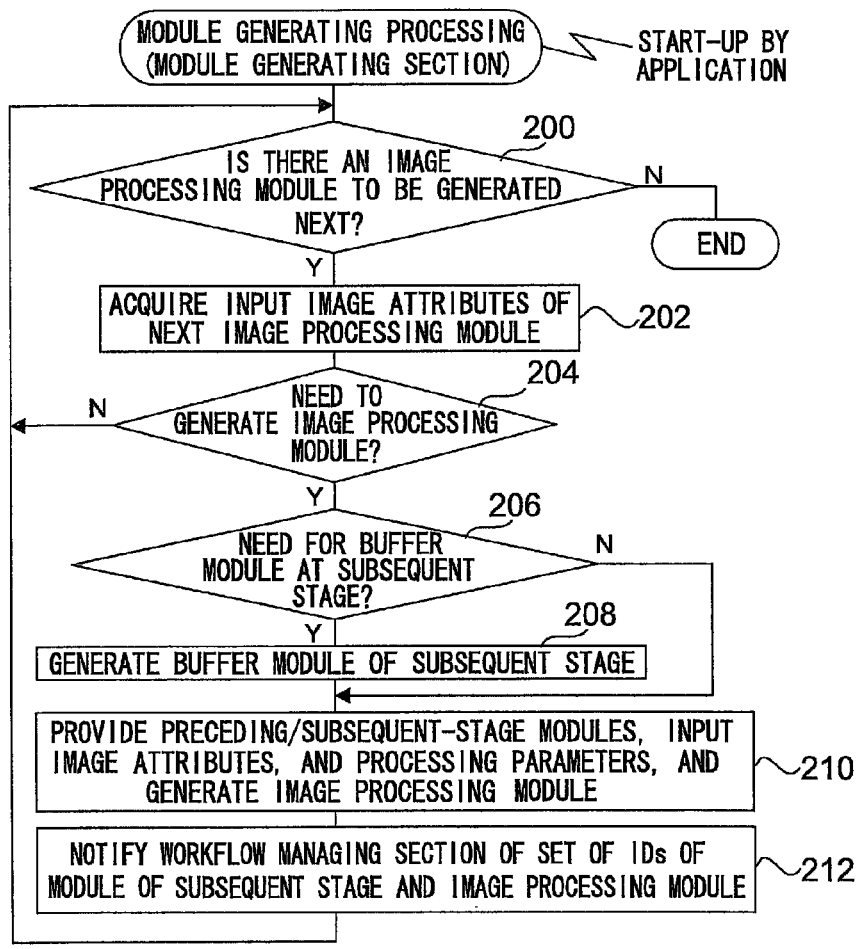

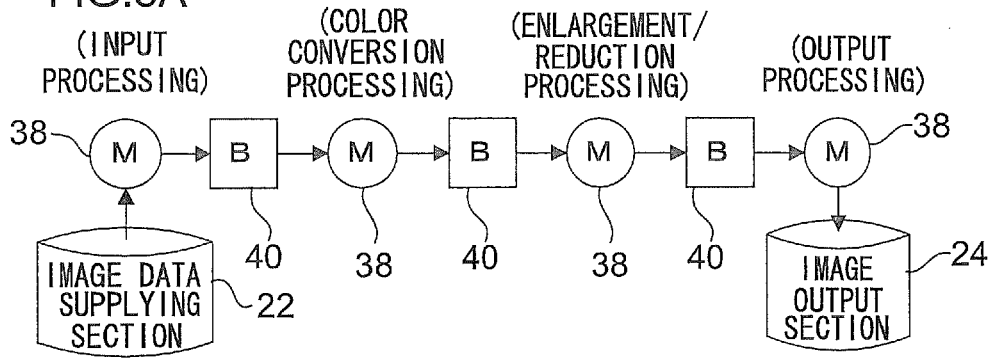
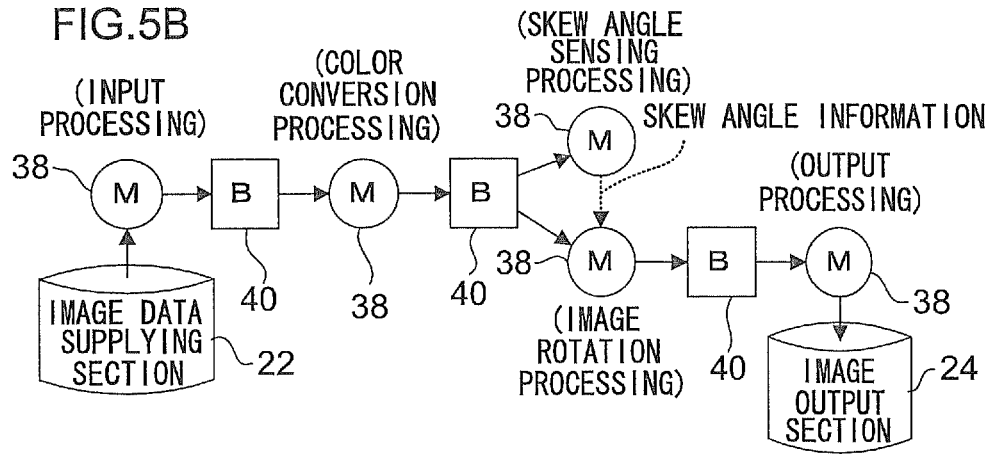
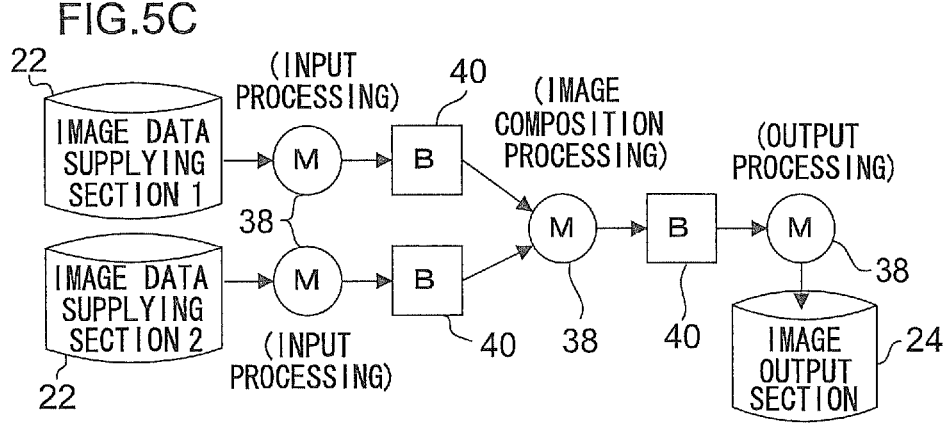

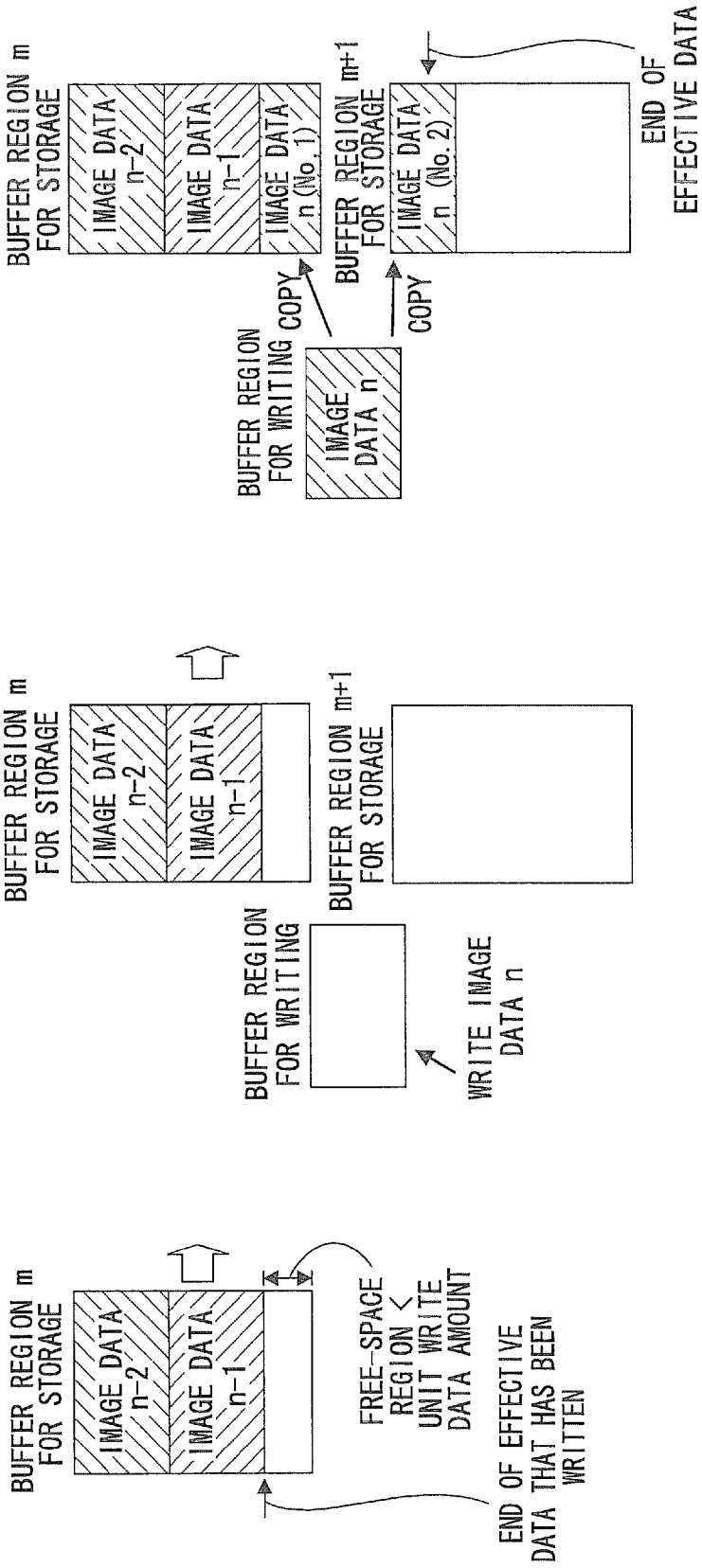

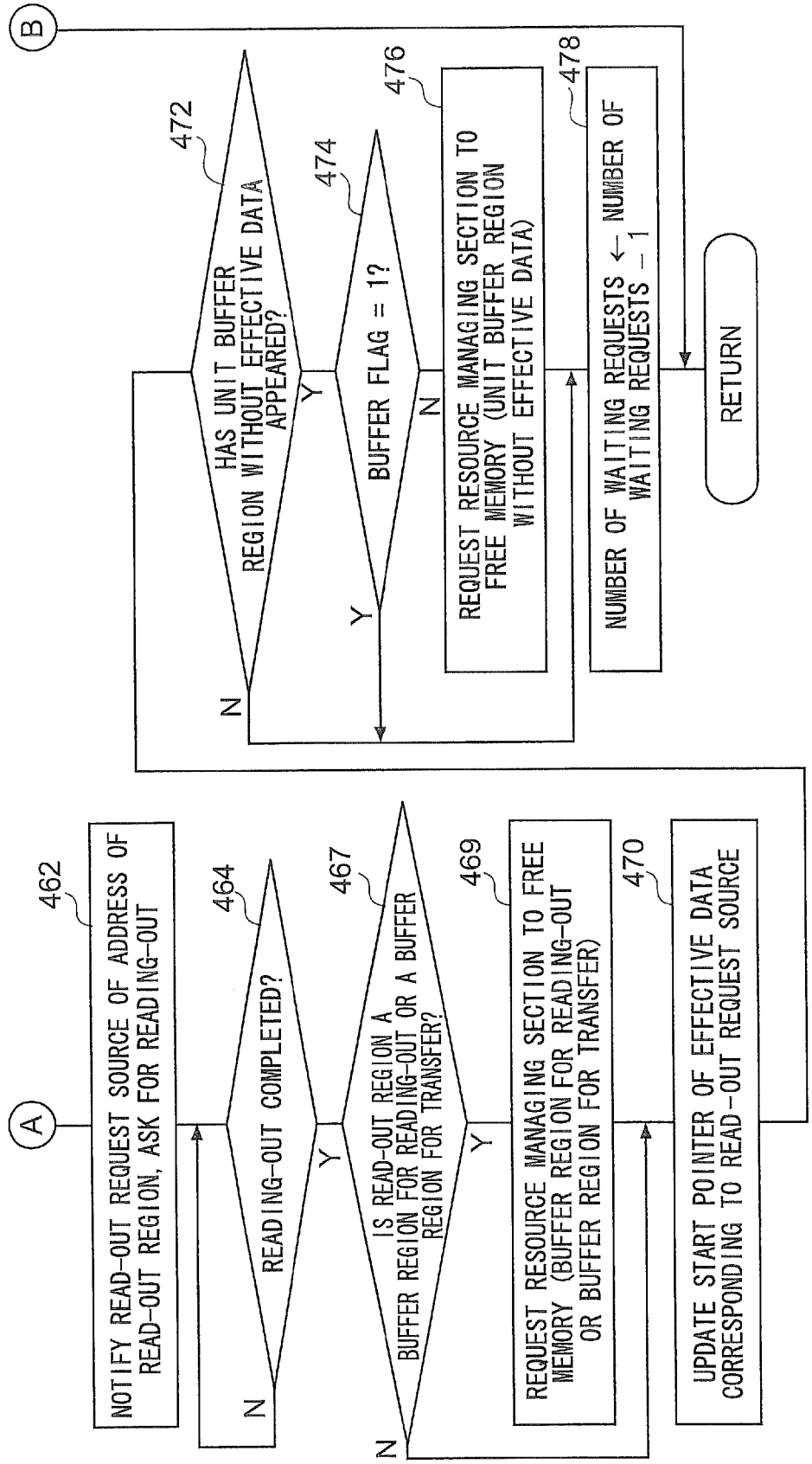

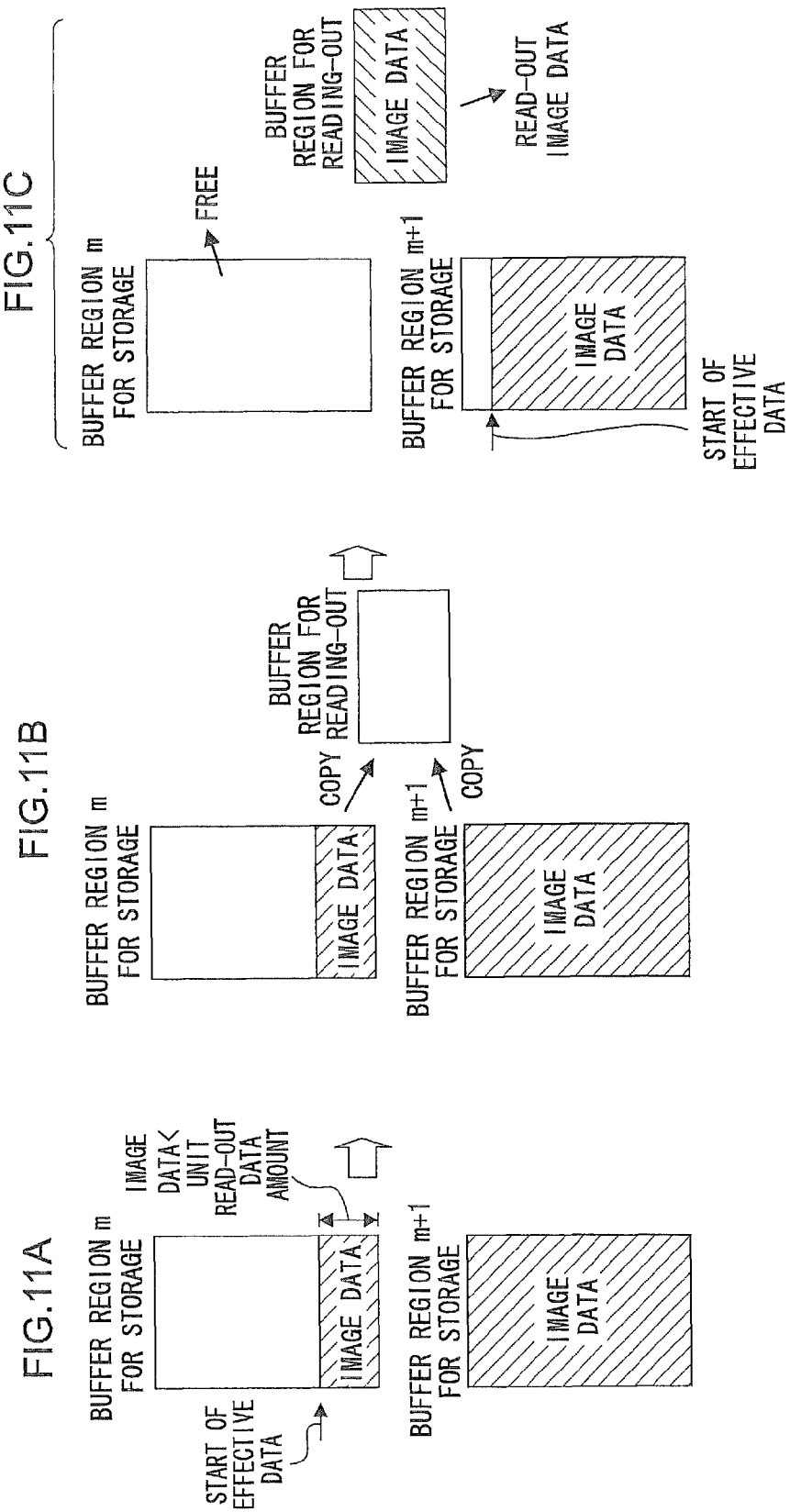

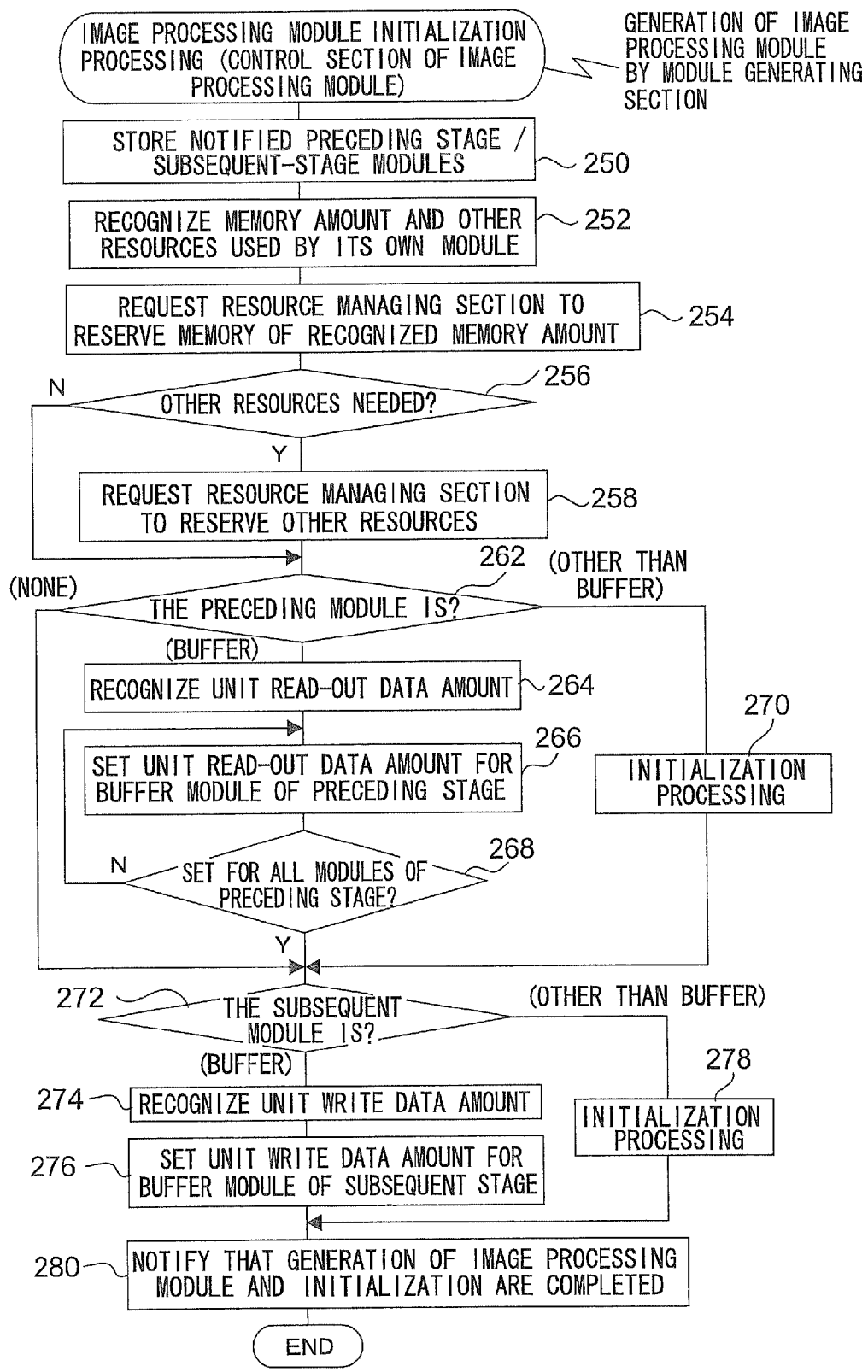

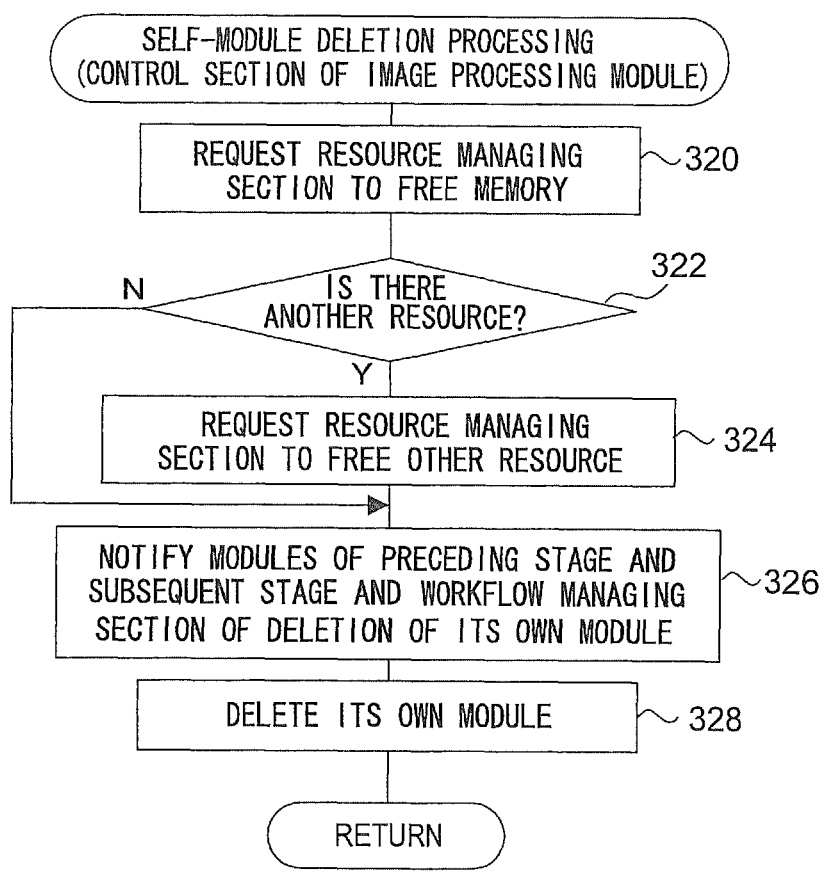

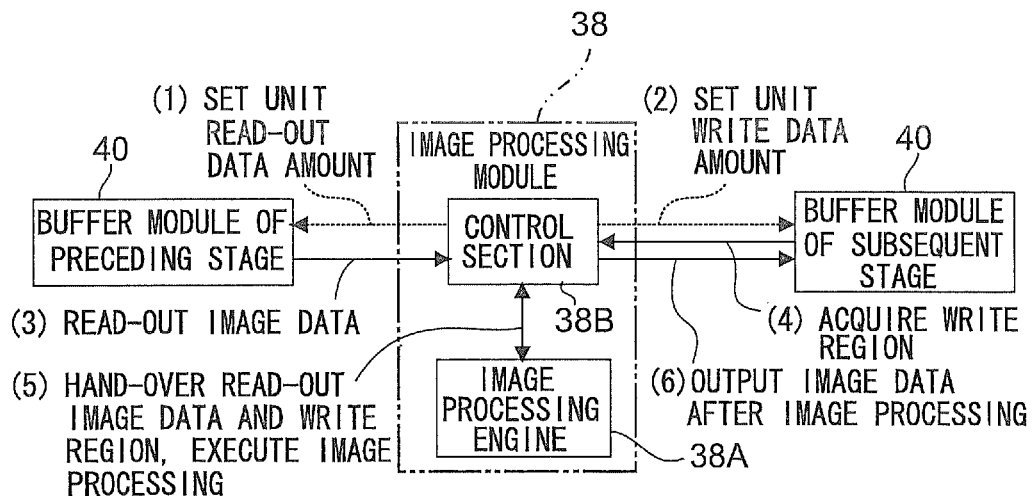
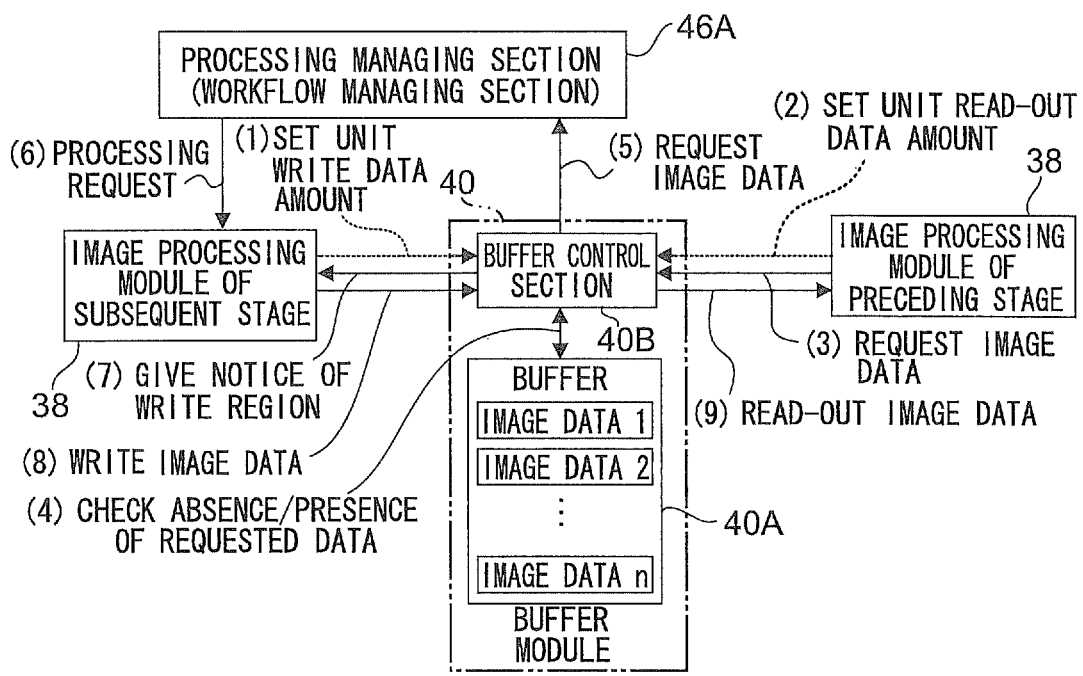

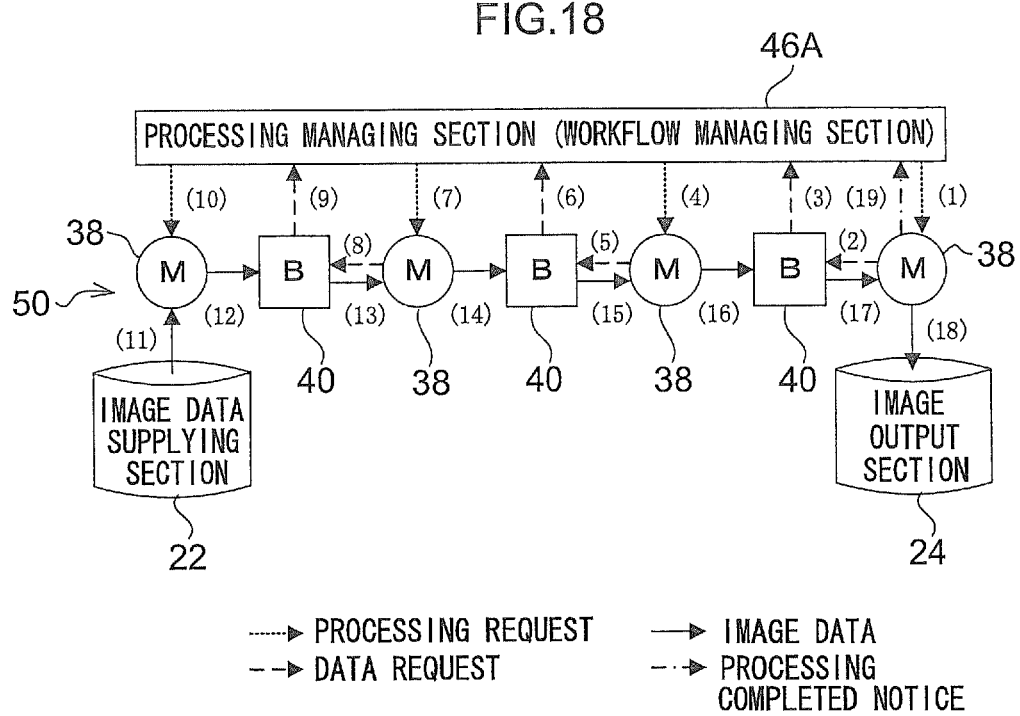

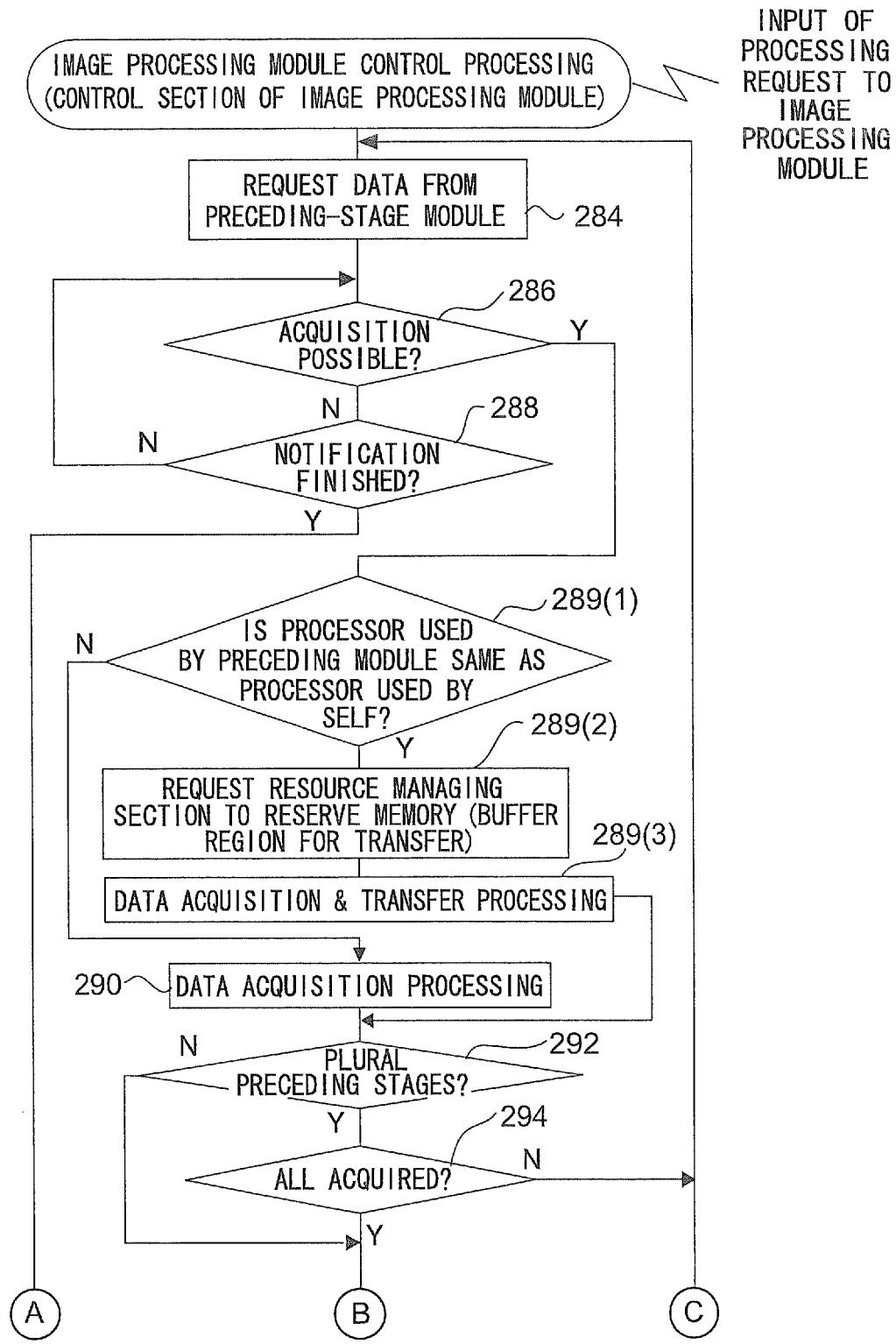

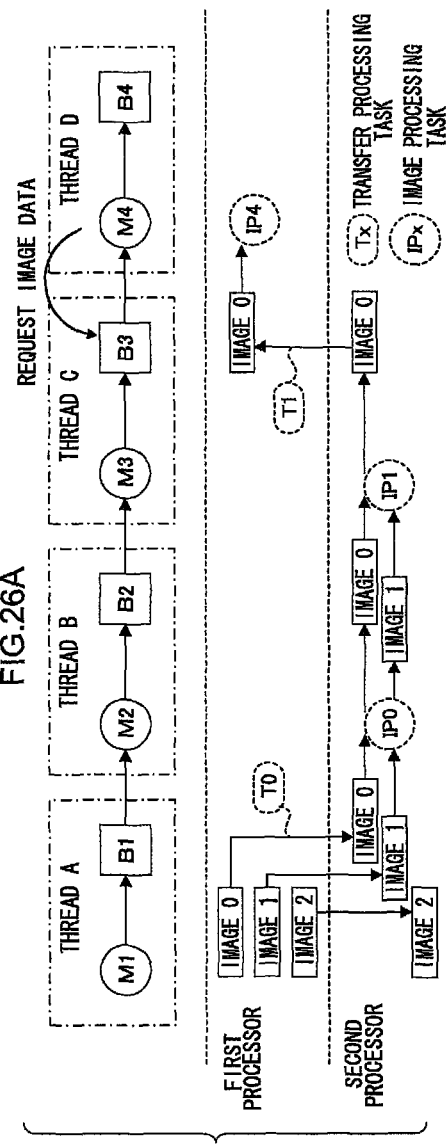
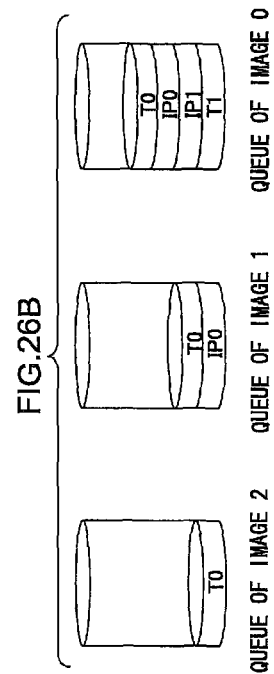
FIG.26A
FIG.26B

IMAGE PROCESSING DEVICE, IMAGE PROCESSING METHOD, AND RECORDING MEDIUM ON WHICH AN IMAGE PROCESSING PROGRAM IS RECORDED

CROSS-REFERENCE TO RELATED APPLICATIONS

This application claims priority under 35 USC 119 from Japanese Patent Application No. 2012-083052 filed on Mar. 30, 2012, the disclosure of which is incorporated by reference herein.

BACKGROUND OF THE INVENTION

1. Field of the Invention

The present invention relates to an image processing device, an image processing method and a recording medium on which an image processing program is recorded.

2. Description of the Related Art

Japanese Patent Application Laid-Open (JP-A) No. 2006-338500 and Japanese Patent Application Laid-Open (JP-A) No. 2006-338502 disclose image processing devices in which an image processing section is constructed by connecting image processing modules and buffer modules for storing image data, and that carry out a desired image processing due to an image processing module carrying out image processing on image data acquired from the module of the preceding stage and outputting processed image data to the module of the subsequent stage. Further, these documents also disclose techniques in which a buffer module outputs a request to a resource managing section and causes a memory region for storing image data to be reserved or freed.

In order to improve the computing capacity and make processing high-speed, there is the call for use of, in addition to a conventionally-used CPU (Central Processing Unit), an accelerator such as a GPU (Graphics Processing Unit) or the like whose specialty is image processing, i.e., to carry out processing by utilizing plural processors. Further, in recent years, processing devices equipped with plural CPUs have been becoming rare.

In a device that uses a single processor, a single memory space as well is used. However, in a device that uses plural processors, there are cases in which the plural processors use one memory space in common, and cases in which the plural processors use memory spaces that are physically or virtually different from one another.

SUMMARY OF THE INVENTION

An aspect of the present invention is an image processing device having: plural image processing modules that carry out image processings; at least one buffer module; and an image processing section in which the buffer module is connected at at least one of a preceding stage and a subsequent stage of the image processing module, wherein the buffer module carries out control that causes an image processing module of a preceding stage to write image data to a buffer that is reserved in a memory space corresponding to a processor that the image processing module of the preceding stage uses in image processing, and, in a case in which an image processing module, that uses in image processing a processor that is different than the processor used in image processing by the image processing module of the preceding stage, is connected at a subsequent stage, carries out transfer processing that transfers image data, that has been written into the buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer, and, in a case in which an image processing module, that uses in image processing a processor that is the same as the processor used in image processing by the image processing module of the preceding stage, is connected at the subsequent stage, carries out processing that causes the image processing module of the subsequent stage to read-out the image data that has been written into the buffer by the image processing module of the preceding stage.

BRIEF DESCRIPTION OF THE DRAWINGS

FIG. 2A shows the contents of initialization processing, FIG. 2B shows the contents of processing at the time of a memory reserving request in a third managing method, FIG. 2C shows the contents of processing at the time of a memory freeing request in the third managing method, FIG. 2D shows the contents of processing at the time of a resource reserving request, and FIG. 2E shows the contents of processing at the time of a resource freeing request;

FIG. 3 is a sequence diagram for explaining processing by an application;

FIG. 4A is a flowchart showing the contents of module generating processing that is executed by a module generating section, and FIG. 4B is a schematic drawing that explains a table of a workflow managing section;

FIGS. 5A-5C are block diagrams showing structural examples of an image processing section;

FIGS. 9A-9C are schematic drawings that explains processing in a case in which image data that is the object of writing extends over plural unit buffer regions for storage;

FIGS. 10A and 10B is a flowchart showing the contents of data read-out processing that is executed by the buffer control section of the buffer module;

FIGS. 11A-11C are schematic drawings showing processing in a case in which image data that is the object of read-out extends over plural unit buffer regions for storage;

FIG. 12 is a flowchart showing the contents of image processing module initialization processing that is executed by a control section of an image processing module;

FIG. 14 is a flowchart showing the contents of self-module deleting processing that is executed by the control section of the image processing module;

FIG. 15A is a block diagram showing the schematic structure of and processings executed by the image processing module, and FIG. 15B is a block diagram showing the schematic structure of and processings executed by the buffer module;

FIG. 18 is a schematic drawing that explains the flow of block unit processing and page unit processing;

FIGS. 25A and 25B is a flowchart showing the contents of image processing module control processing that is executed by the image processing module in a case in which the image processing module carries out transfer processing; and FIGS. 26A-26B are explanatory drawings that schematically explains the hiding of transfer processing that is realized by using threads and queues.

DETAILED DESCRIPTION OF THE INVENTION

Figure 1:
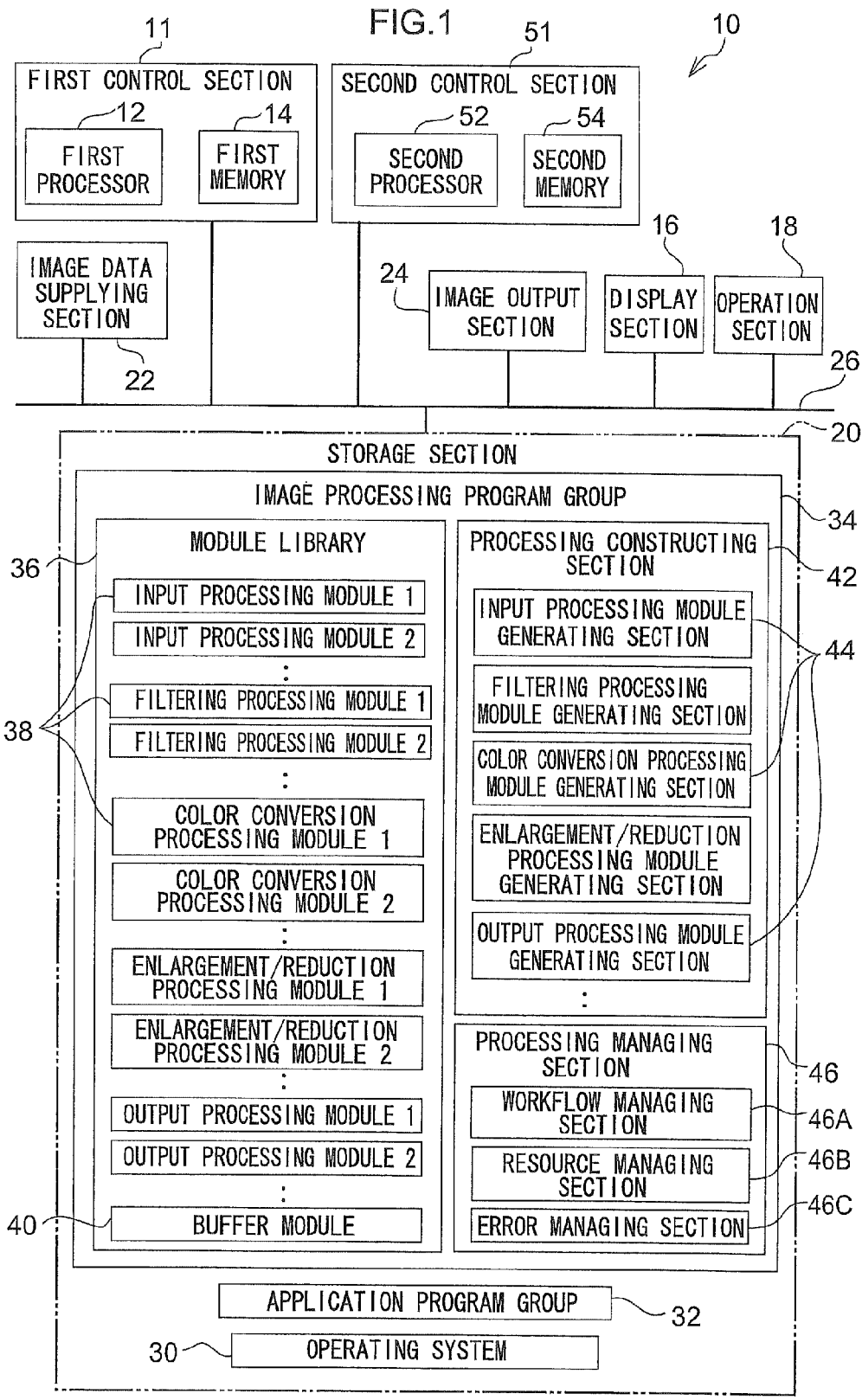
FIG. 1 is a block diagram showing the schematic structure of a computer (image processing device) relating to a present exemplary embodiment.

Examples of exemplary embodiments of the present invention are described in detail hereinafter with reference to the drawings. A computer 10 that can function as an image processing device relating to the present invention is shown in FIG. 1. Note that this computer 10 may be built into an arbitrary image handling device that must carry out image processings at the interior thereof, such as a copier, a printer, a fax machine, a multi-function device that has all of these functions, a scanner, a photographic printer, or the like. Or, the computer 10 may be an independent computer such as a personal computer (PC) or the like, or may be a computer that is built into a portable device such as a PDA (Personal Digital Assistant), a cell phone, or the like.

The computer 10 has a first control section 11, a second control section 51, a display section 16, an operation section 18, a storage section 20 that serves as a storage means, an image data supplying section 22, and an image output section 24, and these are connected to one another via a bus 26. The first control section 11 has a CPU (Central Processing Unit) 12 serving as a first processor, and a first memory 14. The CPU 12 operates as the main processor of the computer 10. The second control section 51 has a GPU (Graphics Processing Unit) 52 serving as a second processor, and a second memory 54. The GPU 52 is a processor whose specialty is image processing. Note that, here, the second processor is made to be the GPU 52, but the second processor is not limited to a GPU, and may be a CPU for example. Note that the exchange of information that is carried out between the CPU 12 and the GPU 52 can also be structured so as to be carried out by, for example, known inter-processor communication.

In a case in which the computer 10 is built-into an image handling device such as those mentioned above, a display panel formed from an LCD or the like, and a ten-key, or the like that are provided at the image handling device can be used as the display section 16 and the operation section 18. Further, in a case in which the computer 10 is an independent computer, the display and keyboard, mouse and the like that are connected to that computer can be used as the display section 16 and the operation section 18. Moreover, an HDD (Hard Disk Drive) is suitable as the storage section 20, but instead, another non-volatile storage means such as a flash memory or the like can also be used.

Further, it suffices for the image data supplying section 22 to be a section that can supply the image data that is the object of processing. For example, an image reading section that reads an image recorded on a recording material such as paper or photographic film or the like and outputs image data, or a receiving section that receives image data from the exterior via a communication line, or an image storage section that stores image data (the first memory 14, the second memory 54, or the storage section 20 that are described later), or the like can be used as the image data supplying section 22. Further, it suffices for the image output section 24 to be a section that outputs image data that has undergone image processing or an image that that image data expresses. For example, an image recording section that records an image expressed by image data onto a recording material such as paper or a photosensitive material or the like, or a display section that displays an image expressed by image data on a display or the like, or a writing device that writes image data to a recording medium, or a transmitting section that transmits image data via a communication line can be used as the image output section 24. Further, the image output section 24 may be an image storage section (the first memory 14, the second memory 54, or the storage section 20 that are described later) that simply stores the image data that has undergone image processing.

As shown in FIG. 1, the storage section 20 respectively stores, as various types of programs that are executed by the CPU 12: programs of an operating system 30 that governs management of resources, management of execution of programs by the CPU 12, communication between the computer 10 and the exterior, and the like; an image processing program group 34 that makes the computer 10 function as the image processing device relating to the present invention; and programs (shown as application program group 32 in FIG. 1) of various types of applications 32 that cause the image processing device, that is realized by the CPU 12 executing the aforementioned image processing program group, to carry out the desired image processing.

The image processing program group 34 is programs that were developed so as to be able to be used in common at various types of devices (platforms) such as various types of image handling devices, portable devices, PCs and the like, for the purpose of reducing the burden of development at the time of developing the above-described various types of image handling devices and portable devices, and for the purpose of reducing the burden of development at the time of developing image processing programs that can be used at PCs or the like. The image processing program group 34 corresponds to the image processing program relating to the present invention. In accordance with a construction instruction from the application 32, an image processing device that is realized by the image processing program group 34 constructs an image processing section that carries out image processing that the application 32 instructs, and, in accordance with an execution instruction from the application 32, carries out image processing by the image processing section (details of which are described later). The image processing program group 34 provides the application 32 with an interface for instructing construction of an image processing section that carries out a desired image processing (an image processing section of a desired structure), and for instructing execution of image processing by the constructed image processing section. Therefore, even in cases of newly developing an arbitrary device that must carry out image processing at the interior thereof, or the like, with regard to the development of a program that carries out the image processing, it suffices to only develop the application 32 that, by using the aforementioned interface, causes the image processing program group 34 to carry out the image processing needed at that device, and there is no need to newly develop a program that actually carries out the image processing. Therefore, the burden of development can be reduced.

Further, as described above, in accordance with a construction instruction from the application 32, the image processing device that is realized by the image processing program group 34 constructs an image processing section that carries out the image processing instructed by the application 32, and carries out image processing by the constructed image processing section. Therefore, for example, also in cases in which the color space or the number of bits per pixel of the image data that is the object of image processing is not fixed, or the contents, processes, parameters or the like of the image processing that is to be executed are not fixed, due to the application 32 instructing reconstruction of the image processing section, the image processing that is to be executed by the image processing device (the image processing section) can be changed flexibly in accordance with the image data that is the object of processing, or the like.

The image processing program group 34 is described hereinafter. As shown in FIG. 1, the image processing program group 34 can be broadly divided into a module library 36, programs of a processing constructing section 42 that corresponds to a constructing means, and programs of a processing managing section 46 that corresponds to a processing managing means. Although details are described later, in accordance with an instruction from an application, the processing constructing section 42 relating to the present exemplary embodiment constructs, as shown as examples in FIGS. 5A-5C, an image processing section 50 that is formed by one or more image processing modules 38 that carry out predetermined image processings, and buffer modules 40 that are disposed at at least one of the preceding stage of and the subsequent stage of the individual image processing modules 38 and that have a buffer for storing image data, being connected together in a pipeline form or a DAG form (Directed Acyclic Graph) form. The actual individual image processing modules that structure the image processing section 50 are a first program that is executed by the CPU 12 and is for causing a predetermined image processing to be executed at the CPU 12, or are a second program that is executed by the CPU 12 and is for instructing a processor other than the CPU 12 (the GPU 52 in the present exemplary embodiment) to execute processing (namely, the image processing module 38 itself is a program that is operated by the CPU 12, but is for requesting and causing the GPU 52, that is the second processor, to execute the image processing that that image processing module 38 executes). The programs of plural types of image processing modules 38, that carry out predetermined, respectively different image processings (e.g., inputting processing, filtering processing, color conversion processing, enlargement/reduction processing, skew angle sensing processing, image rotation processing, image composition processing, outputting processing, and the like) are respectively registered in the aforementioned module library 36.

As shown as an example in FIG. 15A as well, each of the image processing modules 38 is structured from an image processing engine 38A that carries out image processing on the image data in units of a predetermined unit processing data amount, and a control section 38B that carries out input and output of image data to and from the modules at the preceding stage and the subsequent stage of the image processing module 38 and carries out control of the image processing engine 38A. The unit processing data amount at each of the image processing modules 38 is selected/set in advance in accordance with the type of the image processing that the image processing engine 38A carries out, or the like, from among an arbitrary number of bytes such as one line of an image, plural lines of an image, one pixel of an image, an image of one page, or the like. For example, at the image processing module 38 that carries out color conversion processing or filtering processing, the unit processing data amount is one pixel. At the image processing module 38 that carries out enlargement/reduction processing, the unit processing data amount is one line of the image or plural lines of the image. At the image processing module 38 that carries out image rotation processing, the unit processing data amount is the image of one page. At the image processing module 38 that carries out image compression/decompression processing, the unit processing data amount is N bytes that depends on the execution environment.

Further, the image processing modules 38, at which the type of the image processing that the image processing engines 38A execute is the same but the contents of the image processings that are executed are different, also are registered in the module library 36. (In FIG. 1, these types of image processing modules are shown as "module 1", "module 2".) For example, for the image processing modules 38 that carry out enlargement/reduction processing, plural image processing modules 38 are respectively readied, such as the image processing module 38 that carries out reduction processing that reduces the inputted image data by 50% by thinning every other pixel, and the image processing module 38 that carries out enlargement/reduction processing on inputted image data at an instructed enlargement/reduction rate, and the like. Further, for example, for the image processing modules 38 that carry out color conversion processing, the image processing module 38 that converts RGB color space into CMY color space, and the image processing module 38 that converts in the opposite way, and the image processing module 38 that carries out another color space conversion such as the L*a*b* color space or the like, are respectively readied.

Further, in order to input the image data that is needed in order for the image processing engine 38A to carry out processing in units of the unit processing data amount, the control section 38B of the image processing module 38 acquires image data in units of the read-out data amount from the module (e.g., the buffer module 40) at the preceding stage of its own module, and outputs the image data, that is outputted from the image processing engine 38A, to the module of the subsequent stage (e.g., the buffer module 40) in units of the unit writing data amount. (If image processing that is accompanied by an increase or reduction in the amount of data, such as compression or the like, is not carried out at the image processing engine 38A, the unit writing data amount is equal to the unit processing data amount.) Or, the control section 38B carries out the processing of outputting, to the exterior of its own module, the results of image processing by the image processing engine 38A (e.g., in a case in which the image processing engine 38A carries out image analysis processing such as skew angle sensing processing or the like, there are cases in which the image analysis processing results, such as the results of the skew angle sensing or the like, are outputted instead of image data). The image processing modules 38, at which the types and contents of the image processings that the image processing engines 38A execute are the same but the aforementioned unit processing data amounts, unit read-out data amounts or unit writing data amounts are different, also are registered in the module library 36. For example, it was previously described that the unit processing data amount at the image processing module 38 that carries out image rotation processing is the image of one page, but the image processing module 38, that carries out the same image rotation processing but whose unit processing data amount is one line of the image or plural lines of the image, may also be included in the module library 36.

Further, the programs of the individual image processing modules 38 that are registered in the module library 36 are structured from programs that correspond to the image processing engines 38A and programs that correspond to the control sections 38B. The program that corresponds to the control section 38B is made into a part. Among the individual image processing modules 38, for the image processing modules 38 that have the same unit read-out data amounts and unit writing data amounts, a program is used in common for the control sections 38B regardless of the type or the contents of the image processings that are executed at the image processing engines 38A (the same program is used as the program that corresponds to the control sections 38B). Due thereto, the burden of development in developing programs of the image processing modules 38 is reduced.

Note that, among the image processing modules 38, there are modules at which, in a state in which the attributes of the inputted image are not yet known, the unit read-out data amount and the unit writing data amount are not set, and the attributes of the inputted image data are acquired, and, by carrying out computation by substituting the acquired attributes into a predetermined computational formula, the unit read-out data amount or the unit writing data amount is determined. With regard to this type of image processing modules 38, it suffices to use in common a program that corresponds to the control sections 38B, for the image processing modules 38 at which the unit read-out data amount and the unit writing data amount are derived by using the same computational formula. Further, the image processing program group 34 relating to the present exemplary embodiment can be installed in various types of devices such as described above, and the numbers and types and the like of the image processing modules 38 that are registered in the module library 36 of the image processing program group 34 can, of course be added, deleted, or substituted appropriately in accordance with the image processings that are required at the various types of devices in which the image processing program group 34 is installed.

As shown as an example in FIG. 15B as well, each of the buffer modules 40 that structure the image processing section 50 is structured from a buffer 40A that is structured by a memory region that is reserved through the operating system 30 from the first memory 14 or the second memory 54 that are provided at the computer 10, and a buffer control section 40B that carries out input and output of image data to and from the modules at the preceding stage and the following stage of the buffer module 40 and management of the buffer 40A. The buffer control section 40B itself of each of the buffer modules 40 is a program that is executed by the CPU 12, and the programs of the buffer control sections 40A also are registered in the module library 36. (In FIG. 1, the programs of the buffer control sections 40B are shown as "buffer modules".) Note that buffer 40A is a buffer that is reserved in the memory that is provided in correspondence with the processor that the image processing module of the preceding stage uses in image processing (the first memory 14 if the processor that is used is the CPU 12, and the second memory 54 if the processor that is used is the GPU 52).

Further, the processing constructing section 42, that constructs the image processing section 50 in accordance with an instruction from the application 32, is structured from plural types of module generating sections 44 as shown in FIG. 1. The plural types of module generating sections 44 correspond to image processings that differ from one another. Due to the module generating sections 44 being started-up by the application 32, the module generating sections 44 carry out the processing of generating a module group that is formed from the image processing modules 38 and the buffer modules 40 for realizing the corresponding image processings.

In the present exemplary embodiment, the application 32 designates, to the module generating sections 44, which processor among the CPU 12 or the GPU 52 the image processing is to be carried out at, and causes the module generating sections 44 to generate the respective image processing modules 38. In accordance with the designation, the module generating section 44 generates the image processing module 38 that carries out the image processing by using the designated processor. Note that the image processing modules 38, that carry out image processings by using the CPU 12 that is the first processor, use the memory space of the first memory 14 that is provided so as to correspond to the CPU 12. Further, the image processing modules 38, that carry out image processings by using the GPU 52 that is the second processor, use the memory space of the second memory 54 that is provided so as to correspond to the GPU 52. Note that, with regard to the latter image processing modules 38 that carry out image processings by using the GPU 52, these image processing modules 38 themselves operate on the CPU 12 that is the main processor, but, for the image processings thereof, the CPU 12 sends a request to the GPU 52, and the GPU 52 is made to execute these image processings.

Note that, as examples of the module generating sections 44, FIG. 1 illustrates the module generating sections 44 that correspond to the types of image processings that are executed by the individual image processing modules 38 that are registered in the module library 36. However, the image processings corresponding to the individual module generating sections 44 may be image processings that are realized by plural types of the image processing modules 38 (e.g., skew correction processing that is formed from skew angle sensing processing and image rotation processing). In a case in which the image processing that is required is a processing that combines plural types of image processings, the application 32 successively starts-up the module generating sections 44 corresponding to the respective plural types of image processings. Due thereto, the image processing section 50, that carries out the needed image processing, is constructed by the module generating sections 44 that are successively started-up by the application 32.

Further, as shown in FIG. 1, the processing managing section 46 is structured to include a workflow managing section 46A, a resource managing section 46B and an error managing section 46C. Here, the programs of all of the workflow managing section 46A, the resource managing section 46B and the error managing section 46C also are executed by the CPU 12 that is the main processor.

The workflow managing section 46A controls the execution of the image processings at the image processing section 50. The resource managing section 46B manages the utilization of the first memory 14 and the second memory 54 by the respective modules of the image processing section 50, and the utilization of the resources of the computer 10. The error managing section 46C manages errors that occur at the image processing section 50.

Note that the image processing section 50 that is constructed by the processing constructing section 42 can operate such that the individual image processing modules 38 that structure the image processing section 50 carry out image processings in parallel while handing-over image data to the subsequent stages in units of data amounts that are smaller than the image of one page (called block unit processing), and also, can operate such that, after the image processing module 38 of the preceding stage has completed image processing with respect to the image data of the image of one page, the image processing module 38 of the subsequent stage carries out image processing on the image data of the image of one page (called page unit processing). A program for causing the image processing section 50 to carry out block unit processing, and a program for causing the image processing section 50 to carry out page unit processing, are respectively readied as programs of the workflow managing section 46A.

Figure 21:
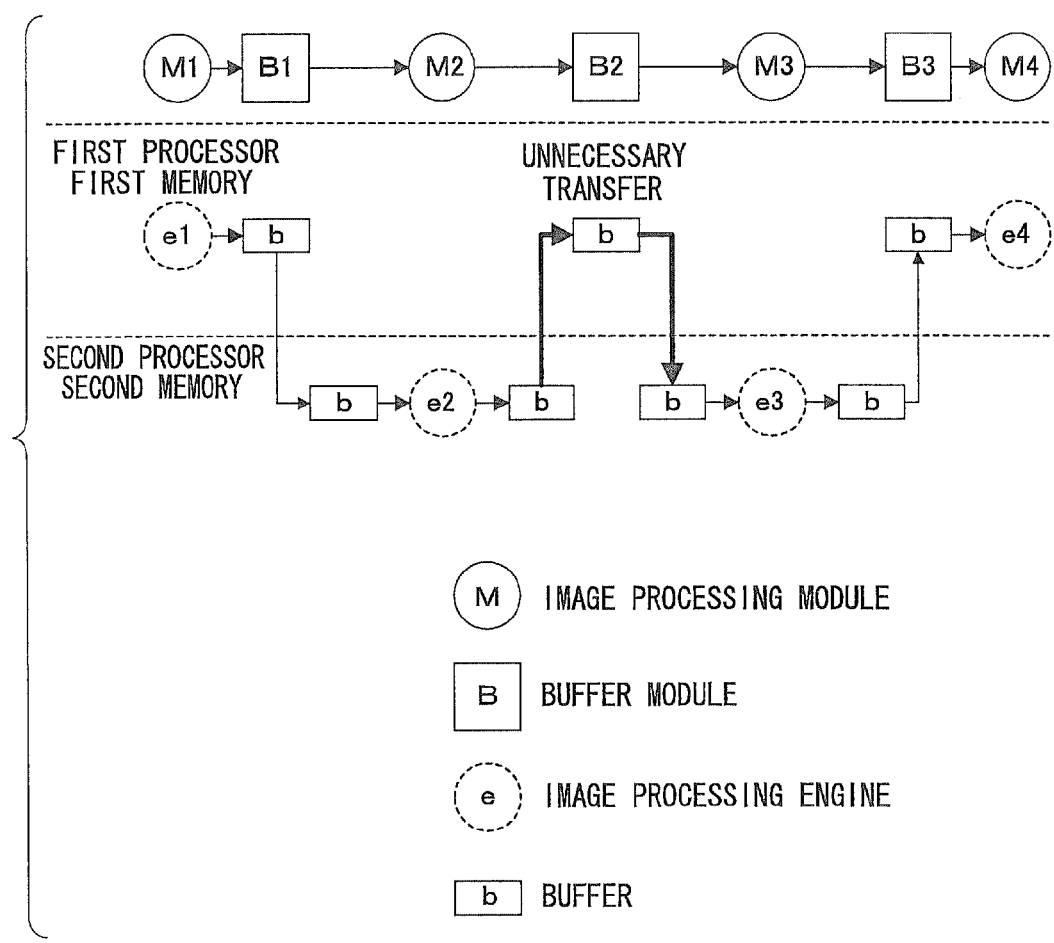
FIG. 21 is an explanatory drawing that explains problems that arises in a case of applying a method of handing-over image data when the image processing section is constructed by using a single processor, as a method of handing-over image data when the image processing section is constructed by using plural processors.

Operation of the present exemplary embodiment is described next. In the present exemplary embodiment, the image processing section is constructed by using plural processors. Therefore, if an image processing section, in which plural modules are connected, were to be constructed by using only a single processor (a main processor), and the method of transferring image data at the time of image processing were to be applied as is in the present exemplary embodiment, there would be cases in which unforeseen problems would arise at the image processing section that uses only the main processor. These problems are described with reference to FIG. 21.

In a case in which the processor that is used is the main processor singly, the memory space that is used at the respective modules also is a single memory space, and therefore, the buffer (memory region) in which the buffer module 40 holds the image data is reserved on the memory space that is the same as the memory space that corresponds to the processor on which the modules that are connected before and after operate. Accordingly, in this case, transfer of data that uses the memory space corresponding to the main processor is always carried out.

When this method of data transfer in an image processing section that uses a single processor is applied as is also to an image processing section that used two processors (a first processor and a second processor), the buffer that the buffer module 40 holds is always reserved in the memory space that corresponds to the main processor. For example, given that the main processor is the first processor, the buffer of the buffer memory 40 is always allocated to (reserved in) the first memory that is the memory space that corresponds to the first processor.

On the other hand, the image processing module 38 that carries out image processing by using the second processor writes the image data, after the image processing, in a memory region that is reserved in the second memory that corresponds to the second processor.

Therefore, even in a case in which the image processing modules 38 that carry out image processings by using the second processor are connected, the image data, that these image processing modules 38 process and that is written into the second memory, is written temporarily to the buffer of the buffer module 40 (a buffer that is reserved in the first memory) that is connected between these image processing modules 38, and further, must be rewritten to the second memory. This is intrinsically unnecessary data transfer, and is also a cause of decrease in the processing speed.

Thus, in the present exemplary embodiment, the buffer module 40 that is generated by the module generating section 44 reserves a buffer, that is the output destination of the image data that the image processing module 38 of the preceding stage has processed, in the memory space that corresponds to the processor that the image processing module 38 of the preceding stage uses in image processing. Further, in a case in which the image processing module 38, that uses in image processing a processor that is the same as the processor that is used in image processing by the image processing module 38 of the preceding stage, is connected to the subsequent stage of the buffer module 40, the buffer module 40 hands the address of the aforementioned reserved buffer over to the image processing module 38. Further, in a case in which the image processing module 38, that uses in image processing a processor that is different than the processor that is used in image processing by the image processing module 38 of the preceding stage, is connected to the subsequent stage of the buffer module 40, the buffer module 40 separately reserves a buffer for transfer in the memory that corresponds to the processor that the image processing module 38 of the subsequent stage uses, and carries out processing to transfer the image data, so that it becomes possible for that image processing module 38 of the subsequent stage to acquire and use the image data from the preceding stage. The reserving of the buffer (memory region) is carried out via the resource managing section 46B. Details thereof are described later.

Figure 2A:
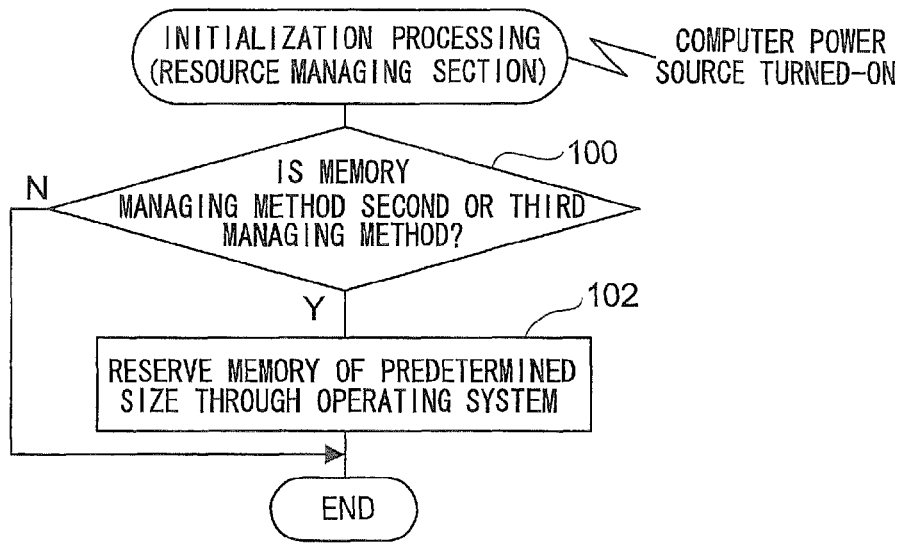
FIGS. 2A through 2E are flowcharts showing contents of processings that are executed by a resource managing section, where

In the present exemplary embodiment, when the power of the computer 10 is turned on, the resource managing section 46B is started-up, and the initialization processing shown in FIG. 2A is carried out by the resource managing section 46B.

In the present exemplary embodiment, the following three types of managing methods are readied as methods of managing memory by the resource managing section 46B: a first managing method in which, each time there is a request from an individual module of the image processing section 50, a memory region that is to be allocated to the module that is the source of the request is reserved from the first memory 14 or the second memory 54; a second managing method in which a memory region of a given size is reserved in advance from the memory space corresponding to each processor, and, when there is a request from an individual module, a partial region of the memory region that was reserved in advance is allocated to the module that is the source of the request; and a third managing method in which a memory region of a given size is reserved in advance from the memory space corresponding to each processor, and, when there is a request from an individual module, if the size of the requested memory region is less than a threshold value, a partial region of the memory region that was reserved in advance is allocated to the module that is the source of the request, and, if the size of the requested memory region is greater than or equal to the threshold value, a memory region that is to be allocated to the module that is the source of the request is reserved. It is possible to select and set by which of these managing methods the memory management is to be carried out. Note that the present invention is not limited to these methods, and other memory managing methods may be included.

The managing method is selected as follows for example. The first managing method is suitable particularly in cases such as when it is used from an application that does not have memory limits or the like and it is desired to suppress an increase in the program size due to complex memory management, or the like. Further, the second managing method is suitable in cases in which the memory amount that can be used by the entire application that carries out image processing in accordance with the present invention is limited, and there is the need to operate within this range. On the other hand, the third managing method is suitable in cases in which the processing time needed for reserving or freeing the memory must be made to be high-speed, because the overhead may become large when using the memory reserving/freeing function of the operating system 30 in reserving or freeing minute memory regions.

In step 100 of the initialization processing shown in FIG. 2A, it is judged whether or not the memory managing method that is selected/set is the second managing method or the third managing method. Note that the memory managing method may be selected/set at the time of installing the image processing program group 34 into the computer 10. Or, the resource managing section 46B may acquire the system environment of the computer 10 (e.g., the sizes of the first memory 14 and the second memory 54, the type of device in which the image processing program group 34 is packaged, or the like) and select/set the memory managing method automatically on the basis of the acquired system environment.

When the memory managing method is the first managing method, the aforementioned judgment is negative, and the initialization processing ends. However, when the aforementioned judgment is affirmative, the routine moves on to step 102 where memory regions (continuous regions) of a predetermined size are reserved through the operating system 30 from the first memory 14 or the second memory 54 that are provided at the computer 10, and the routine ends. Note that the aforementioned predetermined size as well may be selected/set in accordance with the system environment or the like.

Here, when the memory managing method is the first managing method, in response to a memory reserving request that arises thereafter, the requested memory region is reserved through the operating system 30, and further, in response to a memory freeing request, the memory region is freed similarly through the operating system 30. These processings are similar to those used in usual programs, and therefore, description thereof is omitted.

Further, when the memory managing method is the second managing method, in response to a memory reserving request that arises thereafter, a memory region of a size corresponding to the request is searched for and reserved from unused regions whose state is "unused" among the memory regions that were reserved in advance in prior step 102, and the state of the reserved memory region is changed to "used", and the reserved memory region is handed over to the source of the request. With regard to a memory freeing request, the memory region for which freeing has been requested is incorporated into the unused regions among the memory regions that were reserved in advance, and processing that changes the state of the incorporated memory region from "used" to "unused" is carried out. Information that expresses whether the state of a memory region is unused or used can be managed in, for example, a table or a list or the like.

Figure 2B:
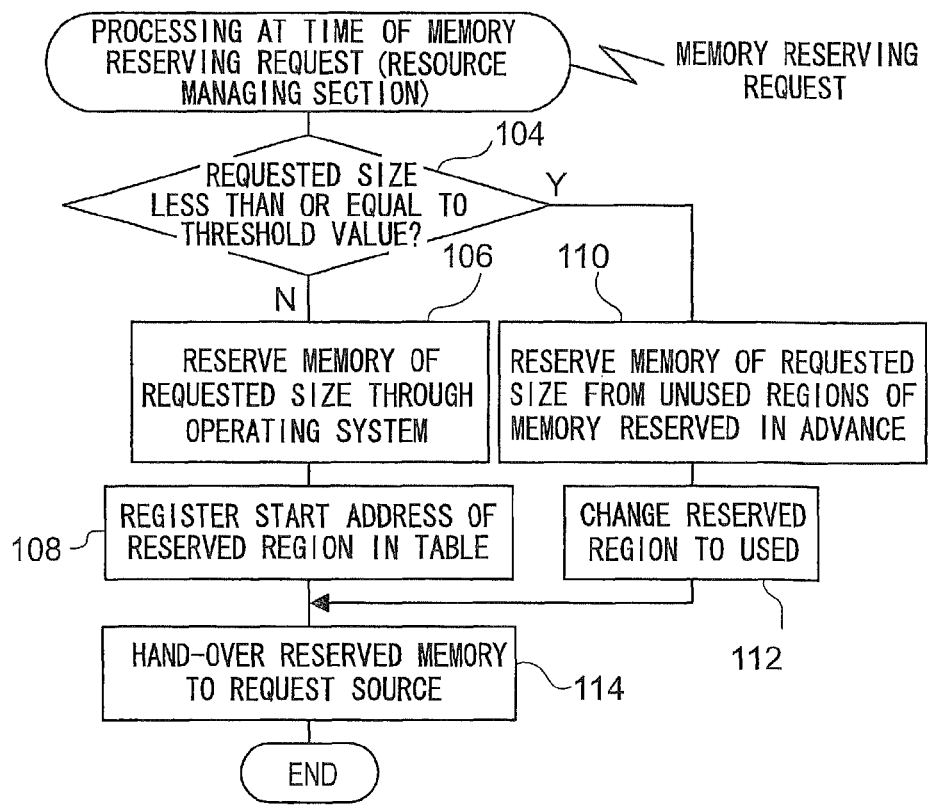

A case in which the memory managing method is the third managing method is described next. In a case in which the memory managing method is the third managing method, when a memory reserving request arises, the processing at the time of a memory reserving request that is shown in FIG. 2B is carried out by the resource managing section 46B. In the processing at the time of a memory reserving request, first, it is judged in step 104 whether or not the requested size is less than or equal to a predetermined threshold value. When the requested size is not less than or equal to the threshold value, in the same way as in the first managing method, in step 106, a memory region of the requested size is reserved through the operating system 30, and in step 108, the start address of the reserved memory region is registered in a table within the resource managing section 46B. Note that, instead of a table, another means such as a list or an associative array or the like may be used. When it is judged in step 104 that the requested size is less than or equal to the threshold value, in the same way as in the second managing method, a memory region of the requested size is reserved (step 110) from the unused regions among the memory regions that were reserved in advance in prior step 102, and the state of the reserved region is changed to "used" (step 112). Then, in step 114, the reserved memory region is handed over to the source of the request.

Figure 2C:
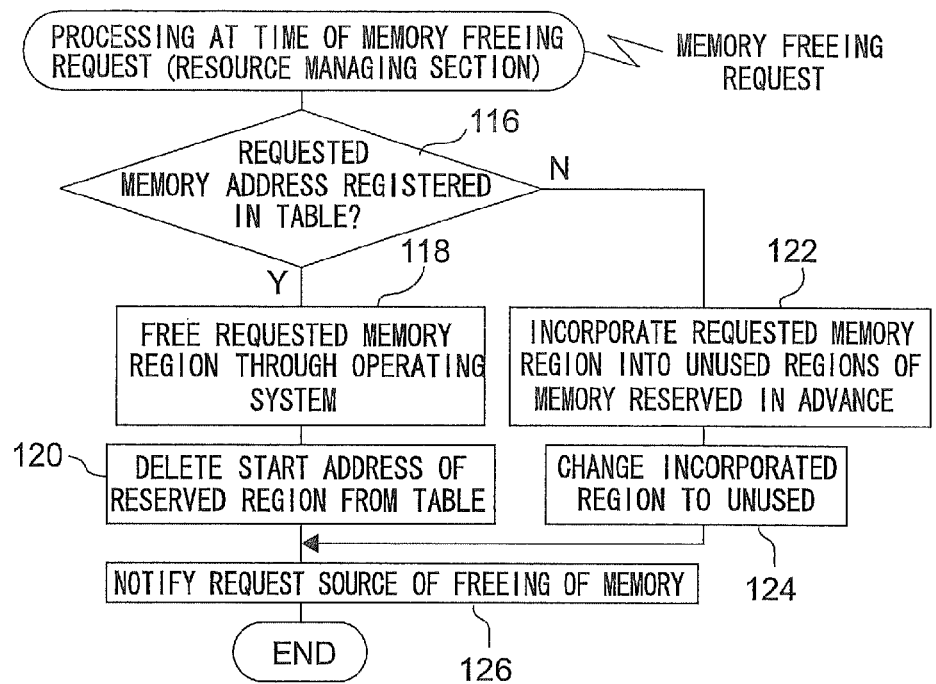

Further, in a case in which the memory managing method is the third managing method, when a memory freeing request arises, the processing at the time of a memory freeing request that is shown in FIG. 2C is carried out by the resource managing section 46B. In the processing at the time of a memory freeing request, first, in step 116, it is judged whether or not the start address of the memory region for which freeing is requested is registered in the aforementioned table. If the judgment in step 116 is affirmative, the memory region for which freeing is being requested is a memory region that was reserved through the operating system 30, and therefore, in step 118, the memory region for which freeing is requested is freed through the operating system 30. In next step 120, the start address of the memory region for which freeing is requested is deleted from the aforementioned table.

Further, when the judgment in step 116 is negative, the memory region for which freeing is requested is a memory region that was reserved from the memory regions that were reserved in advance in prior step 102. Therefore, in step 122, the memory region for which freeing is requested is incorporated into the unused regions among the memory regions that were reserved in advance, and the state of the incorporated memory region is changed in step 124 to "unused". After such processings, in step 126, the source of the request is notified of the freeing of the requested memory region, and the processing at the time of a memory freeing request ends.

A case in which the resource managing section 46B is requested to reserve/free a resource other than a memory (e.g., a specific file or the like) is described next.

Figure 2D:
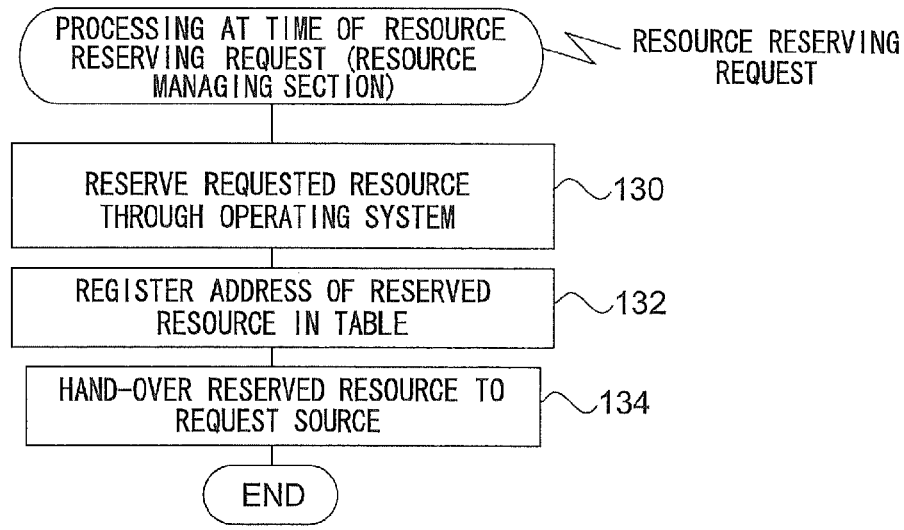

When a resource reserving request is inputted, the resource managing section 46B carries out the processing at the time of a resource reserving request that is shown in FIG. 2D. In the processing at the time of a resource reserving request, first, in step 130, the resource for which reserving was requested is reserved through the operating system 30. In next step 132, the address of the reserved resource is registered in a table within the resource managing section 46B in correspondence with information that identifies the module that is the source of the request. In step 134, the reserved resource is handed over to the source of the request, and processing ends.

Figure 2E:
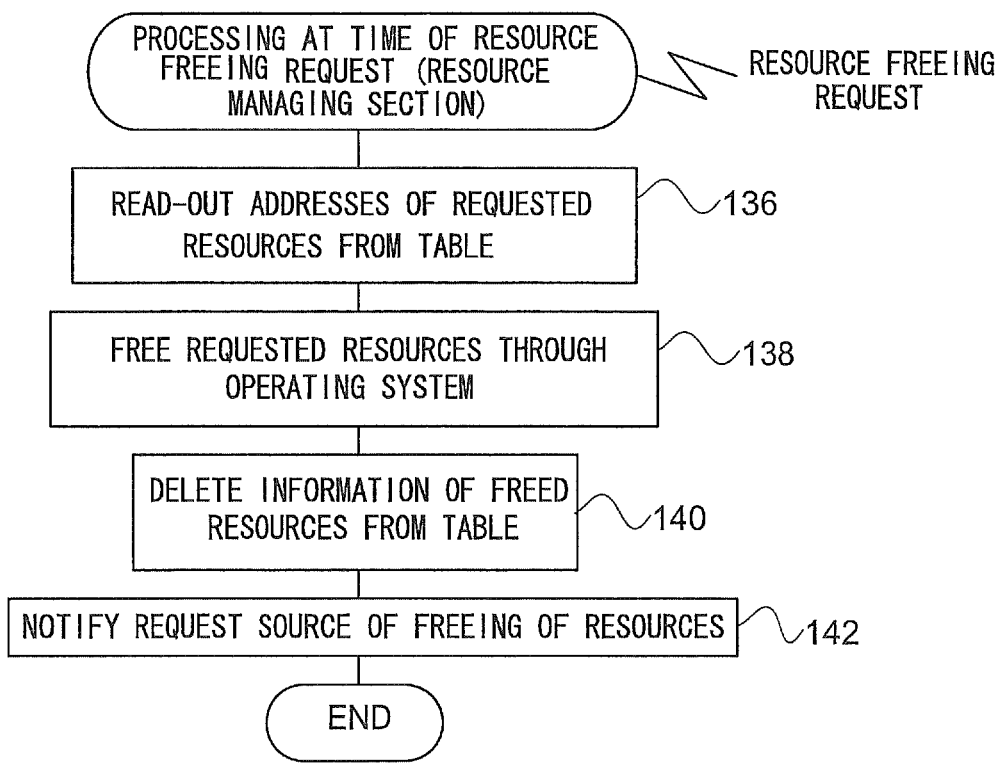

Further, when a resource freeing request is inputted, the resource managing section 46B carries out the processing at the time of a resource freeing request that is shown in FIG. 2E. In the processing at the time of a resource freeing request, first, in step 136, information (the address of the reserved resource), that was registered in the table within the resource managing section 46B in correspondence with information identifying the module that is the source of the request, is read-out. In next step 138, all of the resources that are expressed by the read-out information are freed through the operating system 30. Further, in step 140, the table is updated so as to delete, from the table, the information corresponding to the freed resources. In next step 142, the source of the request is notified of the freeing of the resources, and processing ends.

In this way, in the reserving/freeing of resources other than memory, a reserved resource is registered in a table at the time of reserving, and, at the time of freeing, the resources registered in the table (the resources reserved in accordance with requests from a same request source) are all freed. Therefore, as compared with a method in which the source of a resource freeing request requests freeing by designating the resource that is the object of freeing, omissions in the freeing of resources can be prevented from arising. Note that in these memory and resource reserving/freeing processings, there are cases in which processing fails due to an insufficiency of resources or the like, and in these cases, processing such as notifying the error managing section 46C or the like is needed. However, description of these error processings is omitted in order to simplify explanation.

On the other hand, in a device in which the image processing program group 34 is installed, when a situation arises in which some type of image processing must be carried out, that situation is sensed by a specific one of the applications 32, and the processing shown in FIG. 3 is carried out by that application 32. Note that the following are examples of a situation in which image processing must be carried out: a case in which a user instructs execution of a job in which an image is read by an image reading section that serves as the image data supplying section 22, and is recorded as an image on a recording material by an image recording section that serves as the image output section 24, or is displayed as an image on a display section that serves as the image output section 24, or image data is written on a recording medium by a writing device that serves as the image output section 24, or image data is transmitted by a transmitting section that serves as the image output section 24, or image data is stored in an image storage section that serves as the image output section 24; or a case in which a user instructs execution of a job that carries out any of the aforementioned recording onto a recording material, display on a display section, writing onto a recording medium, transmission, or storage in an image storage section, on image data that is received by a receiving section that serves as the image data supplying section 22 or is stored in an image storage section that serves as the image data supplying section 22. Further, situations in which image processing must be carried out are not limited to those described above, and may be, for example, a case in which, in a state in which the names or the like of processings that the application 32 can execute are displayed in a list on the display section 16 in accordance with an instruction from a user, the user selects the processing that is the object of execution, or the like.

As described above, when it is sensed that a situation in which some type of image processing must be carried out has arisen, the application 32 first recognizes the type of the image data supplying section 22 that supplies the image data that is the object of image processing (refer also to step 150 of FIG. 3), and, when the recognized type is a buffer region (a partial region of the first memory 14) (i.e., when the judgment in step 152 of FIG. 3 is affirmative), the application 32 generates the buffer module 40 that includes the buffer region designated as the image data supplying section 22 (refer also to step 154 of FIG. 3). In the new generation of the buffer module 40 that is described later, the buffer control section 40B is generated by generating a process, thread or object that executes the program of the buffer control section 40B of the buffer module 40, and the memory region that is used as the buffer 40A is reserved by the generated buffer control section 40B. However, the generation of the buffer module 40 in this step 154 is achieved by setting a parameter that causes (the buffer control section 40) to recognize a designated buffer region as the buffer 40A that is already reserved, and carrying out processing that generates the buffer control section 40B. The buffer module 40 that is generated here functions as the image data supplying section 22.

Next, in the same way as described above, the application 32 recognizes the type of the image output section 24 that serves as the output destination of the image data on which the image processing is carried out (refer also to step 156 of FIG. 3), and, when the recognized type is a buffer region (a partial region of the first memory 14) (i.e., when the judgment in step 158 of FIG. 3 is affirmative), the application 32 generates, in the same way as described above, the buffer module 40 that includes the buffer region designated as the image output section 24 (refer also to step 160 of FIG. 3). The buffer module 40 that is generated here functions as the image output section 24. Moreover, the application 32 recognizes the contents of the image processing that is to be executed, and divides the image processing that is to be executed into a combination of image processings of levels that correspond to the individual module generating sections 44, and judges the types of the image processings that are needed in order to realize the image processing that is to be executed, and the order of execution of the individual image processings (refer also to step 162 of FIG. 3). Note that this judgment can be realized by, for example, registering the aforementioned types of image processings and orders of execution of the individual image processings in advance as information in correspondence with types of jobs for which users can instruct execution, and the application 32 reading-out the information that corresponds to the type of the job for which execution is instructed.

Further, on the basis of the types of the image processings and the order of execution that were judged above, the application 32 first starts-up the module generating section 44 that corresponds to the image processing that is first in the order of execution (generates a process, thread or object that executes the program of the module generating section 44) (refer also to step 164 of FIG. 3). Thereafter, the application 32 informs the started-up module generating section 44 of the following as information that is necessary to the generation of a module group by that module generating section 44, and instructs the module generating section 44 to generate the corresponding module group (refer also to step 166 of FIG. 3): information that designates the processors that the respective generated image processing modules 38 are to use in the image processings, input module identification information for identifying the input module that inputs the image data to the module group, output module identification information for identifying the output module to which the module group is to output the image data, input image attribute information that expresses the attributes of the input image data that is inputted to the module group, and parameters of the image processing that is to be executed. Note that the processor that is used in the module generating processing of the module generating section 44 is the CPU 12 that is the main processor. Namely, the individual module generating groups 44 operate on the CPU 12.

Note that, with regard to the aforementioned input module, for the module group that is first in the order of execution, the image data supplying section 22 is the input module, and for the module groups that are second or after in the order of execution, the final module of the module group of the preceding stage (usually, the buffer module 40) is the input module. Further, with regard to the aforementioned output module, for the module group that is last in the order of execution, the image output section 24 is the output module, and therefore, the image output section 24 is designated as the output module. However, for the other module groups, the output module is undetermined, and therefore, designation thereof by the application 32 is not carried out, and the output module is generated/set by the module generating section 44 as needed. Further, for example, the input image attributes and the parameters of the image processing may be registered in advance as information in correspondence with types of jobs for which users can instruct execution, and the application 32 may recognize the input image attributes and image processing parameters by reading-out the inform nation that corresponds to the type of the job for which execution has been instructed. Or, the user may designate the input image attributes and image processing parameters.

On the other hand, when the module generating section 44 is started-up by the application 32, the module generating section 44 carries out the module generating processing shown in FIG. 4A (refer also to step 168 of FIG. 3). In the module generating processing, first, in step 200, it is judged at this module generating section 44 whether or not there is an image processing module 38 that is to be generated next. When the judgment is negative, the module generating processing ends. When there is an image processing module 38 that is to be generated, in step 202, input image attribute information, that expresses the attributes of the input image data that is to be inputted to the image processing module 38 to be generated, is acquired. In next step 204, it is judged whether or not, also in view of the attributes of the input image data expressed by the information acquired in step 202, there is the need to generate the image processing module 38 that was judged to be generated in prior step 200.

Concretely, in a case in which, for example, the module generating section 44 that corresponds to the module generating processing that is being executed is a module generating section that generates a module group that carries out color conversion processing, and the CMY color space is designated from the application 32 as the color space of the output image data from the parameters of the image processing, if it is ascertained, on the basis of the input image attribute information acquired in step 202, that the input image data is data of the RGB color space, the image processing module 38 that carries out RGB→CMY color space conversion must be generated as the image processing module 38 that carries out the color space processing. However, if the input image data is data of the CMY color space, the attribute of the input image data and the attribute of the output image data coincide in so far as the color space, and therefore, it can be judged that generation of the image processing module 38 that carries out color space conversion processing is unnecessary. When generation is judged to be unnecessary, the routine returns to step 200.

Note that, in a case in which a buffer module 40 exists at the preceding stage of the image processing module 38 that is generated, the processing of acquiring the attributes of the input image data can be realized by acquiring the attributes of the output image data from the image processing module 38 of the further preceding stage that writes the image data to that buffer module 40.

In next step 206, it is judged whether or not the buffer module 40 is needed at the subsequent stage of the image processing module 38 that is generated. This judgment is negative and the routine moves on to step 210 without carrying out generating of the buffer module 40, in a case in which the subsequent stage of the image processing module is an output module (the image output section 24) (for example, refer to the image processing module 38 that is the final stage in the image processing sections 50 shown in FIGS. 5A through 5C), or in a case in which the image processing module is a module that carries out image processing, such as analysis or the like with respect to image data, and outputs the results thereof to another image processing module 38, such as the image processing module 38 that carries out skew angle sensing processing in the image processing section 50 shown in FIG. 5B for example. In cases other than those described above, the judgment is affirmative and the routine moves on to step 208 where, by starting-up the buffer control section 40B (generating a process, thread or object that executes the program of the buffer control section 40B), the buffer module 40 that is connected to the subsequent stage of the image processing module is generated. When the buffer control section 40B is started-up by the module generating section 44 (or by the above-described application 32), the buffer control section 40B carries out the buffer control processing shown in FIG. 6. This buffer control processing is described later.

In next step 210, the information of the module of the preceding stage (e.g., the buffer module 40) and the information of the buffer module 40 of the subsequent stage, and the attributes of the input image data that is inputted to the image processing module 38, and the processing parameters are provided, and the image processing module 38, that carries out image processing by using the processor indicated by the designation information notified from the application 32, is generated. Note that, for the image processing module 38 for which it is judged in step 206 that the buffer module 40 of the subsequent stage is unnecessary, information of the buffer module 40 of the subsequent stage is not provided. Further, processing parameters are not provided in cases in which the processing contents are fixed and special image processing parameters are not needed, such as, for example, 50% reduction processing.

In the module generating processing (step 210), the image processing module 38, that matches the attributes of the input image data acquired in step 202 and the processing parameters to be executed at the image processing module 38, is selected from plural candidate modules that are registered in the module library 36 and can be used as the image processing module 38. For example, in a case in which the module generating section 44, that corresponds to the module generating processing that is being executed, is a module generating section that generates a module group that carries out color conversion processing, and the CMY color space is designated from the application 32 as the color space of the output image data from the processing parameters, and further, the input image data is data of the RGB color space, the image processing module 38 that carries out RGB→CMY color space conversion is selected from among the plural types of image processing modules 38 that are registered in the module library 36 and that carry out various types of color space processings.

Further, if the image processing module is the image processing module 38 that carries out enlargement/reduction processing, and the designated enlargement/reduction rate is other than 50%, the image processing module 38 that carries out enlargement/reduction processing at an enlargement/reduction rate that is designated for the inputted image data is selected, and, if the designated enlargement/reduction rate is 50%, the image processing module 38 that carries out enlargement/reduction processing that is specialized to an enlargement/reduction rate of 50%, i.e., reduction processing that reduces the inputted image data by 50% by thinning every other pixel, is selected. Note that the selection of the image processing module 38 is not limited to that described above. For example, plural image processing modules 38, that have different unit processing data amounts in the image processings carried out by the image processing engines 38A, may be registered in advance in the module library 36, and the image processing module 38 of the appropriate unit processing data amount may be selected in accordance with the operation environment, such as the size of the memory region that can be allocated to the image processing section 50, or the like (e.g., the smaller the aforementioned size, the image processing module 38 of an increasingly smaller unit processing data amount is selected, or the like). Or, the application 32 or the user can be made to select the image processing module 38.

In next step 212, the workflow managing section 46A is notified of the set of the ID of the buffer module 40 of the subsequent stage and the ID of the generated image processing module 38. It suffices for the ID to be information that can unequivocally discriminate the individual module. For example, the ID may be the number that is given in the order in which the individual modules are generated, or may be the address on the memory of the object of the buffer module 40 or the image processing module 38, or the like. The information that is notified to the workflow managing section 46A is held at the interior of the workflow managing section 46A in, for example the form of a table shown in FIG. 4B, or the form of a list, or the form of an associative array or the like, and is used in later processings. Here, explanation continues by assuming that the information is held in the faun of a table.

Note that, in a case of the image processing module 38 that does not have the buffer module 40 of the subsequent stage that was mentioned previously, processing is carried out by the following method for example. In a case in which the generated image processing module 38 is the final point of a pipeline or one of the final points of a directed acyclic graph such as the image processing module 38 that carries out the output processing in FIG. 5A, that image processing module 38 is returned, as the output of the module generating section 44, to the application 32 that is the call-up source. Further, in a case, such as the image processing module 38 that carries out skew angle sensing processing in FIG. 5B, in which the results of the image processing at the generated image processing module 38 are used at another image processing module (the image processing module 38 that carries out image rotation processing in FIG. 5B), the module generating section 44 instructs repeated execution of processing until processing with respect to that image processing module 38 is completed, and acquires the results of processing.

When the processing of step 212 ends, the module generating section 44 returns control to step 200 and judges whether or not there is an image processing module to be generated next. Note that the individual module generating sections 44 generate module groups that carry out corresponding, given image processings. Therefore, this judgment can be realized by registering in advance and reading-out information relating to what kind of image processing modules are to be generated in what kind of connected relationship for each of the individual module generating sections 44, or by describing this in a program that operates the module generating sections 44. For example, in a case in which the module generating section 44, that corresponds to the module generating processing that is being executed, generates a module group that carries out image processing that is realized by plural types of image processing modules 38 (e.g., skew correction processing that is realized by the image processing module 38 that carries out skew angle sensing processing and the image processing module 38 that carries out image rotation processing), a module group containing two or more of the image processing modules 38 is generated.

When the application 32 is notified of the completion of generation of the module group as described above from the module generating section 44 that was instructed to generate the module group, the application 32 judges, on the basis of the results of the judgment in step 162 of FIG. 3, whether or not, in order to realize the image processing that is required, there is the need to also generate module groups that carry out other image processings. If the image processing that is required is a processing that combines plural types of image processings, the application 32 starts-up the other module generating sections 44 corresponding to the individual image processings, and successively carries out the processing of giving notice of the information needed for module group generation (refer to steps 170 and 172 of FIG. 3 as well). Then, due to the above-described module generating processing (FIG. 4) being successively carried out (refer to step 174 in FIG. 3 as well) by the module generating sections 44 that are successively started-up, the image processing section 50 that carries out the required image processing is constructed as shown as examples in FIGS. 5A through 5C.

Note that, in the present exemplary embodiment, in cases such as when the frequency of execution of a specific image processing is high, or the like, it is also possible to re-generate the image processing section 50 that carries out the specific image processing by, even after the image processing section 50 that carries out the specific image processing is generated, the application 32 not instructing the plural types of module generating sections 44, that are for generating the image processing section 50 that carries out the specific image processing, to end processing, thereby retaining them as processes, threads or objects, and, each time the need to carry out the specific image processing arises, successively instructing the respective module generating sections 44, that remain as processes, threads or objects, to generate module groups. Due thereto, each time the need arises to carry out the specific image processing, there is no need for processings for respectively starting-up the respective corresponding module generating sections 44, and the time required to re-generate the image processing section 50 that carries out the specific image processing can be shortened.

When started-up by the module generating section 44, the control section 38B of the image processing module 38 carries out the image processing module initialization processing shown in FIG. 12. In this image processing module initialization processing, first, in step 250, due to the module generating section 44 carrying out the processing of step 210 of the module generating processing (FIG. 4), the control section 38B stores the information of the modules of the preceding stage and the subsequent stage of its own module that is provided from the module generating section 44. Further, in next step 252, on the basis of the type and the contents and the like of the image processing that the image processing engine 38A of its own module carries out, the control section 38B recognizes the size of the memory that its own module uses and other resources that its own module uses. Note that the memory that its own module uses is mainly the memory needed in order for the image processing engine 38A to carry out image processing. However, in a case in which the module of the preceding stage is the image data supplying section 22 or in a case in which the module of the subsequent stage is the image output section 24, a memory for a buffer, that is for temporarily storing image data at times of transmitting and receiving image data to and from the modules of the preceding stage and the subsequent stage, may be needed. Further, in a case in which information of a table or the like is included in the processing parameters, a memory region for holding this may be needed. Then, in step 254, the resource managing section 46B is informed of the size that was recognized in step 252, and the resource managing section 46B is requested to reserve a memory region of the notified size. Here, it is supposed that the requested memory region is a memory region of the memory space that corresponds to the processor that its own module uses in image processing.

In the resource managing processing (the resource managing section 46B) shown in FIG. 2, when reserving of a memory region is requested from the image processing module 38 or the buffer module 40, in a case in which the memory managing method that is selected/set is the first managing method for example, memory regions (continuous regions) of the size notified from the module that is the source of the memory reserving request are reserved through the operating system 30. Then, by notifying the module, that is the source of the memory reserving request, of the start address of the reserved memory regions, the reserved memory regions are handed over to the module that is the source of the memory reserving request. Further, if the memory managing method is the second managing method, memory regions (continuous regions) of the notified size are reserved from the unused regions among the memory regions that were reserved in advance, and the reserved memory regions are changed to "used", and the reserved memory regions are handed over to the source of the memory reserving request. Moreover, if the memory managing method that is selected/set is the third managing method, by executing the above-described processing at the time of a memory reserving request (see FIG. 2B), reserving and handing-over of a memory region of the notified size are carried out.

In the image processing module initialization processing shown in FIG. 12 (the control section 38B of the image processing module 38), when the needed memory region is reserved via the resource managing section 46B through the above-described processings, in next step 256, it is judged, on the basis of the processing results of prior step 252, whether or not (the image processing engine 38A of) its own module needs resources other than memory. If the judgment is negative, the routine moves on to step 262 without any processing being carried out. If the judgment is affirmative, the routine moves on to step 258 where the resource managing section 46B is notified of the types and the like of the resources other than memory that its own module needs, and is requested to reserve the notified other resources, and reserves them.

Next, in step 262, the control section 38B judges the module that is the preceding stage of its own module, and if no module exists at the preceding stage of its own module, the routine moves on to step 272. If the module of the preceding stage is other than the buffer module 40, e.g., is the image data supplying section 22 or a specific file or the like, initialization processing thereof is carried out in step 270 as needed, and the routine proceeds to step 272. Further, in a case in which a module exists at the preceding stage of its own module and that module of the preceding stage is the buffer module 40, the routine proceeds from step 262 to step 264, and the data amount of the image data that is acquired by reading-out image data one time from the buffer module 40 of the preceding stage (i.e., the unit read-out data amount) is recognized. If the number of buffer modules 40 of the preceding stage of its own module is one, there is one unit read-out data amount. However, in a case such as when there are plural buffer modules 40 of the preceding stage and the image processing engine 38A carries out image processing by using image data that is acquired from each of the plural buffer modules 40, such as in the case of the image processing module 38 that carries out image composition processing in the image processing section 50 shown in FIG. 5C for example, or the like, the unit read-out data amounts corresponding to the individual buffer modules 40 of the preceding stage are determined in accordance with the type and the contents of the image processing that the image processing engine 38A of its own module carries out, and the number of the buffer modules 40 of the preceding stage, and the like.

In step 266, by notifying a single one of the buffer modules 40 of the preceding stage of the unit read-out data amount that was recognized in step 264, the unit read-out data amount for that buffer module 40 is set (refer to (1) of FIG. 15A as well). In next step 268, it is judged whether or not unit read-out data amounts are set for all of the buffer modules 40 of the preceding stage of its own module. If the number of buffer modules 40 of the preceding stage of its own module is one, this judgment is affirmative, and the routine moves on to step 272. If the number of buffer modules 40 of the preceding stage is a plural number, the judgment in step 268 is negative, and the routine returns to step 266, and steps 266 and 268 are repeated until the judgment of step 268 becomes affirmative. In this way, unit read-out data amounts are respectively set for all of the buffer modules 40 of the preceding stage.

In step 272, the control section 38B judges the module of the subsequent stage of its own module. In a case in which the module of the subsequent stage of its own module is other than the buffer module 40, e.g., is the image output section 24 or a specific file or the like, initialization processing thereof is carried out in step 278 as needed, and the routine moves on to step 280. For example, if the module of the subsequent stage is the image output section 24 that is formed from any of an image recording section, a display section, a writing device or a transmitting section, processing such as giving notice that image data is to be outputted in units of a data amount that corresponds to the unit write data amount, or the like, is carried out with respect to the image output section 24 as the aforementioned initialization processing. Further, if the module of the subsequent stage is the buffer module 40, the data amount of the image data in the writing of image data of one time (i.e., the unit write data amount) is recognized in step 274. That unit write data amount is set for the buffer module of the subsequent stage in step 276 (refer also to (2) of FIG. 15A), and thereafter, the routine moves on to step 280. In step 280, the module generating section 44 is notified that this image processing module initialization processing is completed, and the image processing module initialization processing ends.

Figure 6:
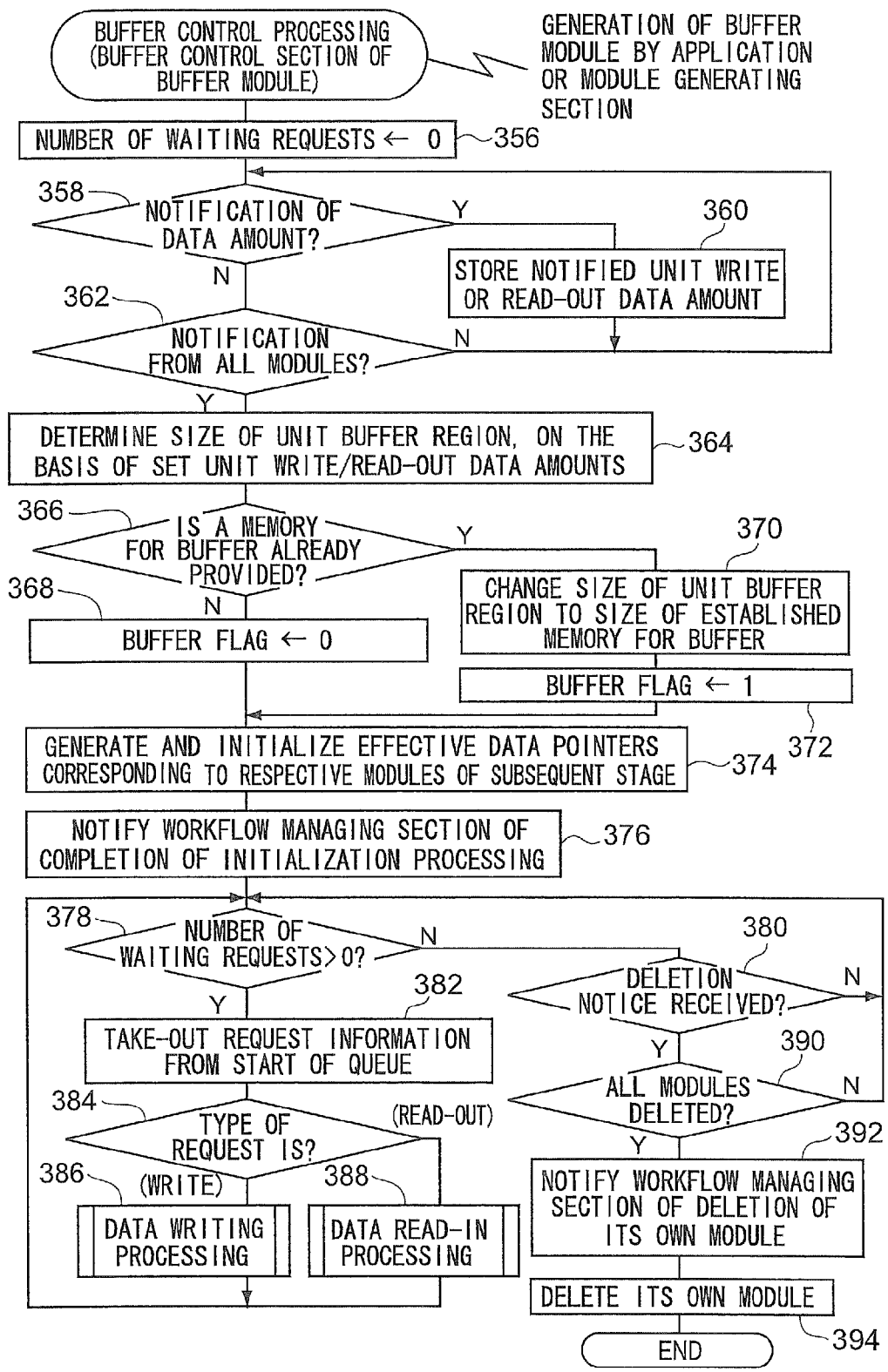
FIG. 6 is a flowchart showing the contents of buffer control processing that is executed by a buffer control section of a buffer module.

On the other hand, when the buffer control section 40B of the individual buffer module 40 structuring the image processing section 50 is started-up by the module generating section 44 or the application 32, the buffer control section 40B carries out the buffer control processing shown in FIG. 6. In this buffer control processing, when the buffer control section 40B is started-up by the module generating section 44 or the application 32 and generation of the buffer module 40 is instructed, a number of waiting requests is initialized to 0 in step 356. In next step 358, it is judged whether or not a unit write data amount has been notified from the image processing module 38 of the preceding stage of its own module or a unit read-out data amount has been notified from the image processing module 38 of the subsequent stage of its own module. If the judgment is negative, the routine moves on to step 362 where it is judged whether or not unit write data amounts or unit read-out data amounts have been notified from all of the image processing modules 38 connected to its own module. If the judgment is negative, the routine returns to step 358, and steps 358 and 362 are repeated until the judgment of step 358 or step 362 is affirmative.

When the unit write data amount or the unit read-out data amount is notified from the specific image processing module 38 connected to its own module, the judgment in step 358 is affirmative, and the routine moves on to step 360 where the notified unit write data amount or unit read-out data amount is stored. Thereafter, the routine returns to step 358. Accordingly, each time the unit write data amount or the unit read-out data amount is notified from the individual image processing modules 38, that are connected to its own module, due to the processing of step 266 or step 276 of the image processing module initialization processing (FIG. 12) being carried out by the control sections 38B of the individual image processing modules 38 that are connected to its own module, the notified unit write data amount or unit read-out data amount is stored, and due thereto, the notified unit write data amount or unit read-out data amount is set at the buffer module 40 (refer to (1) and (2) of FIG. 15B as well).

When the image write data amounts or the image read-out data amounts are notified from all of the image processing modules 38 connected to its own module, and the notified unit write data amounts and unit read-out data amounts are respectively set, the judgment in step 362 is affirmative, and the routine proceeds to step 364. In step 364, on the basis of the unit write data amounts and the unit read-out data amounts that were respectively set by the individual image processing modules 38 connected to its own module, the buffer control section 40B determines the size of a unit buffer region that is the managing unit of the buffer 40A of its own module, and stores the determined size of the unit buffer region. The maximum value among the unit write data amounts and the unit read-out data amounts that are set at its own module is suitable for the size of the unit buffer region. However, the unit write data amount may be set as the size of the unit buffer region, or the unit read-out data amount (in a case in which plural image processing modules 38 are connected at the subsequent stage of its own module, the maximum value of the unit read-out data amounts that are respectively set by the individual image processing modules 38) may be set as the size of the unit buffer region. Or, the least common multiple of the unit data write amount and the (maximum value of the) unit read-out data amount(s) may be set. Or, if this least common multiple is less than a predetermined value, the least common multiple may be set, or if the least common multiple is greater than or equal to the predetermined value, another value (e.g., any of the aforementioned maximum value of the unit write data amount and unit read-out data amount(s), or the unit write data amount, or the (maximum value of the) unit read-out data amount(s)) may be set as the size of the unit buffer region.

In next step 366, the buffer control section 40B judges whether or not a memory region, that is used as the buffer 40A of its own module, is already provided. If its own module is generated by the module generating section 44, this judgment is negative, and a buffer flag is set to 0 in step 368. Thereafter, the routine moves on to step 374. Further, if its own module is generated by the application 32 and is a buffer module 40 that functions as the image data supplying section 22 or the image output section 24, the memory region that is used as the buffer 40A of its own module already exists. Therefore, the judgment of step 366 is affirmative, and the routine moves on to step 370. In step 370, the size of the unit buffer region that was determined in prior step 364 is changed to the size of the established memory region that is used as the buffer 40A of its own module. Further, in next step 372, the buffer flag is set to 1, and thereafter, the routine proceeds to step 374.

In step 374, the buffer control section 40B generates respective effective data pointers that correspond to the individual image processing modules 38 of the subsequent stage of its own module, and initializes the respective generated effective data pointers. These effective data pointers are pointers that indicate the start position (the next read-out start position) and the end position respectively of the image data (effective data) that has not been read-out by the corresponding image processing module 38 of the subsequent stage, among the image data that is written in the buffer 40A of its own module by the image processing module of the preceding stage of its own module. In the initialization processing of step 374, usually, specific information that means that effective data does not exist is set. However, if its own module is generated by the application 32 and is the buffer module 40 that functions as the image data supplying section 22, there are cases in which image data that is the object of image processing is already written in the memory region that is used as the buffer 40A of its own module. In such cases, the start position and the end position of that image data are respectively set at the effective data pointers that correspond to the individual image processing modules 38 of the subsequent stage.

The initialization processing at the buffer module 40 is completed by the above-described processings, and in next step 376, the workflow managing section 46A is notified of the completion of the initialization processing. Further, in step 378, it is judged whether or not a value that is greater than 0 is set as the number of waiting requests for which initial setting was carried out in prior step 356. If the judgment is negative, the routine moves on to step 380, and it is judged whether or not a deletion notice, that gives notice that the processing of deleting that image processing module 38 is to be carried out, has been received from the image processing module 38 connected at the preceding stage or the subsequent stage of its own module. If this judgment as well is negative, the routine returns to step 378, and steps 378 and 380 are repeated until either of the judgments is affirmative.

On the other hand, when the constructing of the image processing section 50 that carries out the needed image processing is completed due to the above-described module generating processing (see FIG. 4) being successively carried out by the module generating sections 44 that the application 32 successively started-up, the application 32 judges whether the forms of execution of the image processings for which execution is instructed are block unit processing or page unit processing. Then, by starting-up processes, threads, or objects that execute the programs of the workflow managing section 46A corresponding to the judged forms of execution, the application 32 instructs the workflow managing section 46A to execute the image processings by the image processing section 50 (refer also to step 176 of FIG. 3).

Due to different programs being started-up in accordance with the forms of execution of the image processings, the workflow managing section 46A of the processing managing section 46 carries out the block unit control processing shown in FIGS. 16A-16D when the form of execution of an image processing is block unit processing, and carries out the page unit control processing shown in FIGS. 17A-17D when the form of execution of an image processing is page unit processing. Note that the block unit control processing and the page unit control processing respectively correspond to the image processing section control processing shown in step 178 of FIG. 3. In the block unit control processing or the page unit control processing, due to the workflow managing section 46A inputting a processing request to a predetermined image processing module 38 among the image processing modules 38 structuring the image processing section 50, image processing by the image processing section 50 is carried out in a form of execution that is execution in units of a block or execution in units of a page. Hereinafter, before the overall operation of the image processing section 50 is described, the processing after the completion of the initialization processing carried out by the buffer control sections 40B of the individual buffer modules 40, and the image processing module control processing carried out by the control sections 38B of the individual image processing modules 38, will be described in that order.

Figure 7:
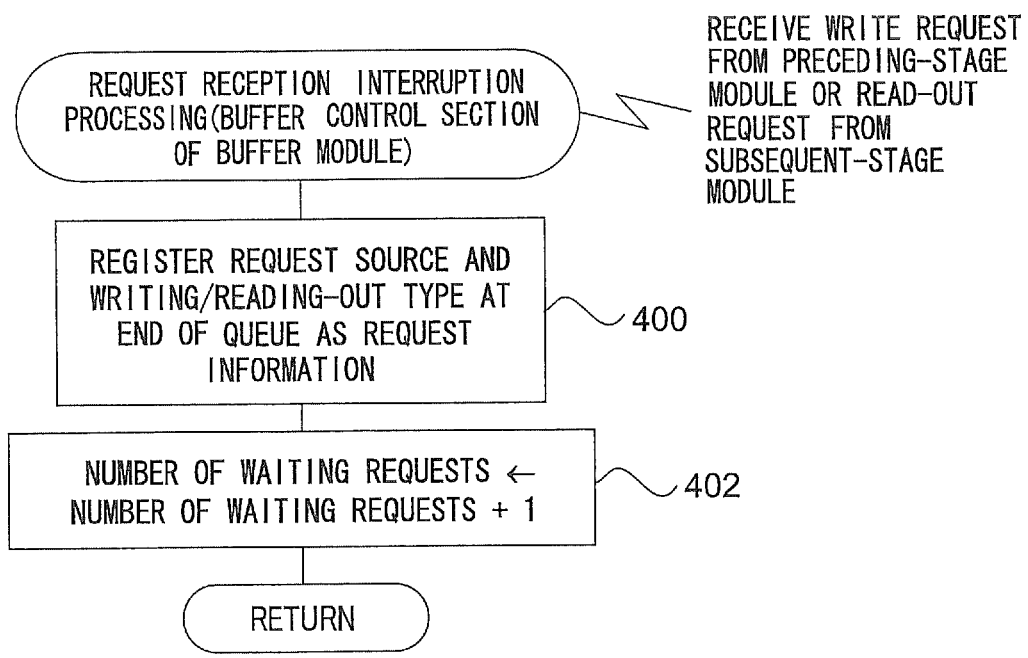
FIG. 7 is a flowchart showing the contents of request reception interruption processing that is executed by the buffer control section of the buffer module.

In the present exemplary embodiment, in a case in which the image processing module 38 writes image data to the buffer module 40 of the subsequent stage, a write request is inputted from the image processing module 38 to the buffer module 40. In a case in which the image processing module 38 reads-out image data from the buffer module 40 of the preceding stage, a read-out request is inputted from the image processing module 38 to the buffer module 40. Therefore, when a write request is inputted from the image processing module 38 of the preceding stage of its own module, or when a data request is inputted from the image processing module 38 of the subsequent stage of its own module, the buffer control section 40B of the buffer module 40 carries out the request reception interruption processing shown in FIG. 7 due to an interruption arising. Note that, hereinafter, description that is premised on the occurrence of an interruption is given, but processing may start due to the calling-up of a method or function, as in a usual program. In this case, a structure may be used in which processing is carried out for each request, and requests are not queued in a queue as in the following description.

In the request reception interruption processing, first, in step 400, request source identifying information that identifies the request source that inputted the write request or the data request to its own module, and request type information that expresses the type of the request (write or read-out), are registered at the end of the queue as request information. These queues are formed respectively on the memories that are allocated to the individual buffer modules 40. Further, in next step 402, the number of waiting requests is increased by one, and the request reception interruption processing ends. Due to this request reception interruption processing, each time a write request or a read-out request is inputted to a specific buffer module 40 from the image processing module of the preceding stage or the subsequent stage of the specific buffer module 40, the request information corresponding to the inputted write request or read-out request is successively registered in the queue corresponding to the specific buffer module 40, and the number of waiting requests is increased one-by-one.

Figure 8A:
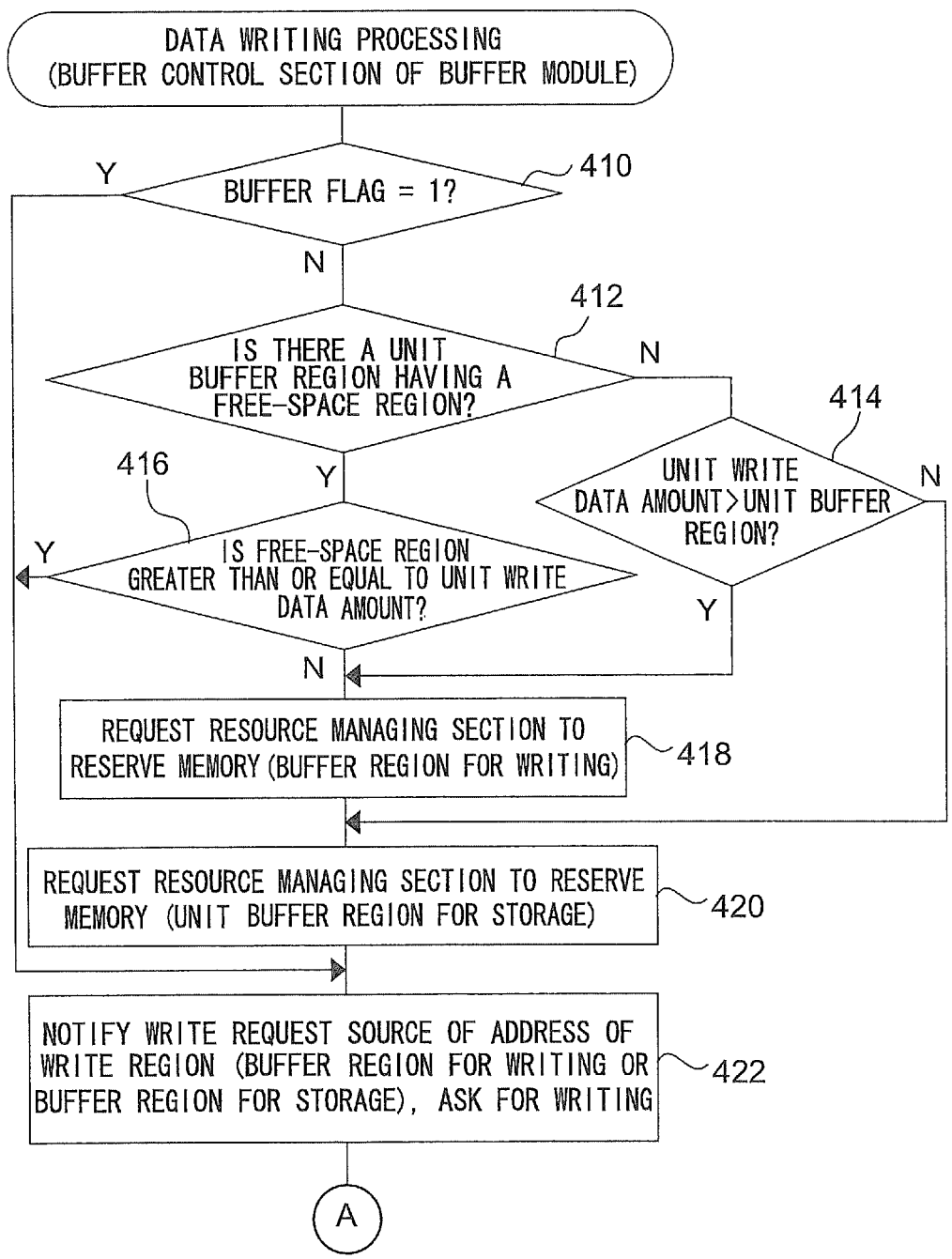
FIGS. 8A and 8B are a flowchart showing the contents of data writing processing that is executed by the buffer control section of the buffer module.
Figure 8B:
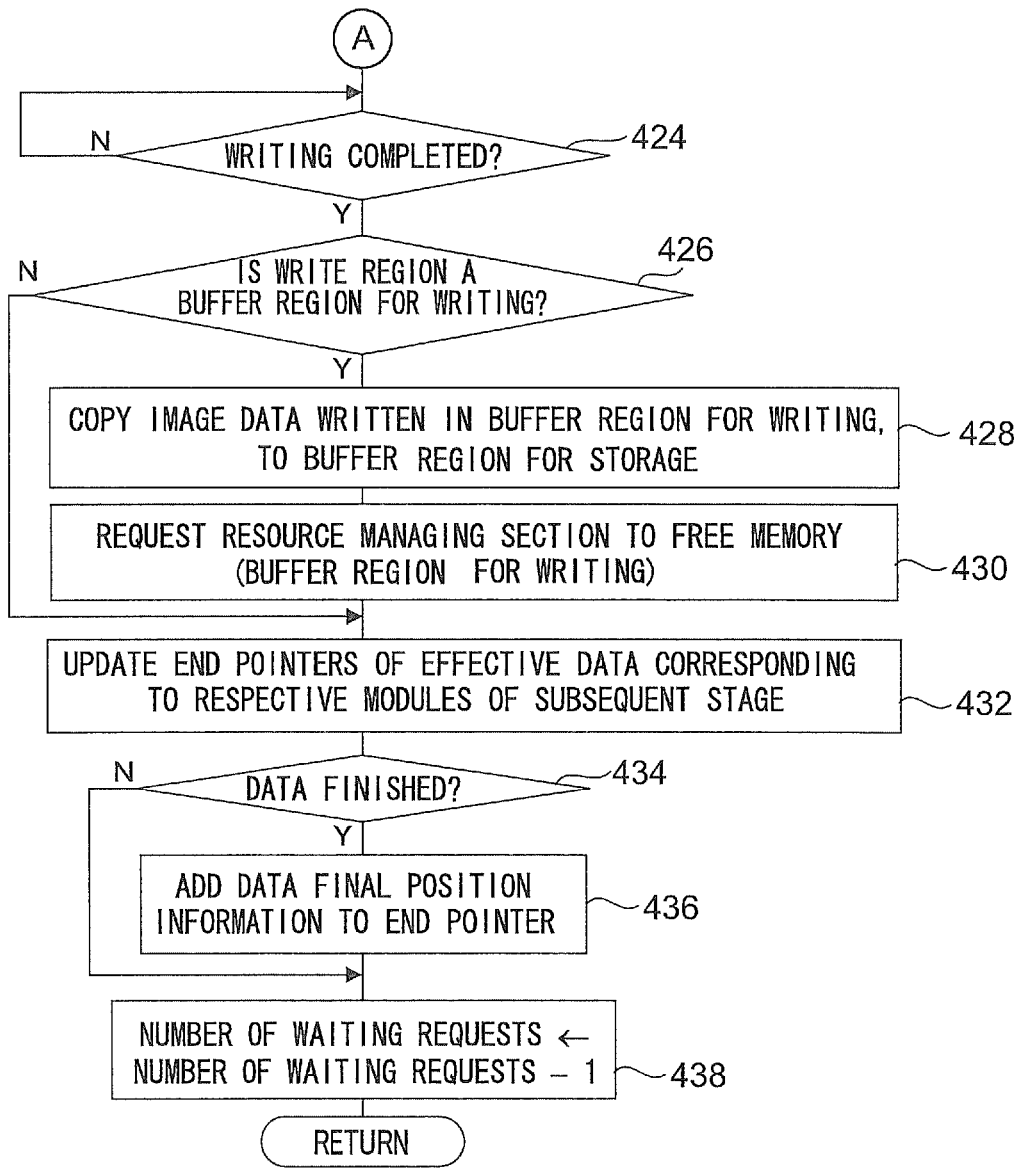

Further, when the number of waiting requests becomes a value that is greater than or equal to 1 due to the above-described request reception interruption processing being executed, the judgment of step 378 of the buffer control processing (FIG. 6) is affirmative, and the routine moves on to step 382 where the request information is taken-out from the start of the queue. In next step 384, on the basis of the request type information that is included in the request information taken-out in step 382, the type (write or read-out) of the request corresponding to the taken-out request information is judged, and the routine splits in accordance with the results of this judgment. If the type of request is a read-out request, the routine moves on from step 384 to step 386, and the data writing processing shown in FIGS. 8A and 8B is carried out.

In the data writing processing, first, in step 410, it is judged whether or not 1 is set for the buffer flag, i.e., whether or not its own module is the buffer module 40 generated by the application 32. If this judgment is affirmative, because the memory region that is used as the buffer 40A is already reserved, the routine moves on to step 422 without any processing being carried out. Further, if the judgment in step 410 is negative, i.e., if its own module is the buffer module 40 generated by the module generating section 44, the routine proceeds to step 412. In step 412, it is judged whether or not there exists, among the unit buffer regions structuring the buffer 40A of its own module, a unit buffer region having a free-space region (a unit buffer region in which image data is not written to the end thereof).

At the buffer module 40 that is generated by the module generating section 44, a memory region (unit buffer region) used as the buffer 40A is not reserved initially, and a unit buffer region is reserved as a unit each time a shortage of memory regions arises. Therefore, when a write request is first inputted to the buffer module 40, a memory region (unit buffer region) that is used as the buffer 40A does not exist, and this judgment is negative. Further, also after a unit buffer region that is used as the buffer 40A is reserved through processings that will be described later, the aforementioned judgment is negative in a case in which that unit buffer region just becomes full as the image data is written to that unit buffer region.

If the judgment in step 412 is negative, the routine moves on to step 414. In step 414, the image processing module 38 that is the source of the write request is recognized on the basis of the request source identification information included in the request information taken-out from the queue, and the unit write data amount set by the image processing module 38 that is the source of the write request is recognized, and thereafter, it is judged whether or not the recognized unit write data amount is greater than the size of the unit buffer region determined in prior step 364 (FIG. 6). In cases of employing the maximum value of the unit write data amount and the unit read-out data amount(s) set at its own module, or employing the unit write data amount set at its own module, as the size of the unit buffer region, this judgment is always negative, and the routine moves on to step 420. In step 420, the resource managing section 46B is notified of the size of the memory region that is to be reserved (the size of the unit buffer region), and the resource managing section 46B is requested to reserve a memory region (a unit buffer region used in storing image data) that is used as the buffer 40A of its own module. Here, the resource managing section 46B is requested to reserve a memory region with respect to the memory, that corresponds to the processor that the image processing module 38 of the preceding stage uses in image processing, among the first memory 14 and the second memory 54. Due thereto, due to the processings of previously-described FIG. 2 being carried out by the resource managing section 46B, the unit buffer region is reserved.

Further, in a case in which there exists, among the unit buffer regions structuring the buffer 40A of its own module, a unit buffer region having a free-space region, the judgment in step 412 is affirmative, and the routine proceeds to step 416. In step 416, in the same way as in above-described step 414, the unit write data amount set by the image processing module 38 that is the source of the write request is recognized, and thereafter, it is judged whether or not the size of the free-space region in the unit buffer region having a free-space region is greater than or equal to the recognized unit write data amount. If the judgment is affirmative, there is no need to newly reserve a unit buffer region that is used as the buffer 40A of its own module, and therefore, the routine moves on to step 422 without any processing being carried out.

If the size of the unit buffer region is an integer multiple of the unit write data amount, each time a write request is inputted from the image processing module 38 of the preceding stage of its own module, either the judgments of steps 412, 414 are both negative or the judgments of steps 412, 416 are both affirmative as described above, and only the unit buffer region that is used as the buffer 40A is reserved as needed.

On the other hand, in a case in which the size of the unit buffer region is not an integer multiple of the unit write data amount, by repeating the writing of the image data of the unit write data amount to the buffer 40A (the unit buffer region), a state arises in which the size of the free-space region at the unit buffer region having a free-space region is smaller than the unit write data amount (the judgment of step 416 is affirmative), as also shown in FIG. 9A as an example. Further, in the present exemplary embodiment, it is also possible to employ the unit read-out data amount set at its own module (or the maximum value thereof) as the size of the unit buffer region. However, if the size thereof is smaller than the unit write data amount (i.e., if the judgment in step 414 is affirmative), the aforementioned state always arises when a write request is inputted.

As described above, in a case in which the size of the free-space region in the unit buffer region having a free-space region is smaller than the unit write data amount, the region in which the image data of the unit write data amount is written extends over plural unit buffer regions. However, in the present exemplary embodiment, because the memory region that is used as the buffer 40A is reserved in units of the unit buffer region, it is not possible to ensure that unit buffer regions that are reserved at different times will be regions that are continuous on the actual memory (the first memory 14). Therefore, in a case in which the region in which the image data is written extends over plural unit buffer regions, i.e., in a case in which the judgment in step 416 is negative or the judgment in step 414 is affirmative, the routine moves on to step 418. In step 418, the resource managing section 46B is notified of the unit write data amount as the size of the memory region that is to be reserved, and the resource managing section 46B is requested to reserve a memory region to be used for writing (a buffer region for writing: refer to FIG. 9B as well). Here, the resource managing section 46B is requested to reserve a memory region with respect to the memory, that corresponds to the processor that the image processing module 38 of the preceding stage uses in image processing, among the first memory 14 and the second memory 54. Then, when the buffer region for writing is reserved, in next step 420, reserving of the unit buffer region that is used as the buffer 40A is carried out.

In step 422, if the size of the free-space region in the unit buffer region having a free-space region is greater than or equal to the unit write data amount, that free-space region is made to be the write region. On the other hand, if the size of the free-space region in the unit buffer region having a free-space region is smaller than the unit write data amount, the buffer region for writing that is newly reserved is made to be the write region. The image processing module 38 that is the source of the write request is notified of the start address of that write region, and is asked to write the image data that is the object of writing, in order from the notified start address. Due thereto, the image processing module 38 that is the source of the write request writes the image data to the write region whose start address has been notified (the unit buffer region or the buffer region for writing) (see FIG. 9B as well). As described above, if the region in which the image data is to be written extends over plural unit buffer regions, the buffer region for writing is reserved separately. Therefore, regardless of whether or not the region in which the image data is to be written extends over plural unit buffer regions, the notification of the write region to the image processing module 38 that is the source of the write request is achieved merely by giving notice of the start address thereof as described above, and the interface with the image processing module 38 is simple.

In next step 424, it is judged whether or not the writing of the image data to the write region by the image processing module 38 of the preceding stage is completed, and step 424 is repeated unit the judgment is affirmative. When notice of the completion of writing is given from the image processing module 38 of the preceding stage, the judgment of step 424 is affirmative, and the routine moves on to step 426. In step 426, it is judged whether or not the write region in the above-described writing processing is the buffer region for writing that was reserved in prior step 416. If this judgment is negative, the routine proceeds to step 432 without any processing being carried out. If the judgment of step 426 is affirmative, the routine proceeds to step 428. In step 428, as shown as an example in FIG. 9C, the image data that was written to the buffer region for writing is copied in a state of being divided between the unit buffer region having a free-space region and the new unit buffer region that was reserved in prior step 422. Further, in step 430, the resource managing section 46B is notified of the start address of the memory region that was reserved as the buffer region for writing in prior step 418, and the resource managing section 46B is requested to free that memory region.

Note that, here, explanation is given of an aspect in which the buffer region for writing is reserved when needed, and is freed right away when it is no longer needed. However, in a case in which the size of the unit buffer region for storage is not an integer multiple of the unit write data amount, the buffer region for writing is absolutely necessary. Therefore, a structure may be used in which the buffer region for writing is reserved at the time of initialization and freed at the time when the buffer module 40 is deleted.

When freeing of the memory region is requested from the image processing module 38 or the buffer module 40, the resource managing section 46B carries out the processing of freeing memory corresponding to the memory managing method that is selected/set. For example, if the memory managing method is the third managing method, (processing that manifests) the processing at the time of a memory freeing request of FIG. 2C is carried out, and the freeing of the memory region is carried out.

In the data writing processing (FIGS. 8A and 8B), the routine moves on to step 432 when the judgment in step 426 is negative, or when notification of the completion of freeing is given from the resource managing section 46B after freeing of the memory region is requested in step 430. In step 432, among the effective data pointers corresponding to the individual image processing modules 38 of the subsequent stage of its own module, the pointers expressing the end positions of the effective data are respectively updated (refer to FIG. 9C as well). Note that the updating of the pointer is achieved by moving the end position of the effective data that is indicated by the pointer, rearward by an amount corresponding to the unit write data amount. In a case in which the image data that is written this time by the image processing module 38 of the preceding stage of its own module is data corresponding to the end of the image data that is the object of processing, when the writing processing by the image processing module 38 of the preceding stage is completed, an entire processing ended notice, that expresses that the image data that is the object of processing has ended, and the size of the written image data are inputted from the image processing module 38 of the preceding stage. Therefore, in a case in which an entire processing ended notice is inputted from the image processing module 38 of the preceding stage when writing processing is completed, pointer updating is carried out by moving the end position of the effective data rearward by an amount corresponding to the size that was notified simultaneously.

In next step 434, on the basis of whether or not an entire processing ended notice is inputted at the time of completion of writing processing, it is judged whether or not writing of the image data that is the object of processing to the buffer 40A is completed. If the judgment is negative, the routine moves on to step 438 without any processing being carried out. However, if the judgment is affirmative, the routine proceeds to step 436 where data final position information, that expresses that this is the end of the image data that is the object of processing, is added to the pointer updated in step 432 (the pointer showing the end position of the effective data, among the effective data pointers corresponding to the individual image processing modules 38 of the subsequent stage of its own module). Thereafter, the routine proceeds to step 438. Then, in step 438, the number of waiting requests is reduced by 1, the data writing processing ends, and the routine returns to step 378 of the buffer control processing (FIG. 6).

Figure 10A:
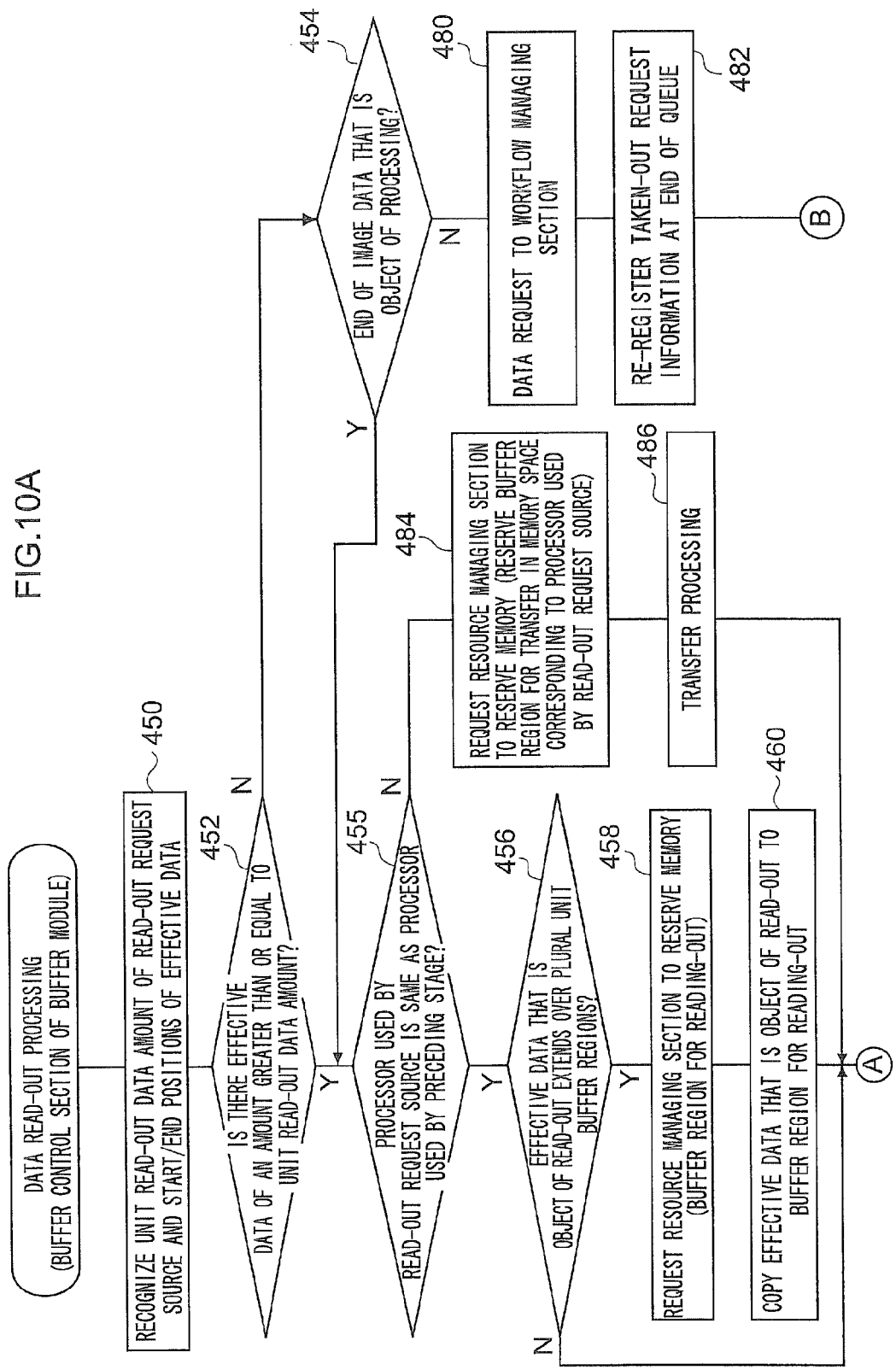

Further, in the buffer control processing (FIG. 6), in a case in which the type of the request corresponding to the request information that was taken-out in step 382 is reading-out, the routine moves on from step 384 to step 388, and the data read-in processing shown in FIGS. 10A and 10B is carried out. In the data read-out processing, first, in step 450, on the basis of the request source identification information included in the request information taken-out from the queue, the image processing module 38 that is the source of the read-out request is recognized, and the unit read-out data amount set by the image processing module 38 that is the source of the read-out request is recognized, and, on the basis of the effective data pointers corresponding to the image processing module 38 that is the source of the read-out request, the start position and the end position on the buffer 40A of the effective data corresponding to the image processing module 38 that is the source of the read-out request are recognized. In next step 452, on the basis of the start position and the end position of the effective data that were recognized in step 450, it is judged whether or not there is effective data, that corresponds to the image processing module 38 that is the source of the read-out request (image data that can be read-out by the image processing module 38 that is the source of the read-out request), of an amount greater than or equal to the unit read-out data amount.

If this judgment is negative, the routine moves on to step 454 where it is judged whether or not the end of the effective data, that is stored in the buffer 40A and that can be read-out by the image processing module 38 that is the source of the read-out request, is the end of the image data that is the object of processing. The judgment in step 452 or step 454 is affirmative and the routine proceeds to step 455 in cases in which the effective data that corresponds to the image processing module 38 that is the source of the read-out request is stored in the buffer 40A in an amount greater than or equal to the unit read-out data amount, or, although the effective data that is stored in the buffer 40A and corresponds to the image processing module 38 that is the source of the read-out request is less than the unit read-out data amount, the end of this effective data is the end of the image data that is the object of processing. In step 455, it is judged whether or not the processor, that is used by the module that is the source of the read-out request, is the same as the processor that the image processing module 38 of the preceding stage uses in image processing. If the judgment in step 455 is affirmative, the routine moves on to step 456. In step 456, on the basis of the start position of the effective data that was recognized in prior step 450, the unit buffer region, that is storing the image data of the start portion of the effective data, is recognized, and it is judged whether or not the data amount of the effective data stored in the recognized unit buffer region is greater than or equal to the unit read-out data amount recognized in step 450. Due thereto, it is judged whether or not the effective data that is the object of read-out this time extends over plural unit buffer regions.

If the judgment of step 456 is negative, the routine proceeds to step 462 without any processing being carried out. However, as shown in FIG. 11A for example, cases, in which the data amount of the effective data stored in the unit buffer region, that is storing the image data of the start portion of the effective data, is less than the unit read-out data amount and the effective data that is the object of read-out this time extends over plural unit buffer regions, are not limited to the effective data that is the object of read-out this time being stored in regions that are continuous on the actual memory (the first memory 14). Therefore, if the judgment in step 456 is affirmative, the routine moves on to step 458 where the resource managing section 46B is notified of the unit read-out data amount corresponding to the image processing module 38 that is the source of the read-out request, as the size of the memory region that is to be reserved, and the resource managing section 46B is requested to reserve a memory region that is used in reading-out (a buffer region for reading-out: see FIG. 9B as well). When the buffer region for reading-out is reserved, in next step 460, the effective data, that is the object of read-out and that is stored over plural unit buffer regions, is copied to the buffer region for reading-out that was reserved in step 458 (refer to FIG. 11B as well).

In step 462, if the effective data that is the object of read-out is stored in a single unit buffer region, the region, among that unit buffer region, that is storing the effective data that is the object of read-out is made to be the read-out region. On the other hand, if the effective data that is the object of read-out is stored over plural unit buffer regions, the buffer region for reading-out is made to be the read-out region. The image processing module 38 that is the source of the read-out request is notified of the start address of that read-out region, and is asked to read-out the image data in order from the notified start address. Due thereto, the image processing module 38 that is the source of the read-out request carries out reading-out of the image data from the read-out region whose start address was notified (the unit buffer region or the buffer region for reading-out) (see FIG. 11C as well). Note that, in a case in which the effective data that is the object of read-out is data corresponding to the end of the image data that is the object of processing (i.e., in a case in which the end position of the effective data that is the object of read-out coincides with the end position of the effective data that is indicated by the effective data pointer corresponding to the image processing module 38 that is the source of the read-out request, and data final position information has been added to that pointer), at the time of the asking for reading-out of the image data, the image processing module 38 that is the source of the read-out request is notified of the size of the effective data that is the object of read-out and also of the fact that this is the end of the image data that is the object of processing.

As described above, in a case in which the effective data that is the object of read-out is stored over plural unit buffer regions, the effective data that is the object of read-out is copied to the buffer region for reading-out that is reserved separately. Therefore, regardless of whether or not the effective data that is the object of read-out is stored over plural unit buffer regions, the notification of the read-out region to the image processing module 38 that is the source of the read-out request is achieved merely by giving notice of the start address thereof as described above, and the interface with the image processing module 38 is simple. Note that, in a case in which its own module is the buffer module 40 generated by the application 32, the memory region that is used as the buffer 40A (the aggregate of the unit buffer regions) is a continuous region. Therefore, before carrying out the judgment of step 456, it may be judged whether or not the buffer flag is 1, and if the judgment is affirmative, the routine may move on to step 462 regardless of whether or not the effective data that is the object of read-out is stored over plural unit buffer regions.

In next step 464, it is judged whether or not reading-out of the image data from the read-out region by the image processing module 38 that is the source of the read-out request is completed, and step 464 is repeated until this judgment is affirmative. When the completion of reading-out is notified from the image processing module 38 that is the source of the read-out request, the judgment of step 464 is affirmative, and the routine proceeds to step 467 where it is judged whether or not the read-out region in the above-described read-out processing is the buffer region for reading-out that was reserved in prior step 458 or a buffer region for transfer. If the judgment is negative, the routine proceeds to step 470 without any processing being carried out. If the judgment in step 467 is affirmative, the routine moves on to step 469 where the resource managing section 46B is notified of the size and the start address of the memory region that was reserved as the aforementioned buffer region for reading-out of buffer region for transfer, and the resource managing section 46B is requested to free that memory region. For the buffer region for reading-out as well, in the same way as with the buffer region for writing, if the size of the unit buffer region for storage is not an integer multiple of the unit read-out data amount, the buffer region for reading-out is absolutely necessary. Therefore, a structure may be used in which the buffer region for reading-out is reserved at the time of initialization and freed at the time when the buffer module 40 is deleted.

In next step 470, among the effective data pointers corresponding to the image processing module 38 that is the source of the read-out request, the pointer indicating the start position of the effective data is updated (refer also to FIG. 11C).

Note that the updating of the pointer is achieved by moving the start position of the effective data that is indicated by the pointer, rearward by an amount corresponding to the unit read-out data amount. However, if the effective data that is the object of read-out this time is data corresponding to the end of the image data that is the object of processing, pointer updating is carried out by moving the start position of the effective data rearward by an amount corresponding to the size of the effective data that is the object of read-out this time that was notified also to the image processing module 38 that is the source of the read-out request.

In step 472, the effective data pointers corresponding to the individual image processing modules 38 of the subsequent stage are respectively referred to, and it is judged whether or not, due to the pointer updating of step 470, a unit buffer region for which reading-out of the stored image data by the respective image processing modules 38 of the subsequent stage has all been completed, i.e., a unit buffer region in which no effective data is stored, has appeared among the unit buffer regions structuring the buffer 40A. If the judgment is negative, the routine proceeds to step 478 without any processing being carried out. If the judgment is affirmative, the routine proceeds to step 474 where it is judged whether or not the buffer flag is 1. If its own module is the buffer module 40 generated by the module generating section 44, the judgment is negative and the routine proceeds to step 476 where the resource managing section 46B is requested to free the unit buffer region in which no effective data is stored.

Note that, if its own module is the buffer module 40 generated by the application 32, the judgment in step 474 is affirmative, and the routine moves on to step 478 without any processing being carried out. Accordingly, if a buffer region (memory region) designated by the user is used as the buffer 40A, that buffer region is stored without being freed. Then, in step 478, the number of waiting requests is decreased by 1, the data read-out processing ends, and the routine returns to step 378 of the buffer control processing (FIG. 6).

On the other hand, in a case in which the data amount of the effective data that is stored in the buffer 40A and that can be read-out by the image processing module 38 that is the source of the read-out request is less than the unit read-out data amount, and the end of the effective data that can be read-out is not the end of the image data that is the object of processing (i.e., in a case in which it is sensed that there is no readable effective data in (4) of FIG. 15B), the judgments of steps 452 and 454 are both negative, and the routine proceeds to step 480 where a data request, that requests new image data, is outputted to the workflow managing section 46A (see (5) in FIG. 15B as well). In this case, a processing request is inputted by the workflow managing section 46A to the image processing module 38 of the preceding stage of its own module. Further, in step 482, the request information, that was taken-out from the queue in prior step 382 (FIG. 6), is again registered at the end of the original queue, and the data read-out processing ends.

As shown in FIG. 6, when the data read-out processing ends, the routine returns to step 378 (FIG. 6). Therefore, in this case, if no other request information is registered in the queue, the request information that was registered again at the end of the queue is immediately taken-out again from the queue, and the data read-out processing of FIGS. 10A and 10B is again executed. If other request information is registered in the queue, the other request information is taken-out and processing corresponding thereto is carried out, and thereafter, the request information that was registered again at the end of the queue is again taken-out from the queue, and the data read-out processing of FIGS. 10A and 10B is executed again. Accordingly, in a case in which a read-out request from the image processing module 38 of the subsequent stage is inputted, but the data amount of the effective data that can be read-out by the image processing module 38 that is the source of the read-out request is less than the unit read-out data amount, and the end of the effective data that can be read-out is not the end of the image data that is the object of processing, the corresponding request information is stored and the data read-out processing is executed repeatedly until either the data amount of the effective data that can be read-out becomes greater than or equal to the unit read-out data amount, or it is sensed that the end of the effective data that can be read-out is the end of the image data that is the object of processing (i.e., until the judgment of step 452 or step 454 is affirmative).

Further, if the judgment in step 455 is negative, the routine moves on to step 484. In step 484, the resource managing section 46B is requested to reserve memory. Here, the resource managing section 46B is requested to reserve a buffer region for transfer in the memory space that corresponds to the processor that the source of the read-out request uses in image processing. As explained with reference to FIG. 2B and the like, the resource managing section 46B that receives this request reserves the buffer region for transfer in the memory space that corresponds to the processor that the source of the read-out request uses in image processing. Note that, in the present exemplary embodiment, the buffer region for transfer has a size that is greater than or equal to the unit read-out data amount, and is not reserved over plural regions.

In step 486, transfer processing is carried out. Here, image data is read-out from the region, in which the effective data that is the object of read-out is stored, of the unit buffer region, and is successively transferred to the reserved buffer region for transfer. In a case in which the effective data that is the object of read-out extends over plural unit buffer regions, the image data is read-out successively from the plural unit buffer regions, and is transferred to the buffer region for transfer. When transfer ends, the effective data pointer, that corresponds to the image processing module 38 that is the source of the read-out request, is updated in the same way as described above. Note that, in a case in which a DMA (Direct Memory Access) controller or the like is provided and the transfer processing is structured such that DMA transfer is possible, a DMA transfer command may be outputted from the processor to the DMA controller, and thereafter, the transfer processing may be carried out without going through the processor.

Next, the routine proceeds to step 462. If the judgment in step 455 is negative and step 462 is executed after step 484 and step 486, in step 462, the start address of the buffer region for transfer is notified to the source of the read-out request as the address of the read-out region, and the source of the read-out request is asked to read-out the image data in order from the notified start address. Due thereto, the source of the read-out request reads-out the image data from the memory space corresponding to the processor that the source of the read-out request itself uses, and can use the image data in image processing.

Figure 22A:
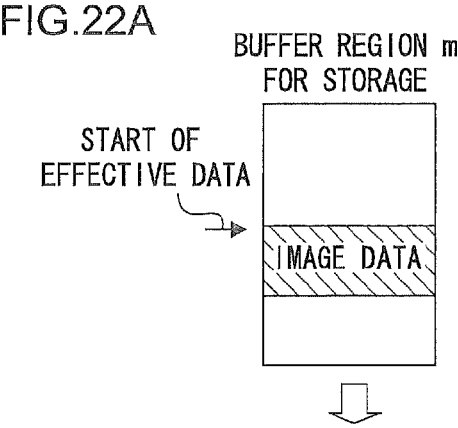
FIGS. 22A-22C are explanatory drawings that explains transfer processing that is carried out at the buffer module.
Figure 22B:
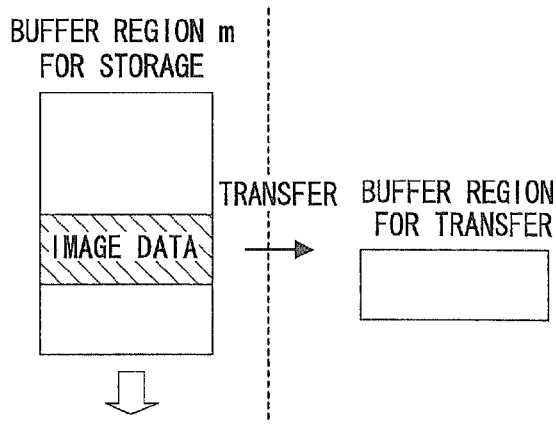
Figure 22C:
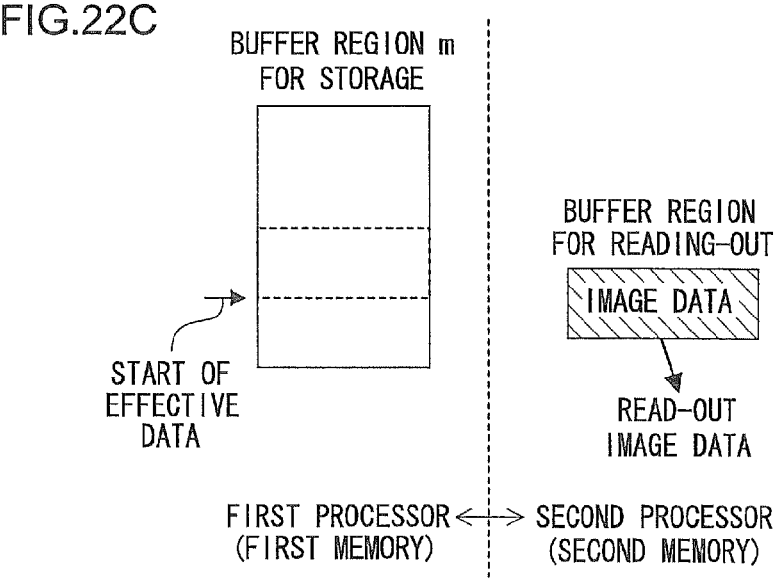

The transfer processing is described with reference to FIGS. 22A-22C. As shown in FIG. 22A, here, description is given of the image processing module 38 of the preceding stage of the buffer module 40 being a module that carries out buffer control processing by using the first processor (the CPU 12), and the effective data that is the object of read-out being stored in a single unit buffer region. If the image processing module 38 of the subsequent stage uses the second processor (the GPU 52), as shown in FIG. 22B, the buffer region for transfer is reserved in the second memory 54. Next, the effective data is read-out from that unit buffer region, and is transferred to the buffer region for transfer. The module of the subsequent stage reads-out the effective data from the start address of the buffer for transfer, that was reserved in the memory space that that module of the subsequent stage uses, and can use the effective data in image processing.

Figure 23A:
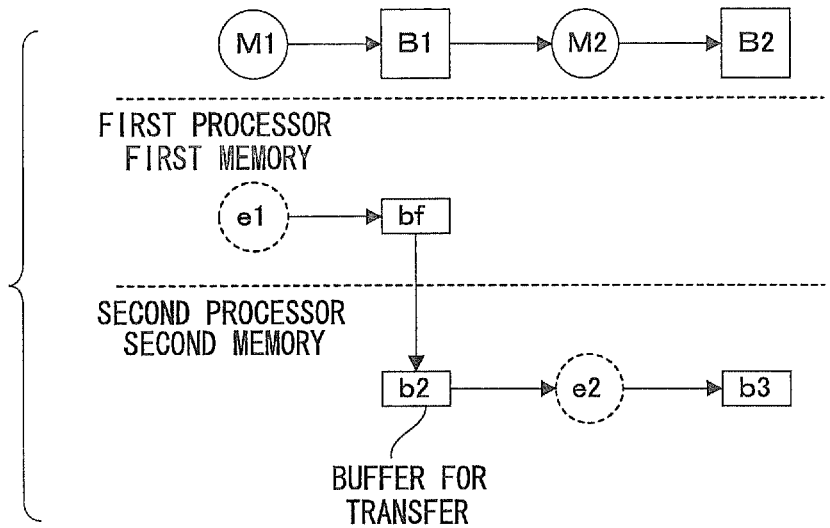
FIG. 23A is a drawing that schematically explains a method of handing-over image data in a case in which the processors used at the preceding-stage module and the subsequent-stage module are different.

FIG. 23 is a drawing that schematically shows the method of handing-over image data relating to the present exemplary embodiment. Processing in a case in which the processors that are used at the image processing module 38 of the preceding stage (hereinafter denoted by reference numeral M1) and the image processing module 38 at the subsequent stage (hereinafter denoted by reference numeral M2) are different, is shown schematically in FIG. 23A. The image processing module M1 uses the first processor (the CPU 12), and the image processing module M2 uses the second processor (the GPU 52). At this time, the buffer module 40 (hereinafter denoted by reference numeral B1), that is connected between the image processing module M1 and the image processing module M2, reserves the buffer for transfer in the second memory 54, and transfers, to the buffer region for transfer, image data that was written in the buffer 40A (the unit buffer region) reserved in the first memory 14. The image processing module M2 reads-out the image data that was written in the buffer region for transfer, and carries out image processing.

Figure 23B:
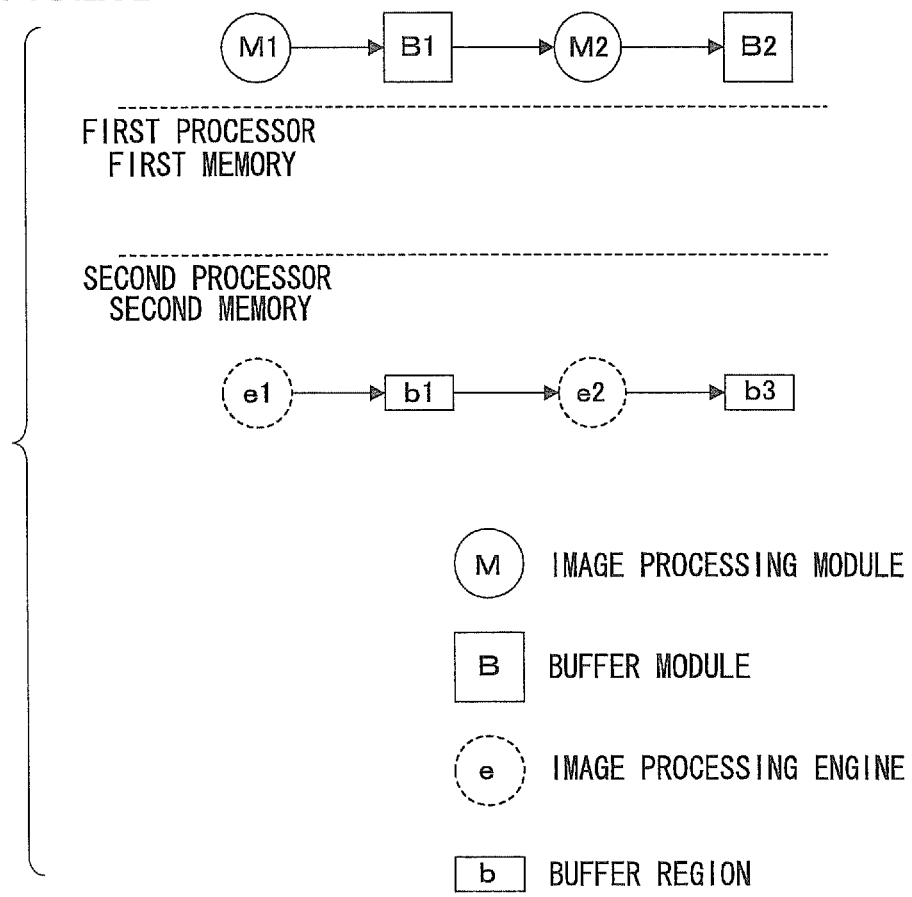
FIG. 23B is a drawing that schematically explains a method of handing-over image data in a case in which the processors used at the preceding-stage module and the subsequent-stage module are the same.

Processing in a case in which the processors that are used at the image processing module M1 of the preceding stage and the image processing module M2 of the subsequent stage are the same, is shown schematically in FIG. 23B. In this case, the buffer module B1 does not reserve any buffer region for transfer, and notifies the image processing module M2 of the subsequent stage of the start address of the storage region in which is stored the effective data of the buffer 40A that is reserved in the first memory 14. The image processing module M2 of the subsequent stage reads-out the image data in order from the notified start address, and carries out image processing.

Due thereto, the image processing section can carry out image processing efficiently, without superfluous transfer processing arising.

Note that, although details thereof are described later, when a data request is inputted from the buffer module 40, the workflow managing section 46A inputs a processing request to the image processing module 38 of the preceding stage of the buffer module 40 that is the source of the data request (refer also to (6) in FIG. 15B). Due to processing that is triggered by the input of this processing request and that is carried out at the control section 38B of the image processing module 38 of the preceding stage, when the image processing module 38 of the preceding stage becomes able to write image data to the buffer module 40, due to a write request being inputted from the image processing module 38 of the preceding stage, the above-described data writing processing (FIGS. 8A and 8B) is carried out, and image data is written to the buffer 40A of the buffer module 40 from the image processing module 38 of the preceding stage (refer also to (7), (8) of FIG. 15B). Due thereto, reading-out of image data from the buffer 40A by the image processing module 38 of the subsequent stage is carried out (refer also to (9) of FIG. 15B).

Further, although not shown in FIG. 15B, in a case in which the buffer region for transfer is reserved separately as described above, transfer of image data from the buffer region of the buffer 40A to the buffer region for transfer is carried out, and reading-out of image data from the buffer for transfer by the image processing module 38 of the subsequent stage is carried out.

As described above, in the buffer control processing relating to the present exemplary embodiment, each time either a write request is inputted from the image processing module 38 of the preceding stage or a read-out request is inputted from the image processing module of the subsequent stage, the inputted request is registered in a queue as request information, and the request information is taken-out one-by-one from the queue and processed. Therefore, also in cases in which a read-out request is inputted during execution of the data writing processing or a write request is inputted during execution of the data read-out processing, exclusive control, that stops execution of the processing corresponding to the inputted request, is carried out until the processing being executed is completed and a state arises in which processing corresponding to the inputted request can be executed. Due thereto, even if the CPU 12 of the computer 10 executes, in parallel, processes or threads corresponding to individual modules structuring the image processing section 50, it is possible to avoid the occurrence of problems due to plural requests being inputted simultaneously or substantially simultaneously to the single buffer module 40. Therefore, the CPU 12 of the computer 10 can execute, in parallel, processes or threads corresponding to individual modules. Of course, the buffer module may be realized as a usual program or object.

Next, description will be given of image processing module control processing (FIG. 13) that is carried out by the control section 38B of the image processing module 38, each time a processing request is inputted from the workflow managing section 46A to the image processing module 38 structuring the image processing section 50. Note that it is assumed here that, in a case in which the image data supplying section 22 is a module, the processor that is used by the image processing module 38 that is connected immediately following this image data supplying section 22 is the same as the processor that the image data supplying section 22 uses, and, in a case in which the image output section 24 is a module, the processor that is used by the image processing module 38 that is connected immediately before the image output section 24 is the same as the processor that the image output section 24 uses.

In the image processing module control processing, first, in step 284, in a case in which a module (the buffer module 40, or the image data supplying section 22, the image processing module 38, or the like) exists at the preceding stage of its own module, data (image data, or the results of processing of image processing such as analysis or the like) is requested from that module of the preceding stage. Note that, if the module of the preceding stage is the buffer module 40 and image data is requested, its own module gives notice, together with the request, of identification information that identifies the processor that its own module uses in image processing. In next step 286, it is judged whether data can be acquired from the module of the preceding stage. If the judgment is negative, in step 288, it is judged whether or not notification has been given of the ending of the entire processing. If the judgment of step 288 is negative, the routine returns to step 286, and steps 286 and 288 are repeated until it becomes possible to acquire data from the module of the preceding stage. If the judgment in step 286 is affirmative, in step 290, data acquisition processing, that acquires data from the module of the preceding stage, is carried out.

Here, in a case in which the module of the preceding stage of its own module is the buffer module 40, when, in prior step 284, data is requested (a read-out request) and notification is given of the processor that its own module uses, immediately, the start address of the read-out region is notified from the buffer module 40 (in a case in which a buffer region for transfer is reserved, the start address of that buffer region for transfer is notified) and reading-out of the image data is asked for (see also step 462 in FIG. 10B), if there is a state in which the effective data that can be read-out is stored in the buffer 40A of the buffer module 40 in an amount that is greater than or equal to the unit read-out data amount, or the end of the effective data that can be read-out coincides with the end of the image data that is the object of processing. If there is not such a state, as the image processing module 38 of the preceding stage of the buffer module 40 writes image data to the buffer 40A of that buffer module 40, the state changes to the aforementioned state, and thereafter, the start address of the read-out region is notified from the buffer module 40 (in a case in which a buffer region for transfer is reserved, the start address of that buffer region for transfer is notified) and reading-out of the image data is asked for (see also step 462 of FIG. 10B). Due thereto, the judgment of step 286 is affirmative, and the routine proceeds to step 290. In step 290, data acquisition processing, that reads-out image data of the unit read-out data amount (or a data amount less than that) from the read-out region whose start address was notified from the buffer module 40 of the preceding stage, is carried out (refer also to (3) in FIG. 15A).

Further, if the module of the preceding stage of its own module is the image data supplying section 22, when a data request is outputted in prior step 284, notification is given immediately from the image data supplying section 22 of the preceding stage that there is a state in which image data can be acquired. Due thereto, the judgment of step 286 is affirmative, and the routine proceeds to step 290 where image data acquisition processing, that acquires image data of the unit read-out data amount from the image data supplying section 22 of the preceding stage, is carried out. Further, if the module of the preceding stage of its own module is the image processing module 38, when a data request (processing request) is outputted in prior step 284, if there is a state in which the image processing module 38 of the preceding stage can execute image processing, notification is given that there is a state in which data (the results of image processing) can be acquired due to a write request being inputted. Therefore, the judgment of step 286 is affirmative, and the routine proceeds to step 290. In step 290, due to the image processing module 38 of the preceding stage giving notice of the address of the buffer region in which data is to be written and asking for writing, data acquisition processing is carried out that writes, to that buffer, the data outputted from the image processing module 38 of the preceding stage.

In next step 292, the control section 38B judges whether or not plural modules are connected at the preceding stage of its own module. If the judgment is negative, the routine moves on to step 296 without any processing being carried out. If the judgment is affirmative, the routine proceeds to step 294 where it is judged whether or not data has been acquired from all of the modules connected at the preceding stage. If the judgment in step 294 is negative, the routine returns to step 284, and step 284 through step 294 are repeated until the judgment of step 294 is affirmative. When all of the data that is to be acquired from the modules of the preceding stage is gathered, either the judgment of step 292 is negative or the judgment of step 294 is affirmative, and the routine moves on to step 296.

Next, in step 296, the control section 38B requests the module of the subsequent stage of its own module for a region for data output. In step 298, judgment is repeated until a data output region can be acquired (i.e., until the start address of a data output region is notified). Note that, if the module of the subsequent stage is the buffer module 40, the aforementioned request for a region for data output is carried out by outputting a write request to that buffer module 40. When a data output region (if the module of the subsequent stage is the buffer module 40, a write region whose start address is notified from that buffer module 40) can be acquired (refer also to (4) in FIG. 15A), in next step 300, the data acquired in the previous data acquisition processing and (the start address of) the data output region acquired from the module of the subsequent stage are inputted to the image processing engine 38A. A predetermined image processing is canned out on the inputted data (see also (5) of FIG. 15A), and the data after processing is written to the data output region (see also (6) of FIG. 15A). When input of data of the unit read-out data amount to the image processing engine 38A is completed and the data outputted from the image processing engine 38A is all written to the data output region, in next step 302, the module of the subsequent stage is notified that output is completed.

Due to above-described step 284 through step 302, the processing of data of the unit processing data amount (i.e., unit processing) at the image processing module 38 is completed. However, there are cases in which the number of times of execution of the unit processing is designated by the workflow managing section 46A in the processing request that is inputted from the workflow managing section 46A to the image processing module 38. Therefore, in step 304, it is judged whether or not the number of times of execution of the unit processing has reached the number of times of execution that was instructed by the inputted processing request. If the instructed number of times of execution of the unit processing is one time, this judgment is unconditionally affirmative. However, if the instructed number of times of execution of the unit processing is greater than or equal to 2, the routine returns to step 284, and step 284 through step 304 are repeated until the judgment of step 304 is affirmative. When the judgment of step 304 is affirmative, the routine proceeds to step 306. In step 306, by outputting a processing completed notice to the workflow managing section 46A, the control section 38B notifies the workflow managing section 46A that processing corresponding to the inputted processing request is completed, and the image processing module control processing ends.

Further, when processing is carried out until the end of the image data that is the object of processing due to the above-described processings being repeated each time a processing request is inputted from the workflow managing section 46A, notification of the end of the image data that is the object of processing is given from the module of the preceding stage. Due thereto, the judgment of step 288 becomes affirmative, and the routine moves on to step 308. In step 308, the control section 38B outputs an entire processing completed notice, that means that processing of the image data that is the object of processing has finished, to the workflow managing section 46A and to the module of the subsequent stage. Further, in next step 310, self-module deletion processing (to be described later) is carried out, and the image processing module control processing ends.

Note that the image processing engine 38A, that carries out image analysis processing such as skew angle sensing processing or the like, is often structured such that the image processing results are not outputted in units of the unit read-out data amount, and the image processing results are outputted after all of the image data that is the object of processing has been inputted. At the control section 38B of an image processing module 38 having such an image processing engine 38A, steps 296 and 298 of the image processing module control processing (FIG. 13) and output of data to the module of the subsequent stage in step 300 are not carried out, and when the judgment in step 288 is affirmative due to the image data that is the object of processing being processed to the end, the data (image processing results) outputted from the image processing engine 38A is outputted to the exterior of its own module (to the workflow managing section 46A or the application 32). Then, if there is another image processing module 38 that requires the aforementioned image processing results (e.g., the image processing module 38 that carries out image rotation processing on the basis of the results of the skew angle sensing processing, or the like), the aforementioned image processing results are inputted from the workflow managing section 46A or the application 32 to that image processing module 38.

Figure 16A:
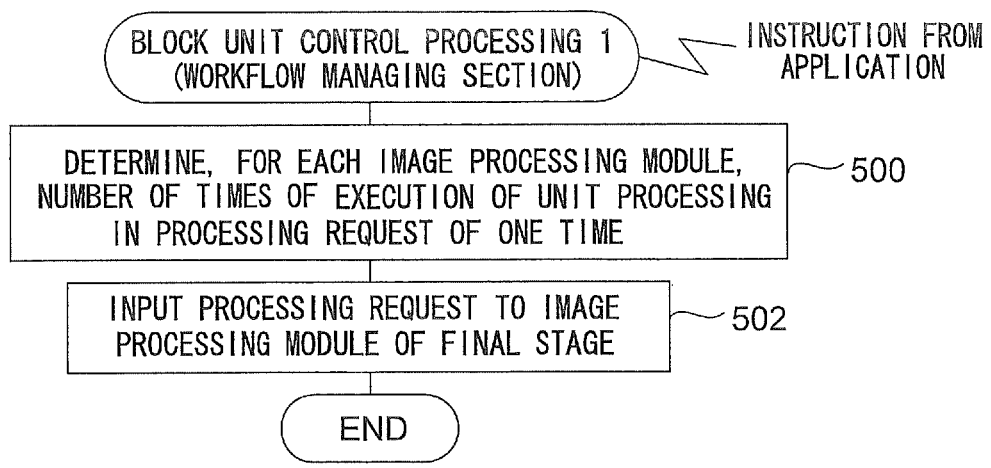
FIGS. 16A-16D are flowcharts showing the contents of block unit control processing that is executed by a processing managing section.

On the other hand, in a case in which block unit processing is designated as the form of execution of the image processing, when the workflow managing section 46A is started-up by the application 32, the workflow managing section 46A carries out the block unit control processing 1 shown in FIG. 16A. As described above as well, in the input of a processing request from the workflow managing section 46A to the individual image processing modules 38 of the image processing section 50, it is possible to designate the number of times of execution of the unit processing. In step 500 of the block unit control processing 1, the number of times of execution of the unit processing designated in a processing request of one time is set for each of the individual image processing modules 38. This number of times of execution of the unit processing per processing request of one time can be determined such that, for example, the number of times of input of a processing request to the individual image processing modules 38 during the time that all of the image data that is the object of processing is being processed, is averaged, or may be determined in accordance with another standard. Then, in next step 502, a processing request is inputted to the image processing module 38 of the final stage of the image processing section 50 (refer to (1) of FIG. 18 as well), and the block unit control processing 1 ends.

Here, in the image processing section 50 shown in FIG. 18, when a processing request is inputted from the workflow managing section 46A to an image processing module $38_4$ of the final stage, the control section 38B of the image processing module $38_4$ inputs a read-out request to a buffer module $40_3$ of the preceding stage (refer to (2) of FIG. 18). At this time, no effective data (image data) that can be read-out by the image processing module $38_4$ is stored in the buffer 40A of the buffer module $40_3$. Therefore, the buffer control section 40B of the buffer module $40_3$ inputs a data request to the workflow managing section 46A (refer to (3) of FIG. 18).

Figure 16B:
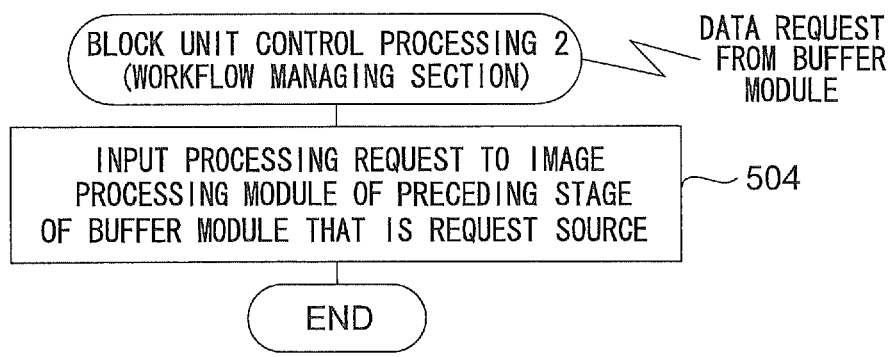

In a case in which the form of execution of the image processing is block unit processing, each time a data request is inputted from the buffer module 40, the workflow managing section 46A carries out the block unit control processing 2 shown in FIG. 16B. In this block unit control processing 2, in step 504, on the basis of the information registered in the table shown in FIG. 4B, the image processing module 38 of the preceding stage (here, an image processing module $38_3$) of the buffer module 40 that is the input source of the data request (here, the buffer module $40_3$), is recognized, and a processing request is inputted to the recognized image processing module 38 of the preceding stage (refer to (4) of FIG. 18), and the processing ends.

When a processing request is inputted, the control section 38B of the image processing module $38_3$ inputs a read-out request to a buffer module $40_2$ of the preceding stage (refer to (5) of FIG. 18). Because image data that can be read-out is also not stored in the buffer 40A of the buffer module $40_2$, the buffer control section 40B of the buffer module $40_2$ inputs a data request to the workflow managing section 46A (refer to (6) of FIG. 18). Also when a data request is inputted from the buffer module $40_2$, the workflow managing section 46A again carries out the above-described block unit control processing 2, and thereby inputs a processing request to an image processing module $38_2$ of the preceding stage thereof (refer to (7) of FIG. 18). The control section 38B of the image processing module $38_2$ inputs a read-out request to a buffer module $40_1$ of the preceding stage (refer to (8) of FIG. 18). Further, because image data that can be read-out is also not stored in the buffer 40A of the buffer module $40_1$, the buffer control section 40B of the buffer module $40_1$ also inputs a data request to the workflow managing section 46A (refer to (9) of FIG. 18). Also when a data request is inputted from the buffer module $40_1$, the workflow managing section 46A again carries out the above-described block unit control processing 2, and thereby inputs a processing request to an image processing module $38_1$ of the preceding stage thereof (refer to (10) of FIG. 18).

Here, the module of the preceding stage of the image processing module $38_1$ is the image data supplying section 22. Therefore, by inputting a data request to the image data supplying section 22, the control section 38B of the image processing module $38_1$ acquires image data of the unit read-out data amount from the image data supplying section 22 (refer to (11) of FIG. 18). The image data, that is obtained by the image processing engine 38A carrying out image processing on the acquired image data, is written to the buffer 40A of the buffer module $40_1$ of the subsequent stage (refer to (12) of FIG. 18). Note that, when the control section 38B of the image processing module $38_1$ finishes the writing of image data to the buffer 40A of the buffer module $40_1$ of the subsequent stage, the control section 38B inputs a processing completed notice to the workflow managing section 46A.

Figure 16C:
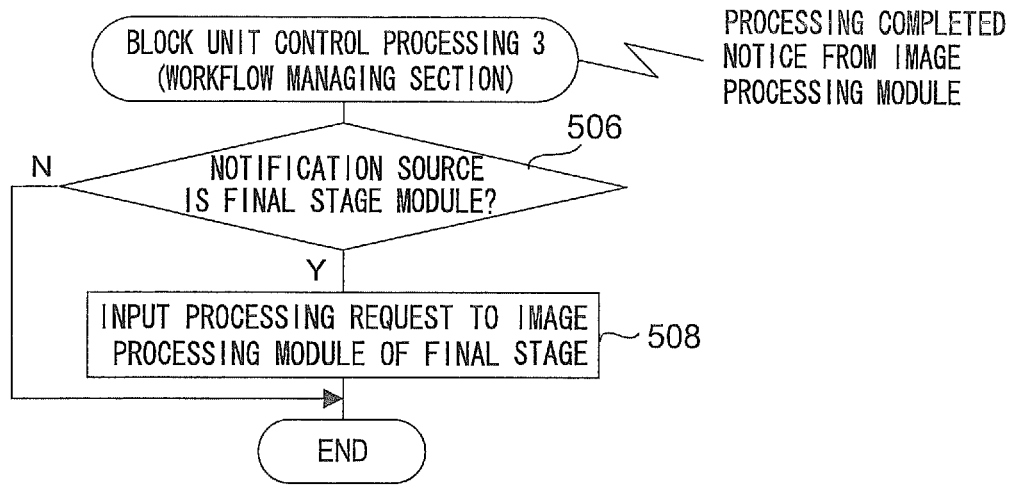

In a case in which the form of execution of the image processing is block unit processing, each time a processing completed notice is inputted from the image processing module 38, the workflow managing section 46A carries out the block unit control processing 3 shown in FIG. 16C. In this block unit control processing 3, in step 506, it is judged whether or not the source of the processing completed notice is the image processing module 38 of the final stage of the image processing section 50. If the judgment is negative in this case, the processing ends without any processing being carried out (the same holds for cases in which a processing completed notice is inputted from the image processing module $38_2$, $38_3$).

Further, when effective data, that can be read-out by the image processing module $38_2$ of the subsequent stage and that is of an amount that is greater than or equal to the unit read-out data amount, is written, the buffer control section 40B of the buffer module $40_1$ asks the image processing module $38_2$ to read-out. Accompanying this, the control section 38B of the image processing module $38_2$ reads-out image data of the unit read-out data amount from the buffer 40A of the buffer module $40_1$ (refer to (13) of FIG. 18), and writes, to the buffer 40A of the buffer module $40_2$ of the subsequent stage (refer to (14) of FIG. 18), the image data that is obtained by the image processing engine 38A carrying out image processing on the acquired image data. When effective data, that can be read-out by the image processing module $38_3$ of the subsequent stage and that is of an amount that is greater than or equal to the unit read-out data amount, is written, the buffer control section 40B of the buffer module $40_2$ asks the image processing module $38_3$ to read-out. The control section 38B of the image processing module $38_3$ reads-out image data of the unit read-out data amount from the buffer 40A of the buffer module $40_2$ (refer to (15) of FIG. 18), and writes, to the buffer 40A of the buffer module $40_3$ of the subsequent stage (refer to (16) of FIG. 18), the image data that is obtained by the image processing engine 38A carrying out image processing on the acquired image data.

Further, when effective data, that can be read-out by the image processing module $38_4$ of the subsequent stage and that is of an amount that is greater than or equal to the unit read-out data amount, is written, the buffer control section 40B of the buffer module $40_3$, when needed, carries out transfer processing from the buffer 40A to the buffer for transfer, and asks the image processing module $38_4$ to read-out. Accompanying this, the control section 38B of the image processing module $38_4$ reads-out image data of the unit read-out data amount from the buffer 40A of the buffer module $40_3$ (or from the buffer for transfer after the transfer processing) (refer to (17) of FIG. 18), and outputs, to the image output section 24 that is the module of the subsequent stage (refer to (18) of FIG. 18), the image data that is obtained by the image processing engine 38A carrying out image processing on the acquired image data. Further, when the control section 38B of the image processing module $38_4$ completes the writing of image data to the image output section 24, the control section 38B inputs a processing completed notice to the workflow managing section 46A (refer to (19) in FIG. 18). In this case, the judgment in step 506 of the aforementioned block unit control processing 3 is affirmative, and the routine proceeds to step 508 where a processing request is again inputted to the image processing module $38_4$ that is the final-stage image processing module 38, and thereafter, processing ends.

Due to a processing request being re-inputted to the image processing module $38_4$ that is the final stage, the above-described processing sequence is repeated again, and image processing, that is in a form of execution of block units, is successively carried out on the image data that is the object of processing. When the image data supplied from the image data supplying section 22 reaches the end of the image data that is the object of processing, input of entire processing ended notices from the individual image processing modules 38 to the workflow managing section 46A is successively carried out from the image processing modules 38 at the preceding stages.

Figure 16D:
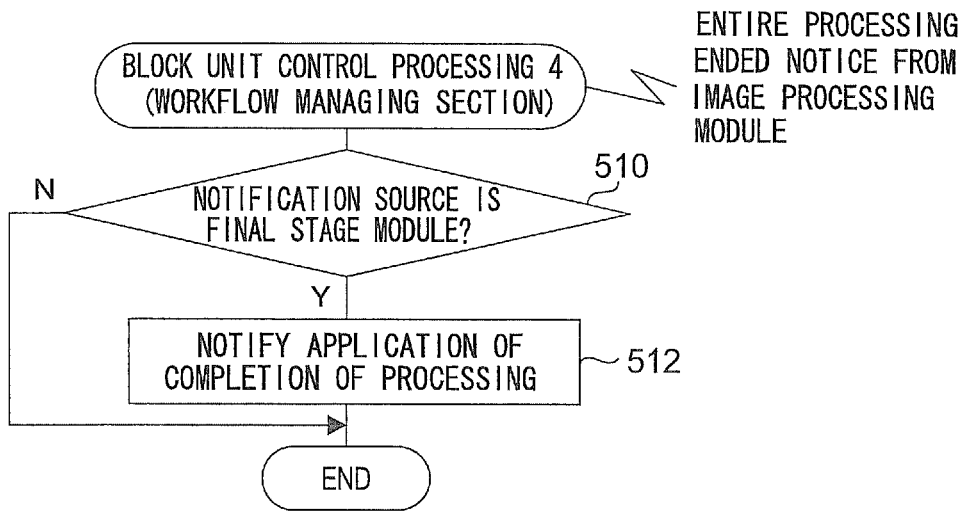

In a case in which the form of execution of the image processing is block unit processing, each time an entire processing ended notice is inputted from the image processing module 38, the workflow managing section 46A carries out the block unit control processing 4 shown in FIG. 16D. In this block unit control processing 4, in step 510, it is judged whether or not the image processing module 38, that is the source of input of the entire processing ended notice, is the image processing module 38 of the final stage. If this judgment is negative, processing ends without any processing being carried out. However, in a case in which an entire processing ended notice is inputted from the image processing module 38 of the final stage due to all of the image data, that has been obtained by the necessary image processings being carried out on the image data that is the object of processing, being outputted to the image output section 24, the judgment of step 510 is affirmative, and the routine moves on to step 512. In step 512, the application 32 is notified of the completion of image processing (refer to step 180 of FIG. 3 as well), and the block unit control processing ends. Then, the application 32, that has been notified of the completion of image processing, notifies the user that image processing has been completed (refer to step 182 in FIG. 3 as well).

In this way, in the block unit processing, a processing request inputted to the image processing module 38 of the final stage is transferred backward to the image processing modules 38 of the preceding stages. When the processing request reaches the image processing module 38 of the most-preceding stage, a series of image processings is carried out by a flow in which image processing is carried out at the image processing module 38 of the most-preceding stage, data is written to the buffer module 40 of the subsequent stage, and if, due thereto, the data is sufficient, the processing proceeds to the module of the subsequent stage.

Figure 17A:
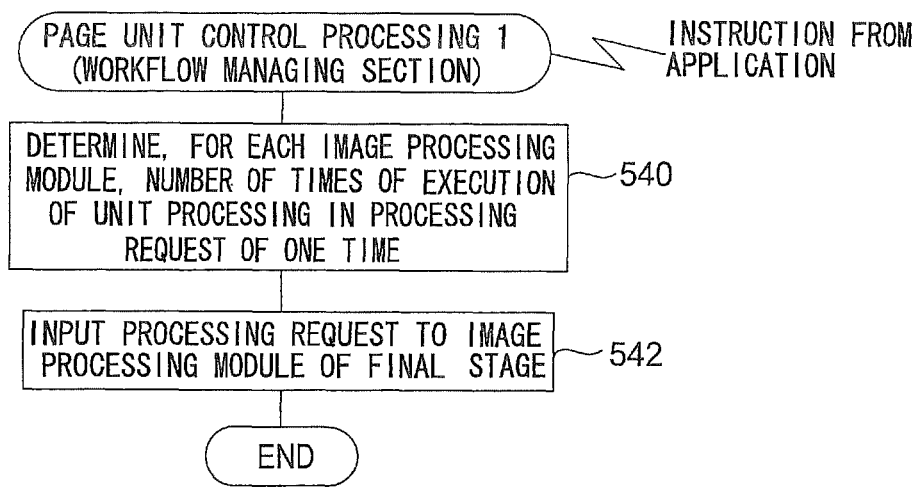
FIGS. 17A-17D are flowcharts showing the contents of page unit control processing that is executed by the processing managing section.
Figure 17B:
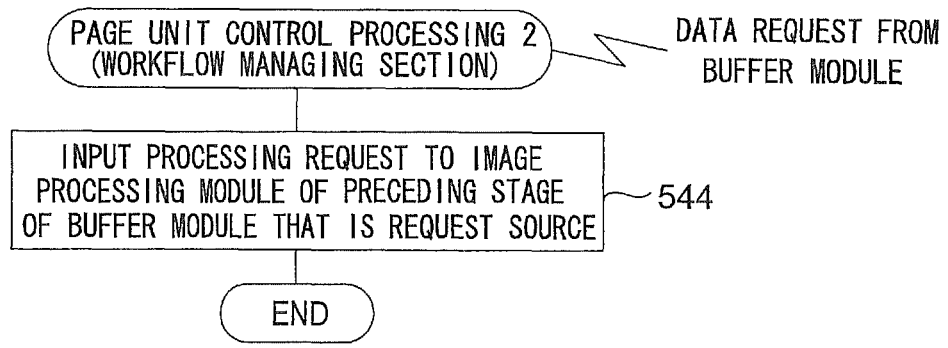

Further, in a case in which page unit processing is designated as the form of execution of the image processing, when the workflow managing section 46A is started-up by the application 32, the workflow managing section 46A carries out the page unit control processing 1 shown in FIG. 17A. In the page unit control processing 1, in the same way as in the above-described block unit control processing 1 (FIG. 16A), the number of times of execution of the unit processing designated in a processing request of one time, is set for each of the individual image processing modules 38 (step 540). In next step 542, a processing request is inputted to the image processing module 38 of the final stage in the image processing section 50 (refer to (1) of FIG. 18), and processing ends. Further, in a case in which the form of execution of the image processing is page unit processing, each time a data request is inputted from the buffer module 40, the workflow managing section 46A carries out the page unit control processing 2 shown in FIG. 17B. In the page unit control processing 2, in the same way as in the above-described block unit control processing 2 (FIG. 16B), in step 544, on the basis of information registered in the table shown in FIG. 4B, the image processing module 38 of the preceding stage of the buffer module 40 that is the source of input of the data request is recognized, a processing request is inputted to the recognized image processing module 38 of the preceding stage, and processing ends.

In this way, even if the form of execution of the image processing is page unit processing, the processing that the workflow managing section 46A carries out when started-up by the application 32, and the processing that the workflow managing section 46A carries out each time a data request is inputted from the buffer module 40, are the same as at the time when the form of execution of the image processing is block unit processing. Therefore, in the page unit processing as well, after a processing request is inputted from the workflow managing section 46A to the image processing module 38 of the final stage of the image processing section 50, as shown in (2) through (10) of FIG. 18, the input of a data request to the buffer module 40 of the preceding stage from the image processing module 38 to which a processing request was inputted, and the input of a data request to the workflow managing section 46A from the buffer module 40 to which the data request was inputted, and the accompanying input of a processing request to the image processing module of the preceding stage of that buffer module 40 from the workflow managing section 46A proceed successively from the image processing module 38 of the final stage of the image processing section 50 toward the image processing module 38 at the most-preceding stage of the image processing section 50.

Further, when a processing request is inputted from the workflow managing section 46A, the image processing module $38_1$ of the most-preceding stage of the image processing section 50 acquires image data of the unit read-out data amount from the image data supplying section 22 (refer to (11) of FIG. 18). The image processing module $38_1$ writes the image data, that is obtained by the image processing engine 38A carrying out image processing on the acquired image data, to the buffer 40A of the buffer module $40_1$ of the subsequent stage (refer to (12) of FIG. 18), and inputs a processing completed notice to the workflow managing section 46A.

Figure 17C:
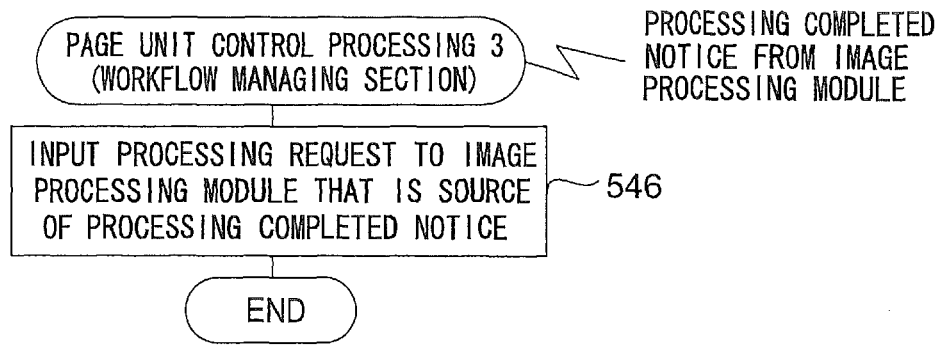
Figure 17D:
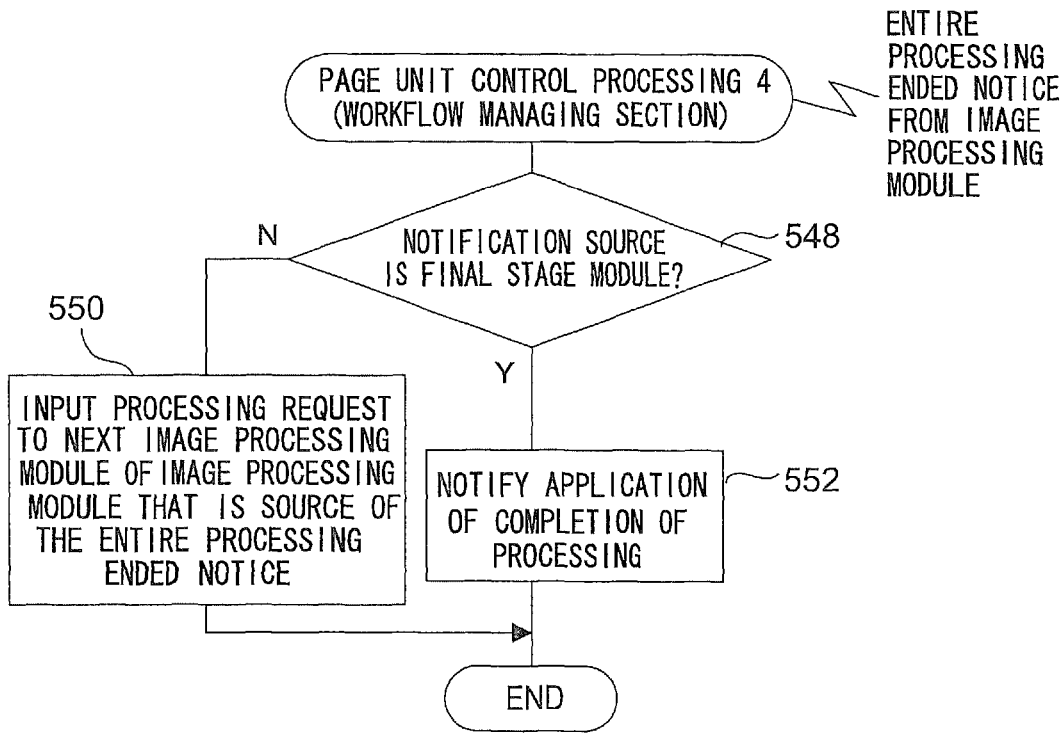

However, in a case in which the form of execution of image processing is page unit processing, each time a processing completed notice is inputted from the image processing module 38, the workflow managing section 46A carries out the page unit control processing 3 shown in FIG. 17C. In the page unit control processing 3, in step 546, the processing request is re-inputted to the image processing module 38 that is the source of the processing completed notice, and processing ends. In this way, in the page unit control processing, during the period of time until the specific image processing module 38, that inputted the processing completed notice to the workflow managing section 46A, completes image processing on the image data that is the object of processing, each time a processing completed notice is inputted from that specific image processing module 38, the processing request is repeatedly inputted only to that specific image processing module 38.

When the image processing module $38_1$ completes image processing of the image data that is the object of processing, and all of the image data, that is the object of processing and that has undergone image processing at the image processing module $38_1$, is stored in the buffer 40A of the buffer module $40_1$, an entire processing ended notice is inputted from the image processing module $38_1$ to the workflow managing section 46A. In a case in which the form of execution of the image processing is page unit processing, each time an entire processing ended notice is inputted from the image processing module 38, the workflow managing section 46A carries out the page unit control processing 4 shown in FIG. 17D. In this page unit control processing 4, in step 548, it is judged whether or not the source of the entire processing ended notice is the image processing module 38 of the final stage of the image processing section 50. If the judgment is negative, the routine moves on to step 550 where, on the basis of the information registered in the table shown in FIG. 4B, the image processing module 38, that is next after the image processing module 38 that is the source of the entire processing ended notice, is recognized, a processing request is inputted to this recognized next image processing module 38, and processing ends.

In this way, in the page unit control processing, a processing request inputted to the image processing module 38 of the final stage is transferred backward to the image processing modules 38 of more preceding stages, and after reaching the image processing module 38 of the most-preceding stage, a processing request is repeatedly inputted only to the image processing module 38 of the most-preceding stage. When image processing at that image processing module 38 of all of the image data that is the object of processing is completed, image processing on all of the image data that is the object of processing is carried out at the next image processing module 38. Due to this processing proceeding in order to the image processing modules 38 of the subsequent stages, the series of image processing operations is carried out. Then, when an entire processing ended notice is inputted from the image processing module 38 of the final stage due to all of the image data, that is obtained by the needed image processings being carried out on the image data that is the object of processing, being outputted to the image output section 24, the judgment of step 548 of the page unit control processing 4 (FIG. 17D) is affirmative, and the routine proceeds to step 552. In step 552, the application 32 is notified of the completion of image processing (refer to step 180 of FIG. 3 as well), and the page unit control processing ends. Then, the application 32, that is informed of the completion of image processing, notifies the user that image processing is completed (refer to step 182 of FIG. 3 as well).

Note that, in the page unit control processing shown in FIGS. 17A-17D, the image processing module 38, to which the processing request is repeatedly inputted, is switched on the occasion of the inputting of the entire processing ended notice from the image processing module. However, the present invention is not limited to the same. A structure may be used in which the image processing module 38, to which the processing request is repeatedly inputted, is switched on the occasion of the inputting of a processing completed notice from a different image processing module 38.

Further, in the above description, the inputting of the processing request to the image processing module 38 of the final stage is carried out by the workflow managing section 46A. However, the present invention is not limited to the same. The workflow managing section 46A may hold the module, that is positioned at the final stage of a pipeline or at plural final points of a directed acyclic graph, and carry out the processing request, or the application 32 may hold this module and carry out the processing request. Or, as in the example of above-described FIG. 5B, in a case in which, at the interior of the module generating section 44, an image processing module that carries out skew angle sensing processing and an image processing module that carries out image rotation processing are combined so as to form a skew correction processing module, the skew angle information is needed as a processing parameter at the time of generating the image rotation processing module. Thus, there is also a method in which, at the interior of the skew correcting module generating section, processing requests are repeatedly made to the skew angle sensing processing module and the entire image is processed, and the skew angle information obtained as a result thereof is provided to the image rotation processing module as a processing parameter.

Next, description will be given of the deleting of the image processing section 50, that is carried out after image processing on the image data that is the object of processing has been completed. In step 308 of the image processing module control processing (FIG. 13), the control section 38B of the individual image processing module 38 outputs an entire processing ended notice to the workflow managing section 46A and to the module of the subsequent stage, and thereafter, in next step 310, carries out self-module deletion processing.

As shown in FIG. 14, in the self-module deletion processing, first, in step 320, the control section 38B requests the resource managing section 46B to free the memory region reserved in prior step 254 (FIG. 12). Due thereto, due to the processing at the time of a memory freeing request (FIG. 2C) being carried out at the resource managing section 46B, this memory region is freed. In next step 322, it is judged whether or not there is a resource, other than memory, that its own module reserved through the resource managing section 46B. If the judgment is negative, the routine moves on to step 326 without any processing being carried out. If the judgment is affirmative, the routine moves on to step 324. In step 324, the control section 38B notifies the resource managing section 46B of the identification information of its own module, and requests the freeing of the resource, other than memory, that its own module reserved. Due thereto, due to the processing at the time of a resource freeing request (FIG. 2E) being carried out at the resource managing section 46B, this resource is freed.

In the self-module deletion processing (FIG. 14), the routine proceeds to step 326 if the judgment in step 322 is negative, or if, after the resource managing section 46B is requested to free a resource other than memory in step 324, a notice that resource freeing is completed is given from the resource managing section 46B. In step 326, the control section 38B inputs a deletion notice, for giving notice that processing for deleting its own module is to be carried out, to the module of the preceding stage of its own module, the module of the subsequent stage of its own module, and the workflow managing section 46A. Then, in step 328, the processing of deleting its own module is carried out, and the self-module deleting processing of FIG. 14 (i.e., step 310 of FIG. 13) ends. Note that deleting of its own module can be realized by either ending the process or thread corresponding to its own module, or deleting the object.

Note that, in the buffer control processing (FIG. 6) carried out by the buffer control section 40B of the buffer module 40, when a deletion notice is inputted from the image processing module 38 of the preceding stage or the subsequent stage of its own module, the judgment in step 380 is affirmative, and the routine moves on to step 390. In step 390, after the module that is the source of input of the deletion notice is stored, it is judged whether or not deletion notices have been inputted from all of the modules of the preceding stage and the subsequent stage of its own module. If the judgment is negative, the routine returns to step 378, and steps 378 and 380 are repeated as described above as well. Further, when deletion notices are inputted from all of the modules of the preceding stage and the subsequent stage of its own module, the judgment in step 390 is affirmative, and the routine proceeds to step 392. In step 392, by inputting a deletion notice to the workflow managing section 46A, the buffer control section 40B gives notice that the processing of deleting its own module is to be carried out. Then, in next step 394, processing for deleting its own module is carried out, and the buffer control processing (FIG. 6) ends.

Figure 19:
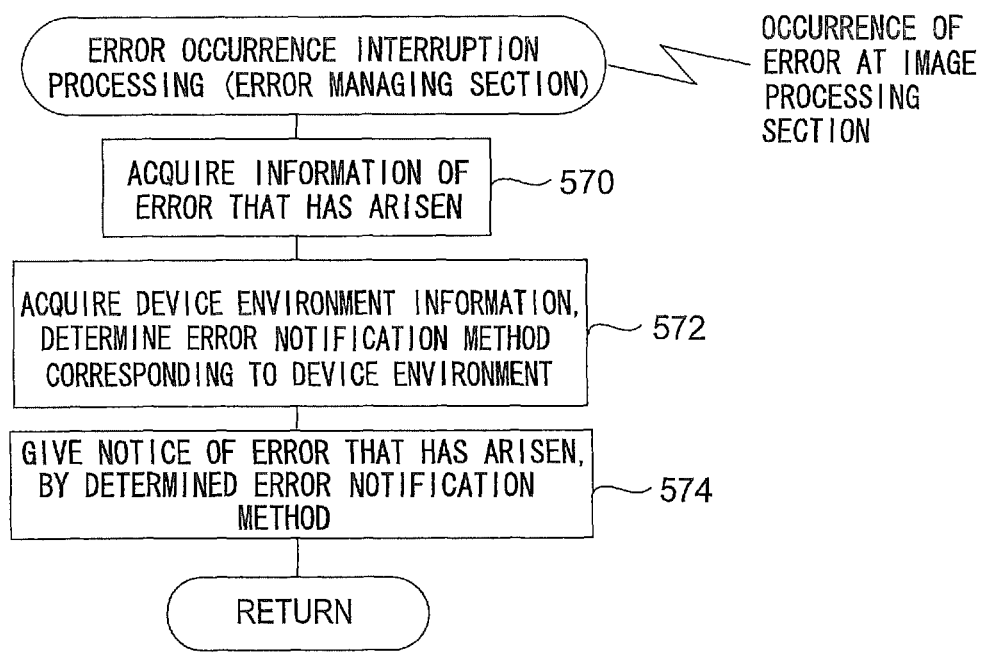
FIG. 19 is a flowchart showing the contents of error generation interruption processing that is executed by the processing managing section.

Finally, processing in a case in which an error arises while the image processing section 50 is in the midst of executing image processing will be described. When an error arises while the image processing section 50 is in the midst of executing image processing, the error managing section 46C of the processing managing section 46 carries out the error occurrence interruption processing shown in FIG. 19 due to an interruption arising. In this error occurrence interruption processing, first, in step 570, error information, such as the type of, the place of occurrence of, and the like of the error that has arisen is acquired. Further, in the present exemplary embodiment, the storage section 20 stores device environment information, that expresses the type and the structure and the like of the device in which is incorporated the computer 10 in which the image processing program group 34 is installed. In next step 572, this device environment information is acquired from the storage section 20 or the like, and an error notification method, that corresponds to the device environment expressed by the acquired device environment information, is determined.

For example, if the computer 10 is an independent computer such as a PC or the like, a display at which various information can be displayed at one time is provided as the display section 16. Therefore, an error notification method, such as displaying all of the contents of the error information acquired in step 570 on the display section 16 by a pop-up window or the like, or the like is selected as the error notification method. Further, for example, if the device in which the computer 10 is incorporated is a device such as a copier, a printer, a fax machine, a multifunction device, a scanner, a photographic printer, or the like, the amount of information that can be displayed at one time on the display section 16 is limited, but a buzzer or the like is provided. Thus, a notification method is selected in which, by sounding the buzzer, notification is given that an error has occurred, and, among the error information acquired in step 570, only the type of the error is displayed on the display section 16, or the like. Then, in step 574, notification of occurrence of an error is given by the error notification method determined in step 572, and the error occurrence interruption processing ends.

In this way, in the error occurrence interruption processing relating to the present exemplary embodiment, an error notification method that corresponds to the device environment is selected from among plural types of error notification methods, and notification that an error has arisen is given by the selected error notification method. Therefore, the present invention can be applied by installing the image processing program group 34 relating to the present invention in computers 10 of various structures, and the versatility improves. Further, there is no need to carry out setting changing work, such as switching the processing at the time that an error arises or the like, in accordance with the structure of the computer 10 in which the image processing program group 34 is installed (i.e., in accordance with whether it is an independent computer, or a computer built into any of various types of devices, or the like). Therefore, the burden of work at the time of installation also is lessened.

Note that, although, here, error processing is explained on the premise of an interruption, the error processing does not have to be interruption processing. For example, the following structure may be used: when an error occurs, that module informs the error managing section 46C of the error information, and a state code, that expresses that processing cannot be carried out with respect to processing instructions thereafter, is returned. The processing managing section 46, that has received this information, returns this information to the application 32. The application 32 receives the error information from the error managing section 46C of the processing section 46, and on the basis thereof, itself carries out processing such as display or a buzzer or the like.

Note that, in the above description, in a case in which the processor that the image processing module 38 of the preceding stage uses and the processor that the image processing module 38 of the subsequent stage uses are different, the buffer module 40 connected between these image processing modules 38 reserves a buffer region for transfer and carries out transfer processing, and causes the module of the subsequent stage to read-out. However, the present invention is not limited to the same. For example, the image processing module 38 of the subsequent stage may carry out this transfer processing. In this case, instead of the data read-out processing shown in FIGS. 10A and 10B, the buffer control section 40B of the buffer module 40 executes the data read-out processing shown in FIGS. 24A and 24B. Here, steps in FIGS. 24A and 24B that carry out processings that are similar to those of FIGS. 10A and 10B are denoted by the same step numbers as in FIGS. 10A and 10B.

Figure 24A:
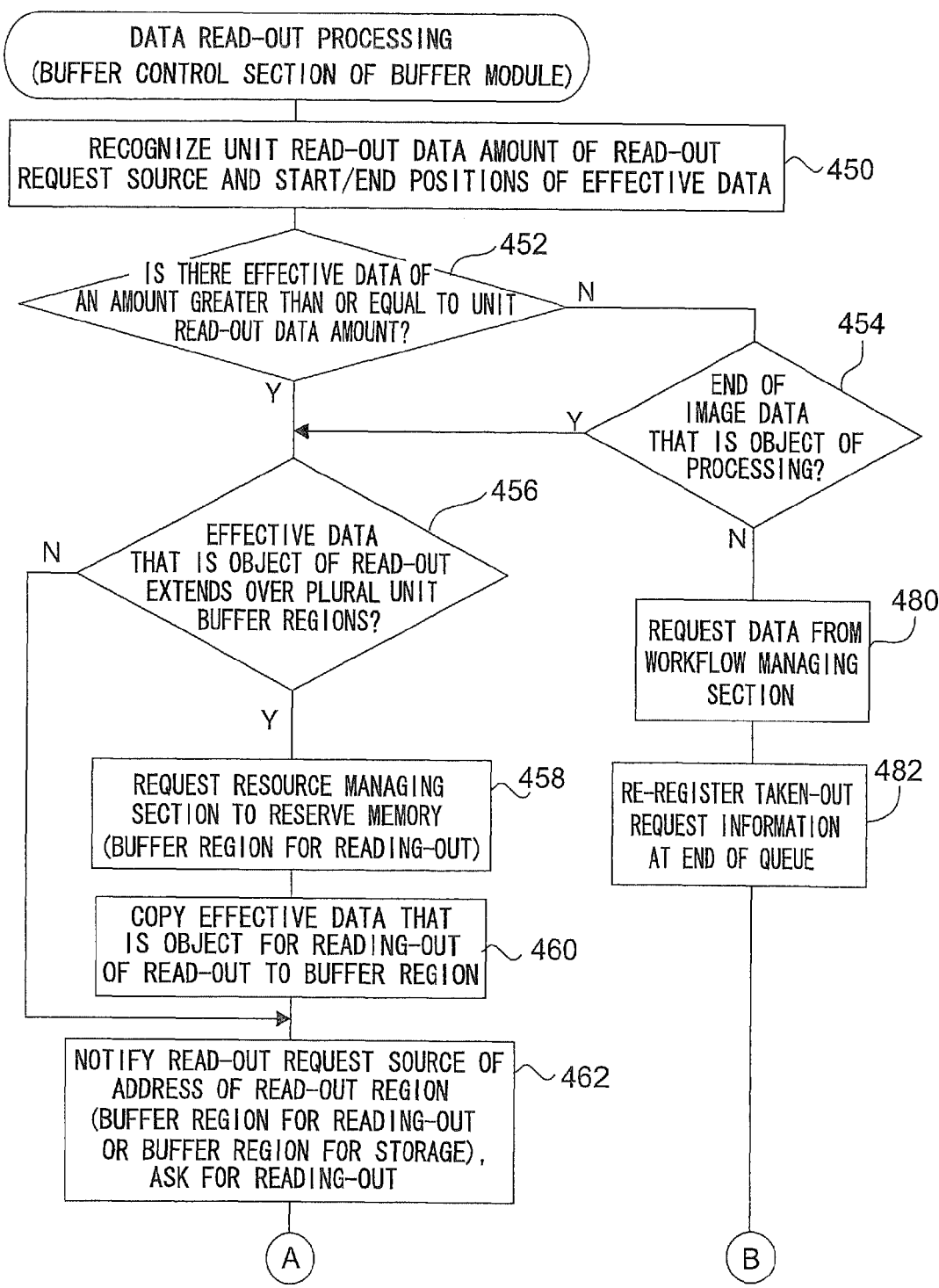
FIGS. 24A and 24B is a flowchart showing the contents of data read-out processing that is executed by the buffer module in a case in which the image processing module carries out transfer processing.
Figure 24B:
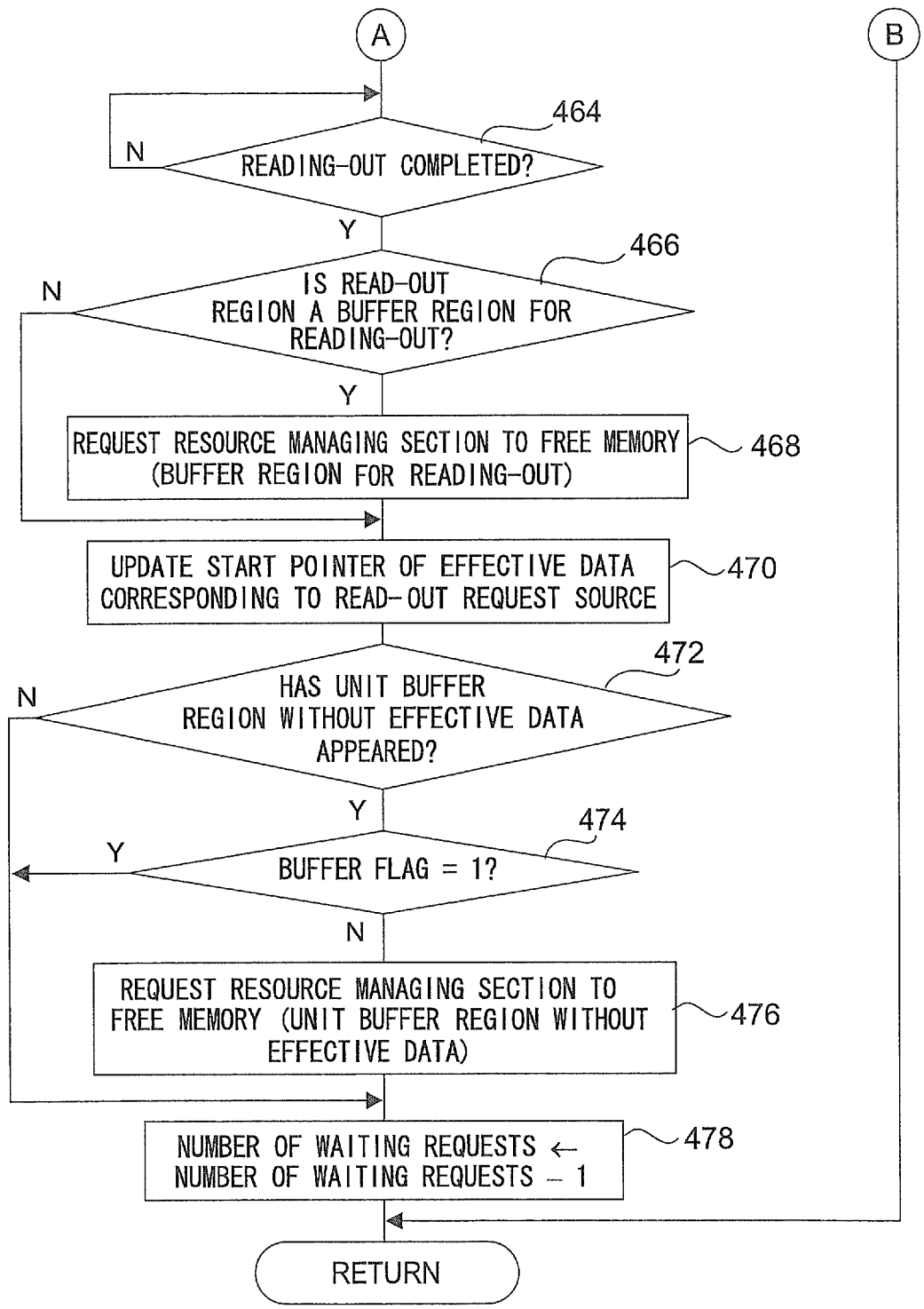

In the data read-out processing shown in FIGS. 24A and 24B, the processings of steps 455, 484, 486 are omitted, and the processing of step 456 is executed immediately when the judgment in step 452 is affirmative or when the judgment in step 454 is affirmative. Further, in step 462, the notified address of the read-out region does not become the address of a buffer region for transfer. Moreover, after step 464, instead of the processings of step 467 and step 469, processings of step 466 and step 468 are executed. In step 466, it is judged whether or not the read-out region in the read-out processing is the buffer region for reading-out that was reserved in prior step 458. If the judgment is negative, the routine moves on to step 470 without any processing being carried out. However, if the judgment in step 466 is affirmative, the routine moves on to step 468 where the start address and the size of the memory region, that was reserved as the buffer region for reading-out in prior step 458, are notified to the resource managing section 46B, and freeing of that memory region is requested to the resource managing section 46B. In the data read-out processing of FIGS. 24A and 24B, processings of steps other than those described above are similar to the read-out processings described in FIGS. 10A and 10B, and therefore, description thereof is omitted.

Figure 13:
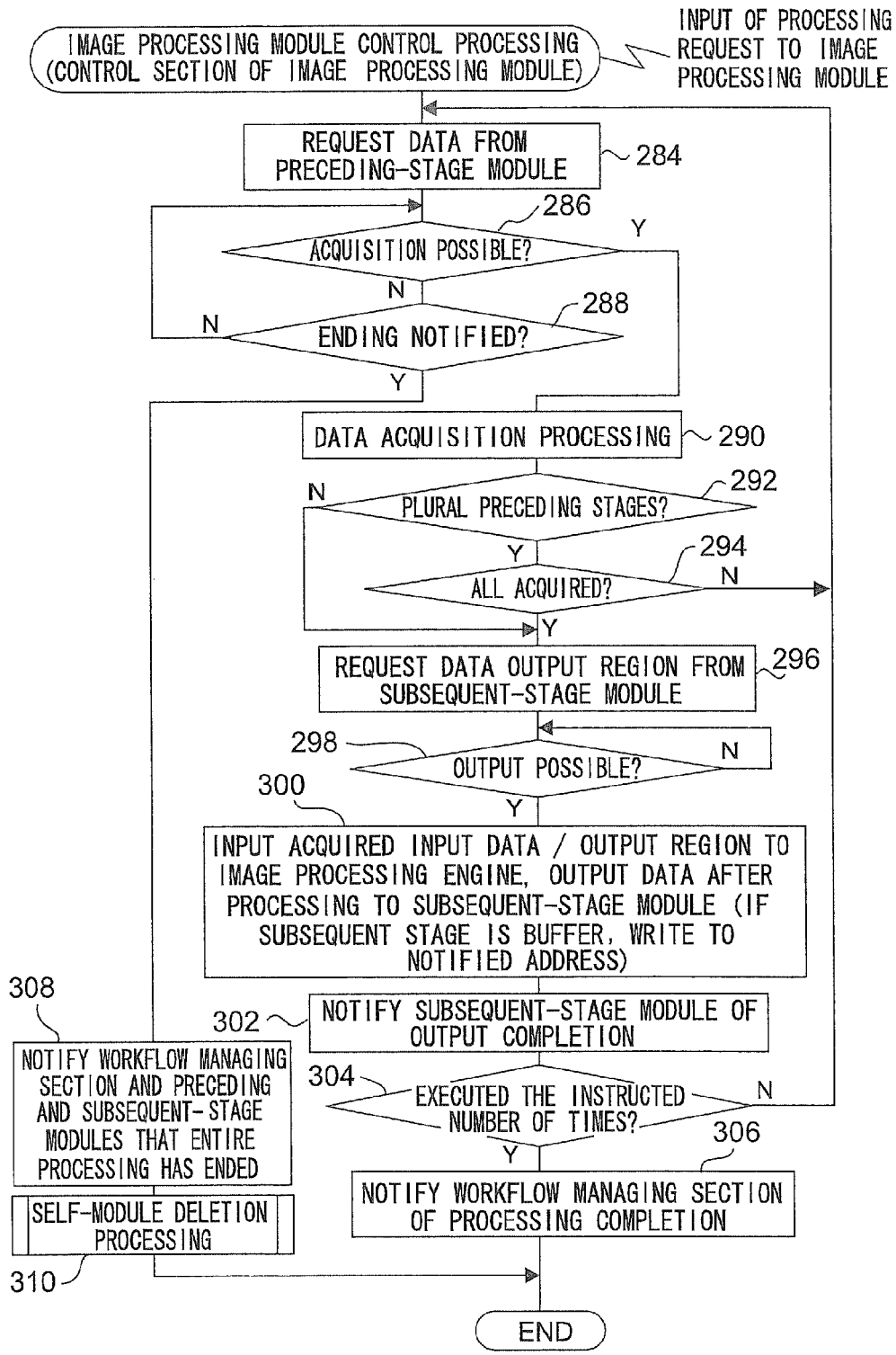
FIG. 13 is a flowchart showing the contents of image processing module control processing that is executed by the control section of the image processing module.
Figure 25B:
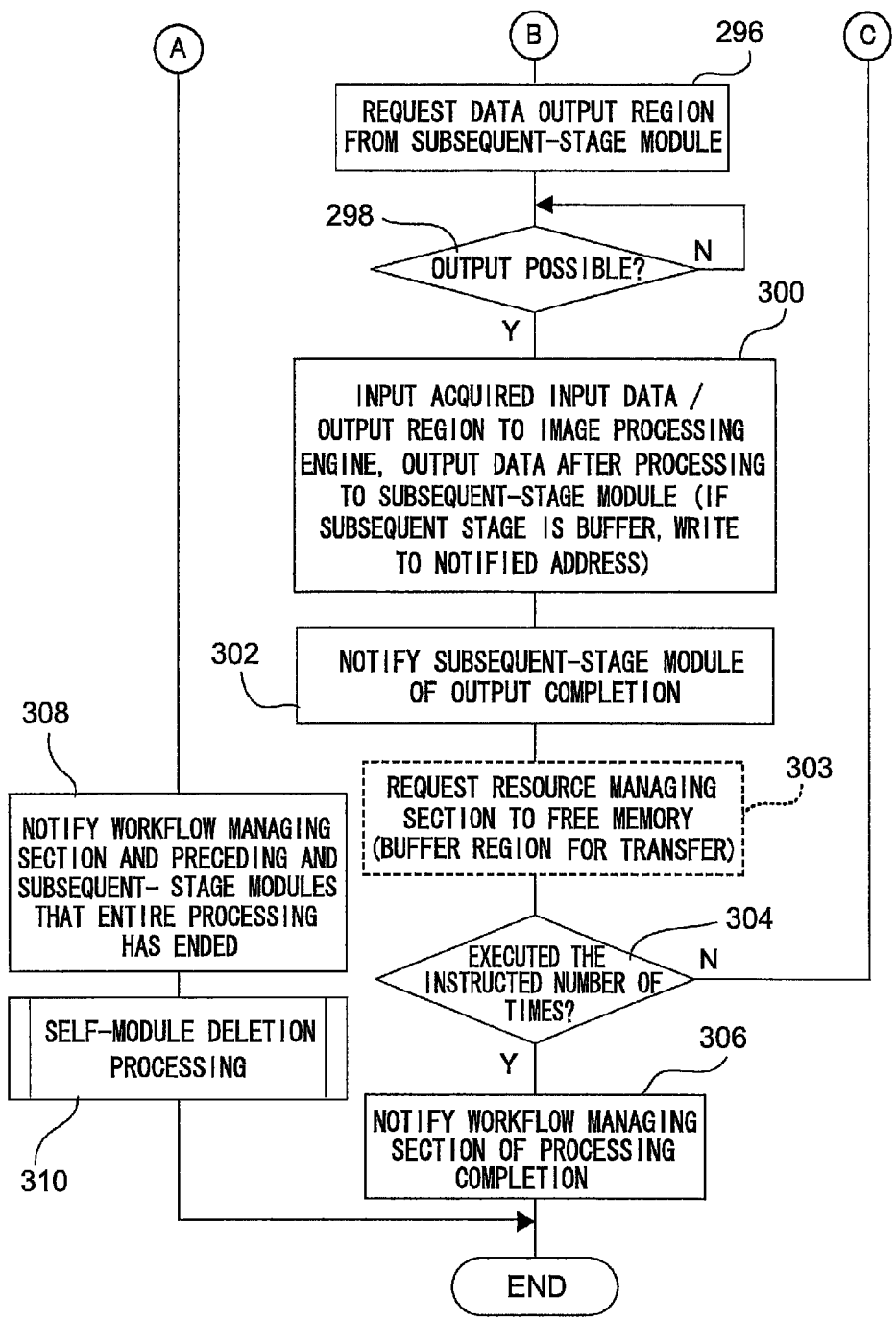

Further, instead of the image processing module control processing shown in FIG. 13, the control section 38B of the image processing module 38 executes the image processing module control processing shown in FIGS. 25A and 25B. Here, steps in FIGS. 25A and 25B that carry out processings that are similar to those of FIG. 13 are denoted by the same step numbers as in FIG. 13.

As shown in FIG. 25A, three processings of step 289(1) through step 289(3), and processing of step 303, are added to the image processing module control processing shown in FIG. 13.

After the judgment in step 286 becomes affirmative, the routine does not immediately proceed to step 290, but first executes the processing of step 289(1). In step 289(1), in a case in which the buffer module 40 is connected at the preceding stage, it is judged whether or not the processor, that is used in image processing by the image processing module 38 that is at the preceding stage of that buffer module 40 or at the preceding stage, is the same as the processor that its own module uses in image processing. If the judgment in step 289(1) is affirmative, in step 289(2), the resource managing section 46B is requested to reserve memory. Here, the source managing section 46B is requested to reserve a buffer region for transfer in the memory space that corresponds to the processor that its own module uses in image processing (e.g., the first memory 14 if its own module uses the CPU 12). As explained with reference to FIG. 2B and the like, the resource managing section 46B that receives this request reserves a buffer region for transfer, and hands over the start address thereof to the image processing module 38 that is the source of the request. Note that, in the present exemplary embodiment, the buffer region for transfer has a size that is greater than or equal to the unit read-out data amount, and is not reserved over plural regions.

In step 289(3), data acquisition and transfer processing are carried out. Here, first, image data is successively read-out and acquired from the address of the read-out region that was notified from the buffer module 40 of the preceding stage, and this read-out image data is transferred to (written in) the aforementioned buffer region for transfer that was reserved. The read-out region notified from the buffer module 40 is in the memory space that corresponds to a processor that is different than the processor that its own module uses. Accordingly, the transfer processing is carried out by its own processor and the processor, that corresponds to the memory of the read-out region, communicating with one another. However, in a case that is structured such that DMA transfer is possible, a DMA transfer command may be outputted, and thereafter, the transfer processing may be carried out without going through the processors. The image processing module 38 carries out image processing on the image data that was transferred to that buffer for transfer.

On the other hand, if the judgment in step 289(1) is negative, the routine moves on to step 290. In step 290, as described in FIG. 13, image data is read-out from the address of the read-out region that was notified from the buffer module 40 of the preceding stage, and the image data is acquired. Here, the acquired image data is used in image processing.

After step 289(3), the routine moves on to step 292. Step 292 and steps thereafter operate as described by using above-described FIG. 13. However, in a case in which step 289(3) is executed, after step 302, the processing of step 303 is executed, and thereafter, the routine proceeds to step 304. In step 303, the resource managing section 46B is requested to free the aforementioned buffer for transfer that was reserved. In a case in which step 289(3) is not executed, after step 302, step 303 is not executed, and the routine proceeds to step 304. In the image processing module control processing of FIGS. 25A and 25B, processings of steps other than those described above are similar to the image processing module control processing described in FIG. 13, and therefore, description thereof is omitted.

In this way, also in cases in which the image processing module 38 judges the sameness/difference of processors and carries out transfer processing, the image processing section can carry out image processing efficiently without superfluous transfer processing arising.

Note that description is given above of an example in which, although a read-out request is inputted to the buffer module 40 from the image processing module 38 of the subsequent stage, in a case in which the data amount of the effective data, that can be read-out by the image processing module 38 that is the source of the read-out request, is less than the unit read-out data amount, and the end of the effective data that can be read-out is not the end of the image data that is the object of processing, a data request is repeatedly inputted from the buffer module 40 to the workflow managing section 46A until either the data amount of the effective data that can be read-out becomes greater than or equal to the unit read-out data amount, or it is sensed that the end of the effective data that can be read-out is the end of the image data that is the object of processing. However, the present invention is not limited to the same. In the above-described case, the buffer module 40 may input a data request to the workflow managing section 46A only one time, and may input an accumulation completed notice to the workflow managing section 46A either when the data amount of the effective data that can be read-out becomes greater than or equal to the unit read-out data amount, or when it is sensed that the end of the effective data that can be read-out is the end of the image data that is the object of processing, and, during the period of time from after the data request has been inputted from the buffer module 40 until the accumulation completed notice is inputted, the workflow managing section 46A may repeatedly input a processing request to the image processing module 38 of the preceding stage of that buffer module 40.

Figure 20:
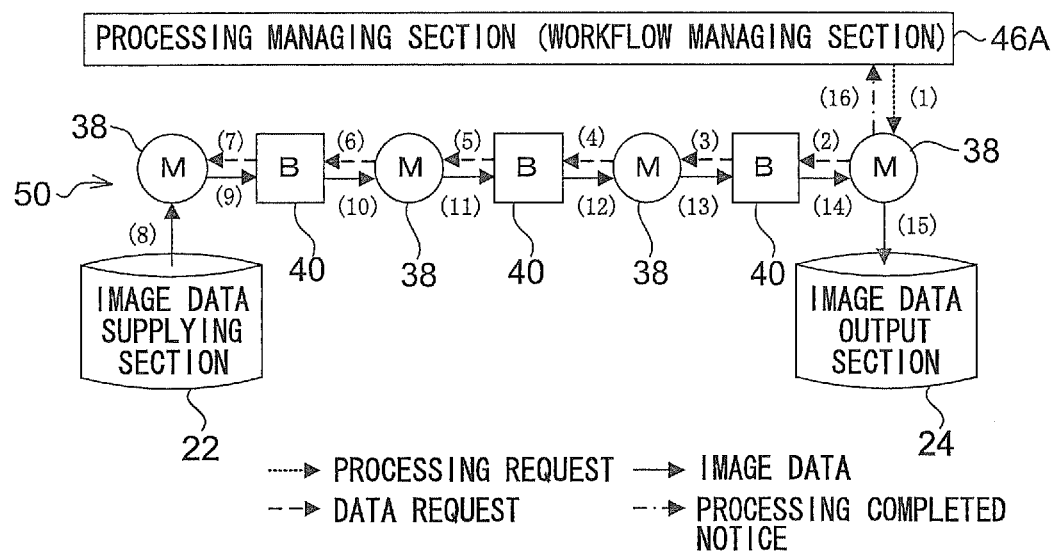
FIG. 20 is a schematic drawing that explains the flow of block unit processing in an aspect in which the buffer module directly requests image data from the image processing module of the preceding stage.

Further, the above describes, as an example, an aspect in which, at the buffer module 40, in a case in which a read-out request is inputted from the image processing module 38 of the subsequent stage and the effective data, that can be read-out by the image processing module 38 that is the source of the read-out request, is not stored in the buffer 40A of its own module, the buffer control section 40B inputs a data request to the workflow managing section 46A. However, the present invention is not limited to the same, and in the above-described case, the buffer control section 40B may directly input a data request to the image processing module 38 of the preceding stage. In this aspect, the processing sequence in a case in which the form of execution of the image processing is block unit processing is shown in FIG. 20. As is clear from FIG. 20 as well, in this aspect, it suffices for the workflow managing section 46A to input a processing request only to the image processing module 38 of the final stage in the image processing section 50, and therefore, the processing at the workflow managing section 46A is simple.

Further, as an example of image processing of a block unit, an aspect is described above in which, first, the workflow managing section 46A inputs a processing request to the image processing module 38 of the final stage of the image processing section 50, and that processing request is successively transferred to modules of the preceding stages as a data request or a processing request. However, the present invention is not limited to the same. It is also possible to successively transfer the processing request or data request from modules of the preceding stages to modules of the subsequent stages, and carry out image processing in block units. This can be realized as follows for example. The buffer control section 40B of the buffer module 40 is structured such that, each time image data is written to the buffer 40A by the image processing module 38 of the preceding stage of its own module, if the data amount of the effective data that can be read-out by the image processing module 38 of the subsequent stage is less than the unit read-out data amount and the end of the effective data that can be read-out is not the end of the image data that is the object of processing, the buffer control section 40B inputs the data request to the workflow managing section 46A, whereas, on the other hand, the buffer control section 40B inputs the accumulation completed notice to the workflow managing section 46A either when the data amount of the effective data that can be read-out becomes greater than or equal to the unit read-out data amount, or when it is sensed that the end of the effective data that can be read-out is the end of the image data that is the object of processing, and, moreover, the workflow managing section 46A is structured such that, after inputting a processing request to the image processing module 38 of the final stage of the image processing section 50, each time a data request is inputted from an arbitrary buffer module 40, the workflow managing section 46A inputs a processing request to the image processing module 38 of the preceding stage of the buffer module 40 that is the source of the data request, and each time an accumulation completed notice is inputted from an arbitrary buffer module 40, the workflow managing section 46A inputs a processing request to the image processing module 38 of the subsequent stage of that buffer module 40. Further, in the above, it is possible for the data request from the buffer module 40 to be directly inputted as a processing request to the image processing module 38 of the preceding stage of that buffer module 40, and for the accumulation completed notice from the buffer module 40 to be directly inputted as a processing request to the image processing module 38 of the subsequent stage of that buffer module 40.

Moreover, the above describes an aspect in which, for the buffer module 40, the unit write data amount is set in advance from the image processing module 38 of the preceding stage, and the unit read-out data amount is set in advance from the image processing module of the subsequent stage. However, the present invention is not limited to the same. The data amount of writing or reading-out may be notified from the image processing module 38 each time of writing data to the buffer module 40 or reading-out data from the buffer module 40.

In the above description, each time a write request or a read-out request is inputted to the buffer module 40, the inputted request is registered in a queue as request information, and the request information is taken-out one-by-one from the queue and processed. Due thereto, exclusive control is realized in which, at the time of input of a write request, if reading-out of data from the buffer 40A is being executed, after that data read-out is completed, data writing processing corresponding to that write request is carried out, and, at the time of input of a read-out request, if writing of data to the buffer 40A is being executed, after that data writing is completed, data read-out processing corresponding to that read-out request is carried out. However, the present invention is not limited to the same. For example, exclusive control that uses a unit buffer region as a unit may be carried out. Namely, at the time of input of a write request, if reading-out of data is being executed with respect to a unit buffer region of an object of writing in that write request within the buffer 40A, after that data reading-out is completed, data writing processing corresponding to that write request may be carried out, and further, at the time of input of a read-out request, if writing of data is being executed with respect to a unit buffer region of an object of read-out in that read-out request within the buffer 40A, after that data writing is completed, data read-out processing corresponding to that read-out request may be carried out. Exclusive control that uses a unit buffer region as a unit can be realized by, for example, providing a queue at each individual unit buffer region and carrying out exclusive control, or the like.

Further, the above describes an example in which, among the individual image processing modules 38 whose programs are registered in the module library 36, programs, that correspond to the control sections 38B of the image processing modules 38 whose unit read-out data amounts and unit write data amounts are the same, are used in common. However, the present invention is not limited to the same. For example, the program corresponding to the control section 38B may be divided into a program that corresponds to a first control section that acquires image data from the module of the preceding stage and inputs it to the image processing engine 38A, a program that corresponds to a second control section that outputs to the module of the preceding stage data that is outputted from the image processing engine 38A, and a program that corresponds to a common control section that carries out control (e.g., communication with the workflow managing section 46A, and the like) that does not depend on the unit read-out data amount, the unit processing data amount, or the unit write data amount. At all of the image processing modules, the program corresponding to the common control section may be used in common. Further, the program corresponding to the first control section may be used in common at the image processing modules 38 whose unit read-out data amounts are the same, and the program corresponding to the second control section may be used in common at the image processing modules 38 whose unit write data amounts are the same.

Moreover, because the individual modules themselves that structure the image processing section 50 are programs, the image processings by the image processing section 50 are realized by the CPU 12 in actuality. Here, the following system (a round robin system) may be used: the programs corresponding to the individual image processing modules 38 structuring the image processing section 50 are registered in a queue as processes, threads, or objects that are objects of execution by the CPU 12. Each time a program, that is registered in that queue and that corresponds to a specific image processing module, is taken-out from that queue by the CPU 12, it is judged whether or not image data of the unit processing data amount can be acquired from the module of the preceding stage of the specific image processing module 38. Only in cases in which is judged that image data of the unit processing data amount can be acquired, the image data of the unit processing data amount is acquired from the module of the preceding stage of that specific image processing module 38. Predetermined image processing (processing corresponding to the image processing engine 38A of the specific image processing module 38) is carried out on the acquired image data of the unit processing data amount. Processing is carried out that outputs, to the module of the subsequent stage of its own module, the image data that has undergone the predetermined image processing, or the processing results of the predetermined image processing. Thereafter, if processing on the entire image that is the object of processing is not finished, the taken-out program corresponding to the specific image processing module is re-registered in that queue as a process, thread, or object that is the object of execution. Due to the CPU 12 repeating these unit image processings, the entire image that is the object of processing is processed by the image processing section 50.

Further, the programs of the individual modules that structure the image processing section 50 may be executed as plural threads corresponding to the respective plural modules. For example, in a structure in which four of the image processing modules 38, and the buffer modules 40 provided between the image processing modules 38, are connected in a pipeline form, there may be a structure in which the most-preceding image processing module 38 and the buffer module 40 at the subsequent stage of that image processing module 38 are executed as thread A, the second image processing module 38 and the buffer module 40 at the subsequent stage of that image processing module 38 are executed as thread B, the third image processing module 38 and the buffer module 40 at the subsequent stage of that image processing module 38 are executed as thread C, and the fourth image processing module 38 and the buffer module 40 at the subsequent stage of that image processing module 38 are executed as thread D (refer to FIGS. 26A-26B as well).

Namely, here, the programs that correspond to the combination of the image processing module 38 and the buffer module 40 of the subsequent stage, that is the destination of output of the image data subjected to image processing by that image processing module 38, are handled as one thread. The processors used respectively by the image processing module 38 and the buffer module 40 that correspond to this combination are the same.

In the case of this structure, further, when the processings, that are to be executed by the image processing module 38 and the buffer module 40 that structure a thread, are made to be tasks, a first-in first-out (FIFO) buffer (hereinafter called queue) in which these tasks are registered can be provided for each processing unit of image data. The respective queues may be provided at the main memory that the main processor mainly uses. The processings that are to be executed by the image processing module 38 and the buffer module 40 are registered from threads as tasks in the queue, and the tasks are executed at the corresponding processor in the order of registration into the queue.

Here, image processing that is executed by the image processing module 38 is called an image processing task, and transfer processing that is executed by the image processing module 38 or the buffer module 40 is called a transfer processing task. Note that transfer processing means the transfer processing that is executed in step 486 of FIG. 10A or in step 289(3) of FIG. 25A. A queue can be provided for each image data per processing unit, and, by executing these tasks in the order in which they were stored in the queue, the image processing and the transfer processing can be executed in parallel, and hiding of the transfer time can be carried out.

More detailed description is given hereinafter by using a concrete example with reference to FIGS. 26A-26B. FIG. 26A shows an example of a connected state of respective modules when an image processing section is constructed from a first processor that is a main processor, and a second processor that is an accelerator or is another processor such as a co-processor or the like. Here, the respective image processing modules 38 included in the image processing section are denoted by reference numerals M1, M2, M3, M4, and the respective buffer modules 40 at the subsequent stages of the respective image processing modules 38 are denoted by reference numerals B1, B2, B3, B4. Hereinafter, the image processing modules will be described while being differentiated by using the reference numerals M1 through M4 instead of reference numeral 38, and the buffer modules will be described while being differentiated by using the reference numerals B1 through B4 instead of reference numeral 40.

The image processing module M1 and the image processing module M4 carry out image processings by using the first processor. The buffer module B1, that is the output destination of the image data processed at the image processing module M1, and the buffer module B4, that is the output destination of the image data processed at the image processing module M4, reserve buffers, for the image processing modules of the preceding stages to carry out writing of image data, in the memory (the first memory) that corresponds to the first processor that the image processing modules M1, M4 use.

On the other hand, the image processing module M2 and the image processing module M3 carry out image processings by using the second processor. The buffer module B2, that is the output destination of the image data processed at the image processing module M2, and the buffer module B3, that is the output destination of the image data processed at the image processing module M3, reserve buffers, for the image processing modules of the preceding stages to carry out writing of image data, in the memory (the second memory) that corresponds to the second processor that the image processing modules M2, M3 use.

Note that, as described above, the combination of the image processing module M1 and the buffer module B1 is thread A. The combination of the image processing module M2 and the buffer module B2 is thread B. The combination of the image processing module M3 and the buffer module B3 is thread C. The combination of the image processing module M4 and the buffer module B4 is thread D.

Because the processors that the image processing module M1 and the image processing module M2 use differ from one another, transfer processing of image data is needed. Further, because the processors that the image processing module M2 and the image processing module M3 use are the same, transfer processing is unnecessary. Because the processors that the image processing module M3 and the image processing module M4 use differ from one another, transfer processing of image data is needed.

Further, although not illustrated, each time that image data that is the object of processing is supplied to the image processing section, queue modules that have queue managing sections are generated by the module generating section 44. Each of the queue modules uses the first processor that is the main processor. When a queue module is generated and started-up by the module generating section 44, first, a memory region serving as a queue is reserved from the first memory (e.g., a request is issued to the resource managing section 46B), and the queue module waits for registration of tasks from the respective threads. The respective threads issue, to the queue module, a registration request to register the image processing task and the transfer task in the queue asynchronously with respect to one another. Due thereto, the queue managing section of the queue module registers the tasks for which registration in the queue, that that queue managing section manages, was requested. In this way, the registration of tasks in the queue is completed due to the registration requests from the respective threads to the queue module, and the registration processing of the queue managing section that receives the registration requests. Hereinafter, this series of processing is expressed by the simple expression "registering of tasks in the queue".

In this way, a queue is provided for each processing unit of image data. The processing unit is not particularly limited. Here, as an example, the image data of one video image frame is one processing unit, and three image data per one frame that is the processing unit are called image 0, image 1 and image 2, with numbers added thereto to differentiate therebetween. As shown in FIG. 26B, a queue is generated per image data. The image data is processed in the order of image 0, image 1, image 2.

Here, description is given centering on the operations from after image processing is finished by the image processing module M1 until the image processing module M4 receives the image data that was image-processed by the image processing module M3 of the preceding stage. Note that, as described above, in a case in which the processors used by the modules at the preceding and subsequent stages are different, transfer processing between the processors is carried out. In FIG. 26A, the transfer processing task, that is carried out in the transfer of image data between the buffer module B1 and the image processing module M2, is denoted by reference numeral T0, and the transfer processing task, that is carried out in the transfer of image data between the buffer module B3 and the image processing module M4, is denoted by reference numeral T1. Further, the image processing task of the image processing module M2 is denoted by reference numeral IP0, and the image processing task of the image processing module M3 is denoted by reference numeral IP1.

First, a read-out request for the image data of image 0 is given from the image processing module M4 to the buffer module B3 of the preceding stage. If the image data that was image-processed at the image processing module M3 is not written to the buffer of the buffer module B3, the image processing module M3 of the preceding stage is requested to write the image data. This is repeated, and requests for image data are given in order to the modules of the preceding stages. With this request as a trigger, each thread asynchronously registers the corresponding tasks in the queue of the corresponding image data.

For example, after thread A registers the image processing task of image processing module M1 in the queue of image 0 (not illustrated), this time, the transfer processing task T0 is registered in the queue of image 0. Thread B waits for task registration with respect to the image 0 of thread A of the preceding stage, and registers its own image processing task IP0 in the queue of image 0. Thread C waits for task registration with respect to image 0 of thread B of the preceding stage, and registers its own image processing task IP1, and thereafter, registers transfer processing task T1 in the queue of image 0.

Thereafter, when a request for image data of image 1 arises, in the same way as in the case of image 0, each thread successively records tasks in the queue of image 1. Because a queue is provided for each image data, each thread registers tasks for image 1 in the queue of image 1 asynchronously from one another, and independently from the tasks for image 0. Thereafter, also when a request for image data of image 2 arises, similarly, the respective threads register tasks in order in the queue of image 2.

In this way, the respective threads place tasks in queues without waiting for completion of processing of the module of the preceding stage (however, they do wait for registration of tasks by the thread of the preceding stage). The processor that corresponds to the placed task actually carries out the transfer processing or the image processing. The tasks, that are registered in the respective queues of image 0, image 1, image 2, are read-out by the processors corresponding to the respective tasks, in the order in which the tasks were registered. The processors execute the read-out tasks. In this way, if all of the tasks registered in a queue are executed in order and execution ends, image processing with respect to the image data corresponding to that queue ends.

In this way, tasks that are registered in one queue (i.e., tasks for the same image data), are executed in the order in which they are registered. However, for example, the image processing task of image 0, and the transfer processing task of the image data of image 1, can be processed in parallel.

For example, a DMA controller that controls DMA (Direct Memory Access) can be provided at each processor, and, if a DMA transfer command of image data is issued from a processor to the DMA controller, after the issuing of the transfer command, that processor can, during the DMA transfer, execute an image processing task of another image data. For example, after the first processor takes-out the transfer processing task T0 of image 1 from the queue of image 1 and issues a transfer command, the first processor can take-out the image processing task of image 0 from the queue and execute the image processing task. In this way, by carrying out transfer processing and image processing in parallel, hiding of the transfer time can be carried out. Note that, here, explanation is given by using DMA transfer as an example, but the present invention is not limited to the same. For example, in a case in which the processor has plural cores, for example, an image processing task may be executed at one core, and a transfer processing task may be executed at a different core. Due thereto as well, transfer processing and image processing can be carried out in parallel in the same way as described above.

However, the present structure does not have to be employed in cases in which the overhead that arises by using the present structure, such as the overhead that arises by using plural threads, the overhead of waiting for registration of tasks into the queue module and the completion of tasks, and the like, exceeds the transfer time that is to be hidden.

In the above-described exemplary embodiments, explanation is given of an example in which the application 32 designates to the module generating section 44 which of the processors among the CPU 12 and the GPU 52 is to be used in carrying out image processing, and the respective image processing modules 38 are generated. However, the present invention is not limited to the same. For example, the module generating section 44 may autonomously determine and allocate the processor that is specialized or suited to the image processing that is carried out at the image processing engine 38A of the image processing module 38. Further, for example, the processors of the respective image processing modules 38 may be determined such that the number of places at which modules that use different processors are connected before and after is less than a threshold value, in order to decrease the number of times that the above-described transfer processing occurs. Moreover, the image processing modules 38 may be generated by determining the processors, that the image processing modules 38 use, by combining the above-described two determining methods.

Further, although the above exemplary embodiments describe examples in which the image processing section is constructed by using two processors and the desired image processing is executed, the image processing section may be constructed by using three or more processors. Still further, the above exemplary embodiments describe examples in which the one computer 10, in which plural processors are installed, functions as the image processing device, but the present invention is not limited to the same, and the following structure is possible for example. Each of plural computers, that structure devices that are independent of one another, generates the image processing module 38 that carries out image processing by using the processor that is installed in that computer. The buffer modules 40 are provided between the image processing modules 38. Then, by connecting the plural computers via a network, an image processing section in which the plural modules are connected is constructed, and the desired image processing is carried out. Even in this case, the reserving of a buffer for transfer and the efficient transfer of image data can be carried out as needed as described in the above exemplary embodiments. Note that, in this case, a communication processing section, that operates independently from the processor and carries out transmission and reception of data, may be provided at each computer, and a transfer command may be issued from the processor to the communication processing section, and thereafter, the image data transfer processing may be executed by the communication processing section without going through the processor.

Further, although it is described above that the first memory 14 and the second memory 54 are physically different memories, the present invention is not limited to the same. For example, the first memory 14 and the second memory 54 may be memory spaces that are different virtually.

An aspect of the present invention is an image processing device having: plural image processing modules that carry out image processings; at least one buffer module; and an image processing section in which the buffer module is connected at at least one of a preceding stage and a subsequent stage of the image processing module, wherein the buffer module carries out control that causes an image processing module of a preceding stage to write image data to a buffer that is reserved in a memory space corresponding to a processor that the image processing module of the preceding stage uses in image processing, and, in a case in which an image processing module, that uses in image processing a processor that is different than the processor used in image processing by the image processing module of the preceding stage, is connected at a subsequent stage, carries out transfer processing that transfers image data, that has been written into the buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer, and, in a case in which an image processing module, that uses in image processing a processor that is the same as the processor used in image processing by the image processing module of the preceding stage, is connected at the subsequent stage, carries out processing that causes the image processing module of the subsequent stage to read-out the image data that has been written into the buffer by the image processing module of the preceding stage. In this image processing device, the buffer module carries out control that makes the image processing module of the preceding stage write image data to a buffer that is reserved in the memory space corresponding to the processor that that image processing module of the preceding stage uses in image processing. The image processing module of the preceding stage means the image processing module that is connected to that buffer module and is one before that buffer module.

Further, the buffer module differs the processing in accordance with the processor that the image processing module of the subsequent stage uses in image processing. The image processing module of the subsequent stage means the image processing module that is connected to that buffer module and is one after that buffer module.

Concretely, in a case in which an image processing module, that uses in image processing a processor that is different than the processor that is used in image processing by the image processing module of the preceding stage, is connected at the subsequent stage, the buffer module carries out transfer processing that transfers image data, that has been written into the aforementioned buffer by the image processing module of the preceding stage, to a buffer for transfer that is reserved in the memory space corresponding to the processor that the image processing module of the subsequent stage uses in image processing, and carries out processing that causes the image processing module of the subsequent stage to read-out the image data transferred to the buffer for transfer.

Further, in a case in which an image processing module, that uses in image processing a processor that is the same as the processor that is used in image processing by the image processing module of the preceding stage, is connected at the subsequent stage, the buffer module carries out processing that causes the image processing module of the subsequent stage to read-out the image data that has been written into the buffer by the image processing module of the preceding stage.

Due to such control, in an image processing device that is realized by a device equipped with plural processors that use memory spaces that differ from one another, the handing-over of image data between plural, connected modules can be carried out efficiently.

Another aspect of the present invention is an image processing device having: plural image processing modules that carry out image processings; at least one buffer module; and an image processing section in which the buffer module is connected to at least one of a preceding stage and a subsequent stage of the image processing module, wherein the buffer module carries out control that causes an image processing module of a preceding stage to write image data into a buffer that is reserved in a memory space corresponding to a processor that the image processing module of the preceding stage uses in image processing, and carries out processing that causes an image processing module of a subsequent stage to read-out the image data that has been written into the buffer, and the image processing module, in a case in which an image processing module, that uses in image processing a processor that is different than a processor used by itself, is connected at a preceding stage of a buffer module of a preceding stage, reads-out image data that has been written into the buffer of the buffer module of the preceding stage, and carries out transfer processing that transfers the read-out image data to a buffer for transfer that is reserved in a memory space corresponding to the processor used by itself in image processing, and thereafter, carries out image processing on the image data transferred to the buffer for transfer, and, in a case in which an image processing module, that uses in image processing a processor that is the same as the processor used by itself in image processing, is connected at the preceding stage of the buffer module of the preceding stage, reads-out the image data that has been written into the buffer of the buffer module of the preceding stage, and carries out image processing.

In this image processing device, the image processing module differs the processing in accordance with the processor that the buffer module of the preceding stage uses in image processing. Here, the buffer module of the preceding stage means the buffer module that is connected to the image processing module and is one before that image processing module.

Note that the buffer module carries out control that causes the image processing module of the preceding stage to write image data to a buffer that is reserved in the memory space corresponding to the processor that that image processing module of the preceding stage uses in image processing, and carries out processing that causes the image processing module of the subsequent stage to read-out the image data that has been written into the buffer.

At the image processing module, in a case in which an image processing module, that uses in image processing a processor that is different than a processor used by itself, is connected at the preceding stage of the buffer module of the preceding stage, the image processing module reads-out image data that has been written into the buffer of the buffer module of the preceding stage, and carries out transfer processing that transfers the read-out image data to a buffer for transfer that is reserved in the memory space corresponding to the processor used by itself in image processing, and thereafter, carries out image processing on the image data transferred to the buffer for transfer.

Further, at the image processing module, in a case in which an image processing module, that uses in image processing a processor that is the same as the processor used by itself in image processing, is connected at the preceding stage of the buffer module of the preceding stage, the image processing module reads-out the image data that has been written into the buffer of the buffer module of the preceding stage, and carries out image processing.

Due to such control, in an image processing device that is realized by a device equipped with plural processors that use memory spaces that differ from one another, the handing-over of image data between plural, connected modules can be carried out efficiently.

In the image processing device of either of the above-described aspects, a first-in first-out storage section that registers, as tasks, processings that the image processing module and the buffer module execute, is provided for each processing unit of image data that is an object of processing of the image processing section, and, due to a task of the transfer processing and a task of the image processing being registered in a storage section that is provided for each image data, each of plural threads, that correspond to a combination of the image processing module and a buffer module at a subsequent stage of the image processing module and that operate asynchronously with respect to one another, causes processors, that are to execute the tasks, to execute the tasks in an order in which the tasks were registered in the storage section, and during a time in which the transfer processing is being executed, causes image processing of image data, that is other than image data that is in the midst of being transferred by the transfer processing, to be carried out, and the task of the image processing and the task of the transfer processing are executed in parallel.

The image processing device of any of the above-described structures may further have: a module generating section that generates the image processing module and the buffer module that are included in the image processing section, wherein, at a time when the module generating section generates the image processing module, the module generating section determines a processor that is to be used in image processing by the image processing module, in accordance with contents of image processing that the image processing module is to execute, or determines the processor of the image processing module such that a number of places at which modules using different processors are connected before and after is less than a threshold value.

Another aspect of the present invention is an image processing method that is carried out by an image processing device, the image processing device including: plural image processing modules that carry out image processings; at least one buffer module; and an image processing section in which the buffer module is connected to at least one of a preceding stage and a subsequent stage of the image processing module, the image processing method including: the buffer module carrying out control that causes an image processing module of a preceding stage to write image data to a buffer that is reserved in a memory space corresponding to a processor that the image processing module of the preceding stage uses in image processing; in a case in which an image processing module, that uses in image processing a processor that is different than the processor used in image processing by the image processing module of the preceding stage, is connected at a subsequent stage, the buffer module carrying out transfer processing that transfers image data, that has been written into the buffer by the image processing module of the preceding stage, to a buffer for transfer that is reserved in a memory space corresponding to the processor that the image processing module of the subsequent stage uses in image processing, and carrying out processing that causes the image processing module of the subsequent stage to read-out the image data transferred to the buffer for transfer; and in a case in which an image processing module, that uses in image processing a processor that is the same as the processor used in image processing by the image processing module of the preceding stage, is connected at the subsequent stage, the buffer module carrying out processing that causes the image processing module of the subsequent stage to read-out the image data that has been written into the buffer by the image processing module of the preceding stage.

Yet another aspect of the present invention is an image processing method that is carried out by an image processing device, the image processing device including: plural image processing modules that carry out image processings; at least one buffer module; and an image processing section in which the buffer module is connected to at least one of a preceding stage and a subsequent stage of the image processing module, the image processing method including: the buffer module carrying out control that causes an image processing module of a preceding stage to write image data into a buffer that is reserved in a memory space corresponding to a processor that the image processing module of the preceding stage uses in image processing, and carrying out processing that causes an image processing module of a subsequent stage to read-out the image data that has been written into the buffer; the image processing module, in a case in which an image processing module, that uses in image processing a processor that is different than a processor used by itself, is connected at a preceding stage of a buffer module of a preceding stage, reading-out image data that has been written into the buffer of the buffer module of the preceding stage, and carrying out transfer processing that transfers the read-out image data to a buffer for transfer that is reserved in a memory space corresponding to the processor used by itself in image processing, and thereafter, carrying out image processing on the image data transferred to the buffer for transfer; and the image processing module, in a case in which an image processing module, that uses in image processing a processor that is the same as the processor used by itself in image processing, is connected at the preceding stage of the buffer module of the preceding stage, reading-out the image data that has been written into the buffer of the buffer module of the preceding stage, and carrying out image processing.

Another aspect of the present invention is a recording medium on which is recorded a program that causes a computer to function as an image processing device having: plural image processing modules that carry out image processings; at least one buffer module; and an image processing section in which the buffer module is connected to at least one of a preceding stage and a subsequent stage of the image processing module, wherein the buffer module carries out control that causes an image processing module of a preceding stage to write image data to a buffer that is reserved in a memory space corresponding to a processor that the image processing module of the preceding stage uses in image processing, and, in a case in which an image processing module, that uses in image processing a processor that is different than the processor used in image processing by the image processing module of the preceding stage, is connected at a subsequent stage, carries out transfer processing that transfers image data, that has been written into the buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer, and, in a case in which an image processing module, that uses in image processing a processor that is the same as the processor used in image processing by the image processing module of the preceding stage, is connected at the subsequent stage, carries out processing that causes the image processing module of the subsequent stage to read-out the image data that has been written into the buffer by the image processing module of the preceding stage.

Still another aspect of the present invention is a recording medium on which is recorded a program that causes a computer to function as an image processing device having: plural image processing modules that carry out image processings; at least one buffer module; and an image processing section in which the buffer module is connected to at least one of a preceding stage and a subsequent stage of the image processing module, wherein the buffer module carries out control that causes an image processing module of a preceding stage to write image data into a buffer that is reserved in a memory space corresponding to a processor that the image processing module of the preceding stage uses in image processing, and carries out processing that causes an image processing module of a subsequent stage to read-out the image data that has been written into the buffer, and the image processing module, in a case in which an image processing module, that uses in image processing a processor that is different than a processor used by itself, is connected at a preceding stage of a buffer module of a preceding stage, reads-out image data that has been written into the buffer of the buffer module of the preceding stage, and carries out transfer processing that transfers the read-out image data to a buffer for transfer that is reserved in a memory space corresponding to the processor used by itself in image processing, and thereafter, carries out image processing on the image data transferred to the buffer for transfer, and, in a case in which an image processing module, that uses in image processing a processor that is the same as the processor used by itself in image processing, is connected at the preceding stage of the buffer module of the preceding stage, reads-out the image data that has been written into the buffer of the buffer module of the preceding stage, and carries out image processing.

As described above, the present invention has the excellent effect that, in an image processing device that is realized by a device having plural processors that use memory spaces that differ from one another, the handing-over of image data between plural, connected modules can be carried out efficiently.

What is claimed is:

1. An image processing device comprising:
a plurality of image processing modules that carry out image processings;
at least one buffer module; and
an image processing section in which the buffer module is connected to at least one of a preceding stage and a subsequent stage of the image processing modules,
wherein the plurality of image processing modules are connected according to desired image processings,
wherein the buffer module
carries out control that causes an image processing module of a preceding stage to write image data to a buffer that is reserved in a memory space corresponding to a processor that the image processing module of the preceding stage uses in image processing, and,
in a case in which an image processing module, that uses in image processing a processor that is different than the processor used in image processing by the image processing module of the preceding stage, is connected at a subsequent stage, carries out transfer processing that transfers image data, that has been written into the buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer,
in a case in which an image processing module, that uses in image processing a processor that is the same as the processor used in image processing by the image processing module of the preceding stage, is connected at the subsequent stage, carries out processing that causes the image processing module of the subsequent stage to read-out the image data that has been written into the buffer by the image processing module of the preceding stage,
wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

2. The image processing device of claim 1, wherein a first-in first-out storage section that registers, as tasks, processings that the image processing module and the buffer module execute, is provided for each processing unit of image data that is an object of processing of the image processing section, and,
due to a task of the transfer processing and a task of the image processing being registered in a storage section that is provided for each image data, each of a plurality of threads, that correspond to a combination of the image processing module and a buffer module at a subsequent stage of the image processing module and that operate asynchronously with respect to one another, causes processors, that are to execute the tasks, to execute the tasks in an order in which the tasks were registered in the storage section, and, during a time in which the transfer processing is being executed, causes image processing of image data, that is other than image data that is in the midst of being transferred by the transfer processing, to be carried out, and the task of the image processing and the task of the transfer processing are executed in parallel.

3. The image processing device of claim 1, further comprising:
a module generating section that generates the image processing module and the buffer module that are included in the image processing section,
wherein, at a time when the module generating section generates the image processing module, the module generating section determines a processor that is to be used in image processing by the image processing module, in accordance with contents of image processing that the image processing module is to execute, or determines the processor of the image processing module such that a number of places at which modules using different processors are connected before and after is less than a threshold value.

4. An image processing device comprising:
a plurality of image processing modules that carry out image processings;
at least one buffer module; and
an image processing section in which the buffer module is connected to at least one of a preceding stage and a subsequent stage of the image processing modules,
wherein the plurality of image processing modules are connected according to desired image processings,
wherein the buffer module
carries out control that causes an image processing module of a preceding stage to write image data into a buffer that is reserved in a memory space corresponding to a processor that the image processing module of the preceding stage uses in image processing, and carries out processing that causes an image processing module of a subsequent stage to read-out the image data that has been written into the buffer, and the image processing module,
in a case in which an image processing module, that uses in image processing a processor that is different than a processor used by the subsequent stage of the image processing module, is connected at a preceding stage of a buffer module of a preceding stage, reads-out image data that has been written into the buffer of the buffer module of the preceding stage, and carries out transfer processing that transfers the read-out image data to a buffer for transfer that is reserved in a memory space corresponding to the processor used by the subsequent stage of the image processing module in image processing, and thereafter, carries out image processing on the image data transferred to the buffer for transfer, and,
in a case in which an image processing module, that uses in image processing a processor that is the same as the processor used by the subsequent stage of the image processing module in image processing, is connected at the preceding stage of the buffer module of the preceding stage, reads-out the image data that has been written into the buffer of the buffer module of the preceding stage, and carries out image processing,
wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

5. The image processing device of claim 4, wherein
a first-in first-out storage section that registers, as tasks, processings that the image processing module and the buffer module execute, is provided for each processing unit of image data that is an object of processing of the image processing section, and,
due to a task of the transfer processing and a task of the image processing being registered in a storage section that is provided for each image data, each of a plurality of threads, that correspond to a combination of the image processing module and a buffer module at a subsequent stage of the image processing module and that operate asynchronously with respect to one another, causes processors, that are to execute the tasks, to execute the tasks in an order in which the tasks were registered in the storage section, and,
during a time in which the transfer processing is being executed, causes image processing of image data, that is other than image data that is in the midst of being transferred by the transfer processing, to be carried out, and the task of the image processing and the task of the transfer processing are executed in parallel.

6. The image processing device of claim 4, further comprising:
a module generating section that generates the image processing module and the buffer module that are included in the image processing section, wherein, at a time when the module generating section generates the image processing module, the module generating section determines a processor that is to be used in image processing by the image processing module, in accordance with contents of image processing that the image processing module is to execute, or determines the processor of the image processing module such that a number of places at which modules using different processors are connected before and after is less than a threshold value.

7. An image processing method that is carried out by an image processing device, the image processing device including:
a plurality of image processing modules that carry out image processings;
at least one buffer module; and
an image processing section in which the buffer module is connected to at least one of a preceding stage and a subsequent stage of the image processing modules,
wherein the plurality of image processing modules are connected according to desired image processings,
the image processing method comprising:
the buffer module carrying out control that causes an image processing module of a preceding stage to write image data to a buffer that is reserved in a memory space corresponding to a processor that the image processing module of the preceding stage uses in image processing;
in a case in which an image processing module, that uses in image processing a processor that is different than the processor used in image processing by the image processing module of the preceding stage, is connected at a subsequent stage, the buffer module carrying out transfer processing that transfers image data, that has been written into the buffer by the image processing module of the preceding stage, to a buffer for transfer that is reserved in a memory space corresponding to the processor that the image processing module of the subsequent stage uses in image processing, and carrying out processing that causes the image processing module of the subsequent stage to read-out the image data transferred to the buffer for transfer; and
in a case in which an image processing module, that uses in image processing a processor that is the same as the processor used in image processing by the image processing module of the preceding stage, is connected at the subsequent stage, the buffer module carrying out processing that causes the image processing module of the subsequent stage to read-out the image data that has been written into the buffer by the image processing module of the preceding stage,
wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

8. An image processing method that is carried out by an image processing device, the image processing device including:
a plurality of image processing modules that carry out image processings;
at least one buffer module; and
an image processing section in which the buffer module is connected to at least one of a preceding stage and a subsequent stage of the image processing modules,
wherein the plurality of image processing modules are connected according to desired image processings,
the image processing method comprising:
the buffer module carrying out control that causes an image processing module of a preceding stage to write image data into a buffer that is reserved in a memory space corresponding to a processor that the image processing module of the preceding stage uses in image processing, and carrying out processing that causes an image processing module of a subsequent stage to read-out the image data that has been written into the buffer;
the image processing module, in a case in which an image processing module, that uses in image processing a processor that is different than the processor used by the subsequent stage of the image processing module, is connected at a preceding stage of a buffer module of a preceding stage, reading-out image data that has been written into the buffer of the buffer module of the preceding stage, and carrying out transfer processing that transfers the read-out image data to a second buffer for transfer that is reserved in a memory space corresponding to the processor used by the subsequent stage of the image processing module in image processing, and thereafter, carrying out image processing on the image data transferred to the buffer for transfer; and
the image processing module, in a case in which an image processing module, that uses in image processing a processor that is the same as the processor used by the subsequent stage of the image processing module in image processing, is connected at the preceding stage of the buffer module of the preceding stage, reading-out the image data that has been written into the buffer of the buffer module of the preceding stage, and carrying out image processing, wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

9. A non-transitory recording medium on which is recorded a program that causes a computer to function as an image processing device having:

a plurality of image processing modules that carry out image processings;

at least one buffer module; and an image processing section in which the buffer module is connected to at least one of a preceding stage and a subsequent stage of the image processing modules, wherein the plurality of image processing modules are connected according to desired image processings, wherein the buffer module carries out control that causes an image processing module of a preceding stage to write image data to a buffer that is reserved in a memory space corresponding to a processor that the image processing module of the preceding stage uses in image processing, and, in a case in which an image processing module, that uses in image processing a processor that is different than the processor used in image processing by the image processing module of the preceding stage, is connected at a subsequent stage, carries out transfer processing that transfers image data, that has been written into the buffer by the image processing module of the preceding stage, to a buffer for transfer that is reserved in a memory space corresponding to the processor that the image processing module of the subsequent stage uses in image processing, and carries out processing that causes the image processing module of the subsequent stage to read-out the image data transferred to the buffer for transfer, and, in a case in which an image processing module, that uses in image processing a processor that is the same as the processor used in image processing by the image processing module of the preceding stage, is connected at the subsequent stage, carries out processing that causes the image processing module of the subsequent stage to read-out the image data that has been written into the buffer by the image processing module of the preceding stage, wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

10. A non-transitory recording medium on which is recorded a program that causes a computer to function as an image processing device having:

a plurality of image processing modules that carry out image processings;

at least one buffer module; and an image processing section in which the buffer module is connected to at least one of a preceding stage and a subsequent stage of the image processing modules, wherein the plurality of image processing modules are connected according to desired image processings, wherein the buffer module carries out control that causes an image processing module of a preceding stage to write image data into a buffer that is reserved in a memory space corresponding to a processor that the image processing module of the preceding stage uses in image processing, and carries out processing that causes an image processing module of a subsequent stage to read-out the image data that has been written into the buffer, and the image processing module, in a case in which an image processing module, that uses in image processing a processor that is different than the processor used by the subsequent stage of the image processing module, is connected at a preceding stage of a buffer module of a preceding stage, reads-out image data that has been written into the buffer of the buffer module of the preceding stage, and carries out transfer processing that transfers the read-out image data to a buffer for transfer that is reserved in a memory space corresponding to the processor used by the subsequent stage of the image processing module in image processing, and thereafter, carries out image processing on the image data transferred to the buffer for transfer, and, in a case in which an image processing module, that uses in image processing a processor that is the same as the processor used by the subsequent stage of the image processing module in image processing, is connected at the preceding stage of the buffer module of the preceding stage, reads-out the image data that has been written into the buffer of the buffer module of the preceding stage, and carries out image processing, wherein types of the processor used in image processing by the image processing module of the preceding stage and the processor used in image processing by the image processing module of the subsequent stage each comprises one of a Graphics Processing Unit (GPU), a Central Processing Unit (CPU), or a different type of processor, and wherein the difference or similarity between the processor used in image processing by the image processing module of the preceding stage and the processor used in image processing by the image processing module of the subsequent stage is based on the types.

* * * * *